(12) United States Patent
Wang et al.

(10) Patent No.: US 10,735,146 B2
(45) Date of Patent: Aug. 4, 2020

(54) METHOD AND DEVICE FOR FEEDING BACK AND RECEIVING HARQ-ACK INFORMATION

(71) Applicant: Samsung Electronics Co., Ltd., Suwon-si, Gyeonggi-do (KR)

(72) Inventors: Yi Wang, Beijing (CN); Shichang Zhang, Beijing (CN); Jingxing Fu, Beijing (CN); Yingyang Li, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 167 days.

(21) Appl. No.: 15/763,421

(22) PCT Filed: Sep. 26, 2016

(86) PCT No.: PCT/KR2016/010787
§ 371 (c)(1),
(2) Date: Mar. 26, 2018

(87) PCT Pub. No.: WO2017/052345
PCT Pub. Date: Mar. 30, 2017

(65) Prior Publication Data
US 2018/0278373 A1    Sep. 27, 2018

(30) Foreign Application Priority Data

Sep. 25, 2015  (CN) .......................... 2015 1 0621999
Apr. 1, 2016   (CN) .......................... 2016 1 0204744
(Continued)

(51) Int. Cl.
*H04L 1/18*      (2006.01)
*H04L 5/00*      (2006.01)
*H04L 1/16*      (2006.01)

(52) U.S. Cl.
CPC .......... *H04L 1/1812* (2013.01); *H04L 1/1671* (2013.01); *H04L 1/1854* (2013.01);
(Continued)

(58) Field of Classification Search
CPC ............. H04L 41/0809; H04L 41/0816; H04L 41/0853; H04W 88/06
See application file for complete search history.

(56) References Cited

U.S. PATENT DOCUMENTS

2010/0067470 A1   3/2010  Damnjanovic et al.
2011/0243066 A1*  10/2011 Nayeb Nazar .......... H04L 1/007
                                                           370/328
(Continued)

FOREIGN PATENT DOCUMENTS

CN     102904698 A    1/2013
CN     103580827 A    2/2014

OTHER PUBLICATIONS

ISA/KR, "International Search Report," International Application No. PCT/KR2016/010787, dated Dec. 28, 2016, 3 pages.
(Continued)

*Primary Examiner* — Jeffrey M Rutkowski
*Assistant Examiner* — Chae S Lee

(57) ABSTRACT

The present disclosure provides a method for feeding back hybrid automatic repeat request-acknowledgement (HARQ-ACK) information. In the method provided by the present disclosure, an evolved Node B (eNB) transmits Downlink Assignment (DL-GRANT) within a time-frequency bundling window, which corresponds to an uplink subframe feeding back HARQ-ACK. A UE receives DL-GRANT scheduling downlink HARQ transmission in the time-frequency bundling window corresponding to respective uplink subframe for feeding back HARQ-ACK in turn, obtains a DL DAI in the DL-GRANT, and determines a mapping (Continued)

value of each DL DAI; then, maps HARQ-ACK bits of the time-frequency bundling window corresponding to respective uplink subframe for feeding back the HARQ-ACK to corresponding bits of a feedback bit sequence according to the mapping value of the DL DAI; and transmits the HARQ-ACK on an available uplink carrier. The present disclosure also provides a method for feeding back HARQ-ACK information. The UE transmits HARQ-ACK on an indicated carrier according to indication information of a base station. According to the method and apparatus provided by the present disclosure, efficiency for feeding back the HARQ-ACK can be increased and downlink peak rate of the UE can be ensured.

15 Claims, 39 Drawing Sheets

(30) Foreign Application Priority Data

May 5, 2016 (CN) .......................... 2016 1 0293521
May 6, 2016 (CN) .......................... 2016 1 0298403

(52) U.S. Cl.
CPC .......... *H04L 1/1861* (2013.01); *H04L 5/0055* (2013.01); *H04L 5/001* (2013.01)

(56) References Cited

U.S. PATENT DOCUMENTS

| 2013/0230033 A1* | 9/2013 | Lee .................... H04W 72/0413 370/336 |
| 2013/0322357 A1* | 12/2013 | He .................... H04W 72/0406 370/329 |
| 2014/0036818 A1 | 2/2014 | Koskela et al. |
| 2015/0063179 A1 | 3/2015 | Yang et al. |
| 2015/0117271 A1* | 4/2015 | Liang .................... H04L 1/1812 370/280 |
| 2015/0237619 A1* | 8/2015 | Yang .................. H04W 72/0413 370/280 |
| 2016/0212734 A1 | 7/2016 | He et al. |
| 2017/0170931 A1* | 6/2017 | Kusashima ........... H04L 5/1469 |
| 2017/0238287 A1 | 8/2017 | Kusashima et al. |
| 2018/0102892 A1* | 4/2018 | Lunttila ................ H04L 1/1607 |
| 2018/0278373 A1 | 9/2018 | Wang et al. |

OTHER PUBLICATIONS

Qualcomm Incorporated, "HARQ-ACK feedback," R1-153856, 3GPP TSG RAN WG1 #82, Beijing, China, Aug. 24-28, 2015, 5 pages.
Samsung, "Discussion on HARQ-ACK codebook determination for eCA," R1-154117, 3GPP TSG RAN WG1 #82, Beijing, China, Aug. 24-28, 2015, 6 pages.
ZTE, "Adaptive HARQ-ACK codebook size determination," R1-154036, 3GPP TSG RAN WG1 Meeting #82, Beijing, china, Aug. 24-28, 2015, 11 pages.
ZTE, "UL framework for LAA," R1-154048, 3GPP TSG RAN WG1 Meeting #82 ,Beijing, China, Aug. 24-28, 2015, 8 pages.
International Search Report dated Jun. 28, 2017 in connection with International Patent Application No. PCT/KR2017/003079.
LG Electronics, "Further details on uplink transmissions for NB-IoT", 3GPP TSG RAN1 #84, Feb. 15-19, 2016, 4 pages, R1-160621.
Huawei, et al. "UCI transmission for eLAA", 3GPP TSG RAN WG1 Meeting #84, Feb. 15-19, 2016, 2 pages, R1-160747.
Intel Corporation, "UCI and DL HARQ-ACK feedback for NB-IoT", 3GPP TSG RAN WG1 NB-IoT Ad-Hoc Meeting #2, Mar. 22-24, 2016, 7 pages, R1-161902.
The First Office Action in connection with Chinese Application No. 201510621999.6 dated Apr. 29, 2020, 25 pages.
Non-final Office Action in connection with U.S. Appl. No. 16/089,925 dated May 15, 2020, 11 pages.

* cited by examiner

METHOD AND DEVICE FOR FEEDING BACK AND RECEIVING HARQ-ACK INFORMATION

CROSS-REFERENCE TO RELATED APPLICATIONS AND CLAIM OF PRIORITY

This application is a 371 of International Application No. PCT/KR2016/010787, filed Sep. 26, 2016, which claims priority to Chinese Patent Application No. 201510621999.6 filed Sep. 25, 2015, Chinese Patent Application No. 201610204744.4 filed Apr. 1, 2016, Chinese Patent Application No. 201610293521.X, filed May 5, 2016, and Chinese Patent Application No. 201610298403.8 filed May 6, 2016, the disclosures of which are herein incorporated by reference in their entirety.

TECHNICAL FIELD

The present disclosure relates to radio communications technologies, more particularly to a method and an apparatus for feeding back HARQ-ACK information.

BACKGROUND

Long-Term Evolution (LTE) system supports two duplex modes including Frequency Division Duplex (FDD) and Time Division Duplex (TDD). FIG. 1 shows a frame structure of a TDD system. Each radio frame is of 10 ms length and is divided into two 5 ms half-frames. Each half-frame includes eight 0.5 ms slots and three special fields, i.e., downlink pilot slot (DwPTS), guard period (GP) and uplink pilot slot (UpPTS). The total length of the three special fields is 1 ms. The TDD system supports 7 kinds of uplink-downlink configurations, as shown in Table 1. Herein, D denotes downlink subframe, U denotes uplink subframe, and S denotes a special subframe including the above three special fields.

TABLE 1

Table 1 uplink-downlink configurations of LTE TDD

| Configuration index | Switching point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In the LTE-Advanced (LTE-A) system, a wider working bandwidth is obtained through combining multiple Component Carriers (CC) via a Carrier Aggregation (CA) technique, and therefore data transmission rate may be further increased. Each CC corresponds to one Cell. According to current LTE standard (Rel-12), a UE may work on at most 5 CCs at the same time, wherein one of them is a Primary Cell (Pcell), and other CCs are Secondary Cells (Scells).

In downlink communication of the LTE-A system, Hybrid Automatic Repeat reQuest (HARQ) technique is utilized to ensure reliability of downlink data receiving. The UE receives a DL-GRANT, wherein the DL-GRANT is carried by a Physical Downlink Control Channel (PDCCH) or an Enhanced Physical Downlink Control Channel (EPDCCH). Physical Downlink Shared Channel (PDSCH) is received according to indication information in the DL-GRANT. For each Transmission Block (TB) received via PDSCH, or received Physical Downlink Control Channel indicating release of semi-persistent scheduling (hereinafter the above two are referred to as downlink HARQ transmission), the UE needs to feed back ACK (correct receiving) bit or NACK (incorrect receiving or lost) bit to the base station via corresponding uplink subframe, hereinafter referred to as HARQ-ACK bit. If the base station receives the NACK bit, the base station re-transmits the TB corresponding to the NACK or the PDCCH indicating the release of the SPS. According to different HARQ-ACK mechanisms, the LTE-A standard defines corresponding method for determining the number of HARQ-ACK bits to be fed back and values of the HARQ-ACK bits.

In a FDD system, if the UE feeds back HARQ-ACK bit in an uplink subframe n via a Physical Uplink Shared Channel (PUSCH), the number of HARQ-ACK bits to be fed back is determined according to the number of carriers configured for the UE and a transmission mode (transmission mode of one TB or transmission mode of two TBs) of each carrier. For each carrier configured for the UE, if the transmission mode is one TB, the carrier corresponds to one HARQ-ACK bit. If the transmission mode is two TBs, the carrier corresponds to two HARQ-ACK bits. The bits are arranged according to an ascending order of the indexes of the carriers, to form a HARQ-ACK bit sequence that the UE finally feeds back in uplink subframe n (the HARQ-ACK bit sequence refers to that before channel coding, the same applies hereinafter). Subsequently, it can be seen that in HARQ-ACK feedback mechanism defined by current standard, the HARQ-ACK sequence finally fed back by the UE may depend on configured carrier number and TM. Thus, the HARQ-ACK finally fed back may include a HARQ-ACK bit, which corresponds to a carrier without downlink HARQ transmission. When the maximum number of carriers supported by the UE is 5, existence of foregoing invalid HARQ-ACK bit will not bring significant impact on system performance. However, accompanying with increasing of maximum number of supportable carriers of the UE, e.g., the maximum number is increased to 32, negative impact resulted from the problem of invalid HARQ-ACK bit may be enlarged undoubtedly. Such problem is under discussion in the research of third generation partnership project (3GPP) Rel-13 eCA, which puts forward to feed back HARQ-ACK bit for an actually scheduled carrier. That is, feed back HARQ-ACK bit corresponding to a carrier with downlink HARQ transmission. To avoid inconsistent understandings of eNB and UE for number of HARQ-ACK bits to be fed back, e.g., eNB has scheduled downlink HARQ transmissions of N DL carriers, while UE only detects downlink HARQ transmissions of M DL carriers (M<N), 3GPP studies to count downlink assignment index (DAI) number of all the scheduled DL carriers. That is, sort DAI according to an ascending order of index number of each scheduled carrier. As shown in FIG. 21, the eNB has configured 16 carriers for the UE. The eNB has scheduled 5 carriers in subframe n, which are CC2, CC3, CC5, CC7 and CC15. DAIs in downlink control information (DCI) scheduling these 5 carriers are respectively 0-4.

It should be noted that, in the example illustrated with FIG. 21, the aggregated carriers are in the licensed frequency band. Carriers scheduled within one subframe are transmitted from subframe boundary simultaneously, that is, from #$0^{th}$ orthogonal frequency division multiplexing (OFDM) symbol of the subframe. Accompanying with increasing shortage of frequency resources, 3GPP starts to study how to transmit data on carriers in unlicensed frequency band. A LTE device may simultaneously work on carriers of licensed frequency band and unlicensed frequency band, by using CA or dual connectivity (DC). A significant difference between carriers in the unlicensed frequency band and carriers in the licensed frequency band is as follows. When a LTE device transmits a signal on a carrier of unlicensed frequency band, listen before talk (LBT) is needed. That is, the LTE device needs to monitor busy/idle state of the carrier in the unlicensed frequency band. Only when the carrier in the unlicensed frequency band is idle, the LTE device may transmit a signal on such carrier. Since the LTE device cannot accurately predict when the carrier in the unlicensed frequency band is idle, transmission of the LTE device on the carrier in the unlicensed frequency band is uncertain. That is, whether a signal can be transmitted in subframe n cannot be determined in advance. Meanwhile, to improve transmission efficiency of the LTE device on carriers in the unlicensed frequency band, transmission of the LTE device on carriers in the unlicensed frequency band is allowed to start from an intermediate position of a subframe. For example, PDSCH transmission may be started from subframe boundary, e.g., from $\#0^{th}$ OFDM symbol, or from slot boundary, e.g., from $\#0^{th}$ or #7th OFDM symbol, or from boundaries of more OFDM symbols, e.g., from #0th, #4th, $\#7^{th}$, $\#11^{th}$ OFDM symbols. And then, when a LTE device transmits signals on multiple carriers within a same subframe, starting point of transmission time of each carrier may be different. For example, starting point of transmission time of carriers in the licensed frequency band is $\#0^{th}$ OFDM symbol of subframe boundary. Starting point of transmission time of some other carriers in the unlicensed frequency band is a second slot, that is, $\#7^{th}$ OFDM symbol of the subframe. As shown in FIG. 22, the eNB has configured 16 carriers for the UE. The eNB predicts to schedule 9 carriers in subframe n, which are respectively CC2, CC3, CC5, CC7, CC8, CC9, CC11, CC14 and CC15. Transmission of carriers in the licensed frequency band may be determined in advance, which may be started from $\#0^{th}$ OFDM symbol. However, transmission of carriers in the unlicensed frequency band may depend on LBT. In FIG. 22, LBT has been completed by CC11 and CC15 before subframe n. Thus, transmission in subframe n may be determined before subframe n. And it may be determined to start transmission from $\#0^{th}$ OFDM symbol. However, LBT has not been completed by CC7 and CC9 before subframe n. Subsequently, CC7 and CC9 continuously perform LBT in subframe n, until the LBT is completed before the second slot of subframe n. Thus, transmission in subframe n may be determined within subframe n. And it is determined to start transmission from $\#7^{th}$ OFDM symbol. Since LBT has not been completed by CC8 and CC14 before the second slot, transmission of CC8 and CC14 cannot be initiated within subframe n. Subsequently, time of preparing for bits of DCI with DAI of each carrier may be earlier or later. Transmission time of DCI may be started from $\#0^{th}$ OFDM symbol, or from $\#7^{th}$OFDM symbol. Thus, when numbering DAI according to an ascending order of carrier index, for a carrier with smaller carrier index number and later downlink transmission time, or for a carrier with greater carrier index number and earlier downlink transmission time, DAI number thereof cannot be determined. For example, regarding CC11 and CC15 in FIG. 22, carrier index number thereof is greater than that of CC7, CC8 and CC9. However, when generating DAI numbers of CC11 and CC15, whether it is necessary to reserve DAI numbers for carriers CC7, CC8 and CC9 cannot be determined, since eNB cannot determine whether carriers CC7, CC8 and CC9 can be transmitted within the same subframe. There is no ideal solution for such problem.

In addition, 3GPP also studies another type of DAI, which indicates the total number of all the downlink transmissions scheduled within current subframe. DCI of each downlink carrier scheduled within current subframe includes DAI. When all the carriers are in the licensed frequency band, whether all the carriers are transmitted within current subframe are determined in advance. Besides, all the carriers are transmitted simultaneously. When the aggregated carriers include carriers in the unlicensed frequency band, since whether carriers in the unlicensed frequency band can be transmitted within current subframe cannot be accurately predicted before current subframe, the total number of downlink carriers scheduled within the subframe cannot be accurately reflected by DAI in DCI, in which transmission of the DCI is started from $\#0^{th}$ OFDM symbol of subframe boundary. As shown in FIG. 22, all the carriers transmitted within subframe n cannot be counted by DAI in DCI of CC2, CC3, CC5, CC11 and CC15, transmissions of which are started from $\#0^{th}$ OFDM symbol of subframe boundary. That is, whether CC7, CC8, CC9 and CC14 can be transmitted within the second slot of subframe n cannot be counted. There is also no ideal solution for foregoing problem.

The foregoing problem also exists in a time division duplex (TDD) system.

In addition, accompanying with emergencies of new services, higher requirements have been put forward for time delay of wireless transmissions. Requirements of time delay cannot be satisfied by current subframe length of 1 ms, which is taken as the minimum time transmission interval (TTI). Thus, a shorter TTI, e.g., 1 subframe with 0.5 ms, or 1 OFDM symbol with 66.7 us, will be included in the study of 3GPP. And then, some carriers among multiple carriers may employ TTI of 1 ms, while some other carriers may employ a shorter TTI. Transmission of the shorter TTI may be started from an intermediate position of 1 ms subframe. Thus, current DAI indication cannot be applicable.

In the TDD system, the number of HARQ-ACK bits to be fed back by the UE in an uplink subframe n is determined by an HARQ-ACK time-frequency bundling window, a Downlink Assignment Index (DL DAI) carried in UL Grant (UG) of subframe n, number of carriers configured for the UE, and the transmission mode configured for each carrier, in which:

the HARQ-ACK time-frequency bundling window is determined by a TDD uplink-downlink configuration corresponding to a HARQ-ACK timing relationship followed by the HARQ-ACK fed back of the UE, denoting all downlink subframes on one carrier whose HARQ-ACK is to be fed back in subframe n. The indexes of the downlink subframes are denoted by n–$k_i$, $k_i \in K$, wherein the dimension M of the set K is referred to as the size of the time-frequency bundling window. At present, the set K determined by the LTE standard with respect to the HARQ timing relationships corresponding to different TDD uplink-downlink configurations is as shown in Table 2. For facilitating the description, the subframe set K corresponding to the time-frequency bundling window determined by the HARQ timing relationship of FDD is defined as {4}, M=1 at this time.

UL DAI denotes a maximum number of downlink subframes actually have downlink HARQ transmission in the time-frequency bundling window configured for each carrier of the UE. For each carrier configured for the UE, the number of downlink subframes need to feed back HARQ-ACK in subframe n is Bc=min(Mc, UL DAI), wherein min denotes an operation of obtaining a minimum value, Mc denotes the size of the time-frequency bundling window corresponding to the carrier c. If the transmission mode of the current carrier is one TB, the number of HARQ-ACK bits corresponding to this carrier is Oc=Bc, and each subframe corresponds to one HARQ-ACK bit. If the transmission mode of the current carrier is two TBs, the number of HARQ-ACK bits corresponding to the carrier is Oc=2×Bc, and each downlink subframe corresponds to two HARQ-ACK bits.

TABLE 2

Table 2 set K: $\{k_0, k_1, \ldots, k_{M-1}\}$ determined by different HARQ timing relationships

| TDD uplink-downlink configuration | Subframe index | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the TDD system, the HARQ-ACK bit sequence needs to be fed back by the UE is determined by a sum $O_{UE}$ of HARQ-ACK bits corresponding to all carriers. If $O_{UE}$ is not larger than 20, the HARQ-ACK bit of each carrier is arranged according to an ascending order of the carrier indexes to form the HARQ-ACK bit sequence to be fed back by the UE. Otherwise, if $O_{UE}$ is larger than 20, for all carriers whose transmission mode is two TBs, an "OR" calculation (i.e., spatial bundling) is performed to the two HARQ-ACK bits corresponding to two TBs of each subframe, to obtain one HARQ-ACK bit. For the carriers whose transmission mode is one TB, the HARQ-ACK bit corresponding to each subframe is remained unchanged. After the above processing, the HARQ-ACK bit of each carrier of the UE is arranged according to the ascending order of the carrier indexes to generate the HARQ-ACK bit sequence to be fed back by the UE.

It can be seen from the above description that, in the HARQ-ACK feedback mechanism defined by existing standard (LTE Release-12 and those before Release-12), the HARQ-ACK bit sequence finally fed back by the UE may include a HARQ-ACK bit corresponding to a downlink subframe which has no downlink HARQ transmission. For example, in the FDD system, whether or not there is downlink HARQ-ACK transmission on the carrier, the HARQ-ACK bit sequence fed back by the UE always includes an HARQ-ACK bit corresponding to that carrier. In the TDD system, the UE determines the number of downlink subframes having downlink HARQ transmission on each carrier according to Bc, but the value of Bc may be larger than the number of downlink subframes actually having downlink HARQ transmission in the time-frequency bundling window corresponding to the carrier. According to the current standard, the UE supports at most 5 carriers. Therefore, the existence of the nonsense HARQ-ACK bit does not have much impact to the system performance.

However, in order to further increase the downlink peak rate of the UE, it is well recognized by 3GPP member companies that the maximum number of carriers supported by the UE should be increased. The number of carriers supported by the UE will be increased to 32, wherein carriers on the unlicensed band may be included. With the increase of the number of downlink carriers supported by the UE, the absolute value of non-scheduled downlink subframes may increase accordingly. Therefore, the impact brought out by the nonsense HARQ-ACK bit is enlarged. In this case, if the current HARQ-ACK feedback mechanism is still utilized, the efficiency for feeding back information will decrease and finally affect the downlink peak rate of the UE, which contradicts to the initial objective of increasing the number of carriers. Therefore, in LTE Release-13, new bits are introduced, Total DAI and counter DAI (TS 36.212 Table 5.3.3.1.2-2). In the TDD system, the Total DAI indicates a total number of scheduled PDSCHs in all subframes and on all carriers from the first subframe to a current subframe in the HARQ-ACK time-frequency bundling window. The counter DAI indicates a total number of scheduled PDSCHs on all carriers before the current subframe in the HARQ-ACK bundling window and the scheduled PDSCHs on carriers from a carrier with minimum index to the carrier in the current subframe. In the FDD system, the total DAI indicates a total number of scheduled PDSCHs on all carriers in the current subframe, and the counter DAI indicates a total number of scheduled PDSCHs on carriers from a carrier with minimum index to the carrier in the current subframe. When the UE feeds back the HARQ-ACK, the number of HARQ-ACK bits is determined according to the total DAI, and the sequence of the HARQ-ACK bits is determined according to the counter DAI.

With the increasing shortage of spectrum resources, 3GPP begins the research on data transmission on unlicensed band. In LTE Release-13, an LTE device may operate on both the licensed band and the unlicensed band at the same time, via a carrier aggregation or double connection manner. An apparent difference between a licensed carrier and an unlicensed carrier is that, data transmission of the LTE device on the unlicensed band is based on listen before talk (LBT), i.e., the LTE device has to sense a busy/idle state of the unlicensed carrier. Only when the unlicensed carrier is idle, the LTE device is able to transmit on the carrier. Since the LTE device cannot accurately predict when the unlicensed carrier will be idle, the transmission of the LTE device on the unlicensed carrier is uncertain, i.e., it cannot be predicted that whether it can transmit in subframe n.

SUMMARY

In LTE Release-14 system, uplink control signal can be transmitted on the unlicensed band. Since the transmission is based on LBT and the unlicensed band does not have a fixed uplink-downlink configuration, and the UE also cannot ensure that it can transmit uplink signal in an uplink subframe, when the uplink control signal is transmitted on the unlicensed carrier, the HARQ-ACK feedback cannot be transmitted according to the semi-statically configured HARQ-ACK timing. Therefore, how to effectively transmit uplink control signal on the unlicensed carrier is an urgent problem to be solved.

Embodiments of the present disclosure provide a method for feeding back HARQ-ACK information. The method includes:

in a time-frequency bundling window corresponding to an uplink subframe in a feedback window of a first uplink subframe for feeding back HARQ-ACK, receiving a physical downlink control channel (PDCCH) or an enhanced PDCCH (EPDCCH) scheduling downlink HARQ transmission, obtaining a downlink assignment index (DL DAI) in a DL-assignment, and determining a mapping value of each DL DAI;

determining a second uplink subframe for feeding back the HARQ-ACK, and determining an uplink carrier for feeding back the HARQ-ACK;

mapping HARQ-ACK bits of each HARQ feedback unit to corresponding bits of a feedback bit sequence according to the mapping value of the DL DAI; and feeding back the HARQ-ACK bits on the uplink carrier in the second uplink subframe.

In some embodiments, the first uplink subframe for feeding back the HARQ-ACK is determined according to indication information in received physical layer signaling, and/or the first uplink subframe for feeding back the HARQ-ACK is determined according to a reference carrier and an HARQ-ACK timing of a carrier on which PDSCH is received.

In some embodiments, the feedback window of the first uplink subframe for feeding back the HARQ-ACK starts from the first uplink subframe, and the length of the feedback window is configurable.

In some embodiments, the second uplink subframe is within the feedback window.

In some embodiments, the time-frequency bundling window includes all downlink subframes whose HARQ-ACK need to be fed back in the first uplink subframe, and the HARQ-ACK of the downlink subframes are arranged according to a predefined rule.

In some embodiments, the mapping the HARQ-ACK bits of each HARQ feedback unit to the corresponding bits of the feedback bit sequence according to the mapping value of the corresponding DL DAI includes: determining whether there is another second uplink subframe which belongs to another feedback window and overlaps with the second uplink subframe;

if there is no other second uplink subframe in other feedback window, determining the number of HARQ-ACK bits according to the number of physical downlink shared channels (PDSCHs) actually being scheduled in all downlink subframes in a time-frequency bundling window of the first uplink subframe corresponding to the second uplink subframe, and determining the sequence of the HARQ-ACK bits according to a predefined rule;

if there is another second uplink subframe in another feedback window, determining a number of first type HARQ-ACK bits according to a maximum number of PDSCHs can be scheduled in all downlink subframes of the time-frequency bundling window of a first uplink subframe corresponding to the another second uplink subframe in the another feedback window, and determining a number of a second type HARQ-ACK bits according to the number of PDSCHs actually being scheduled in all downlink subframes in the time-frequency bundling window of the first uplink subframe corresponding to the second uplink subframe of the feedback window, and determining the sequence of the two types of HARQ-ACK bits according to a predefined rule.

In some embodiments, the number of PDSCHs actually being scheduled is determined according to a received total DAI and/or counter DAI; and/or, The maximum number of PDSCHs can be scheduled is determined according to a number of configured carriers.

In some embodiments, the mapping the HARQ-ACK bits of each HARQ feedback unit to the corresponding bits of the feedback bit sequence according to the mapping value of the corresponding DL DAI includes: determining whether there is another second uplink subframe which belongs to another feedback window and overlaps with the second uplink subframe;

if there is no other second uplink subframe in other feedback window, determining the HARQ-ACK bits according to the PDSCHs actually being scheduled in all downlink subframes in the time-frequency bundling window of the first uplink subframe corresponding to the second uplink subframe of the feedback window;

if there is another second uplink subframe in another feedback window, determining a first type HARQ-ACK bits according to the PDSCHs actually being scheduled in all downlink subframes in the time-frequency bundling window of a first uplink subframe corresponding to the another second uplink subframe in the another feedback window, and determining a second type HARQ-ACK bits according to the PDSCHs actually being scheduled in all downlink subframes of the time-frequency bundling window of the first uplink subframe corresponding to the second uplink subframe of the feedback window, and determining a sequence of the two types of HARQ-ACK bits according to a predefined rule.

In some embodiments, the number of PDSCHs actually being scheduled is determined according to at least the received total DAI and/or counter DAI.

In some embodiments, the predefined rule includes: determining the sequence of the two types of HARQ-ACK bits according to a sequence of the first uplink subframes respectively corresponding to the two types of HARQ-ACK bits, wherein the HARQ-ACK bits corresponding to the first uplink subframe which is earlier in time are placed in the front, and the HARQ-ACK bits corresponding to the first uplink subframe which is latter in time are placed behind.

In some embodiments, values of the total DAI and/or counter DAI are determined cumulatively in time-frequency bundling windows corresponding to all uplink subframes in the feedback window.

In some embodiments, the determining the uplink carrier for feeding back the HARQ-ACK includes:

determining the uplink carrier for feeding back the HARQ-ACK according to indication information in received physical layer signaling; and/or determining the uplink carrier for feeding back the HARQ-ACK according to a current channel busy/idle state, and/or determining the uplink carrier for feeding back the HARQ-ACK according to indication information in received higher layer signaling, wherein the uplink carrier merely responsible for feeding back the HARQ-ACK of an unlicensed carrier is a first uplink carrier, and the uplink carrier responsible for feeding back the HARQ-ACK of licensed carrier and/or unlicensed carrier is a second uplink carrier.

In some embodiments, the process of determining the uplink carrier for feeding back the HARQ-ACK according to the channel busy/idle state further includes: if the channel is currently busy, an index of an uplink carrier for feeding back the HARQ-ACK corresponding to the current subframe is 1 less than that of the uplink carrier for feeding back the HARQ-ACK corresponding to a next subframe.

In some embodiments, when feeding back the HARQ-ACK on the first uplink carrier and mapping the HARQ-ACK bits of each HARQ feedback unit to the corresponding bits of the feedback bit sequence according to the mapping value of the corresponding DL DAI, determining the HARQ-ACK bits according to the PDSCHs actually being scheduled in all downlink subframes in the time-frequency bundling window corresponding to the first uplink carrier; and/or feeding back the HARQ-ACK on the second uplink carrier, and do not feeding back the HARQ-ACK on the first uplink carrier, determining the number of a first type HARQ-ACK bits according to a maximum number of PDSCHs can be scheduled in all downlink subframes in the time-frequency bundling window corresponding to one of the first uplink carrier and the second uplink carrier which one has a minimum carrier index, and determining a number of second type HARQ-ACK bits according to the PDSCHs actually being scheduled in all downlink subframes in the time-frequency bundling window corresponding to one of the first uplink carrier and the second uplink carrier which has a maximum carrier index; the first type HARQ-ACK bits are arranged in the front and the second type HARQ-ACK bits are arranged behind the first type HARQ-ACK bits.

In some embodiments, the number of PDSCHs actually being scheduled is determined according to a received total DAI and/or counter DAI; and/or the maximum number of PDSCHs can be scheduled is determined according to a number of configured carriers.

Embodiments of the present disclosure further provide a method for feeding back channel state information (CSI), including:

in an uplink subframe for feeding back uplink control information including at least CSI, determining a third uplink carrier on a licensed band for feeding back the uplink control information, and determining an uplink physical channel for carrying the uplink control information on the third uplink carrier; and feeding back the uplink control information including at least the CSI on the uplink physical channel on the third uplink carrier.

In some embodiments, periodic CSI of an unlicensed carrier is transmitted on a Pcell or a licensed carrier configured by a base station; if the uplink control information includes merely the periodic CSI, the uplink control information is transmitted on the primary cell or PUCCH on the licensed carrier configured by the base station; and/or if the uplink control information includes both periodic CSI and HARQ-ACK, and a physical uplink shared channel (PUSCH) is scheduled on at least one licensed carrier, a UE transmitting the periodic CSI on one of the at least one licensed carrier where the PUSCH is scheduled, and transmitting the HARQ-ACK on the Pcell or the PUCCH of the licensed carrier configured by the base station; and/or if the uplink control information includes both periodic CSI and HARQ-ACK, and no PUSCH is scheduled on a licensed carrier, the UE transmitting the HARQ-ACK and the CSI on the Pcell or the PUCCH on the licensed carrier configured by the base station.

The present disclosure also provides a method and device for feeding back and receiving HARQ-ACK information. Subsequently, efficiency for feeding back and receiving HARQ-ACK information may be improved. Downlink peak rate of a UE may also be guaranteed.

To achieve foregoing objectives, the following technical solutions are adopted by the present disclosure.

A method for feeding back hybrid automatic repeat request-acknowledgement (HARQ-ACK) information, including:

receiving, within a time-frequency bundle window corresponding to an uplink subframe feeding back the HARQ-ACK, physical downlink control channel (PDCCH)/enhanced physical downlink control channel (EPDCCH) scheduling each downlink HARQ transmission within the time-frequency bundle window, obtaining a first-category downlink (DL) downlink assignment index (DAI) corresponding to a downlink HARQ transmission in DL-Assignment, and determining a mapping value of each first-category DL DAI; wherein the mapping value of the first-category DL DAI is determined, based on a starting point of the corresponding downlink HARQ transmission within the time-frequency bundle window;

detecting a HARQ feedback unit of each downlink HARQ transmission within the time-frequency bundle window, and determining a corresponding HARQ-ACK bit; and, mapping the HARQ-ACK bit of each HARQ feedback unit within the time-frequency bundle window to a corresponding bit of a feedback bit sequence, based on the mapping value of the first-category DL DAI.

Preferably, the time-frequency bundle window includes time units for transmitting all the downlink HARQ transmissions of an uplink subframe, which feeds back the HARQ-ACK, the time units for transmitting all the downlink HARQ transmissions are sorted according to a set rule, starting point of a time unit within the time-frequency bundle window corresponds to starting point of the HARQ feedback unit transmitted within the time unit.

Preferably, the time unit includes N orthogonal frequency division multiplexing (OFDM) symbols, lengths of different time units within the same time-frequency bundle window are the same or different, N is a set positive integer.

Preferably, when the time-frequency bundle window includes one downlink subframe, a time unit in the time-frequency bundle window is time resource from starting point to end point in a downlink subframe, starting point and end point are respectively $L1^{th}$ OFDM symbol and the last OFDM symbol in the downlink subframe, each time unit is sorted according to sequence of starting point of each time unit, L1 is a set positive integer.

Preferably, when the time-frequency bundle window includes one downlink subframe, the mapping value of the first-category DL DAI of a downlink HARQ transmission within the time-frequency bundle window is to represent total number of HARQ feedback units, which are transmitted by an evolved Node B (eNB) from a first time unit to a time unit for the downlink HARQ transmission within the downlink subframe, and from a first carrier to a carrier for the downlink HARQ transmission of a HARQ feedback unit; or, the mapping value of the first-category DL DAI of a downlink HARQ transmission within the time-frequency bundle window is to represent the total number of HARQ feedback units, which are transmitted by the eNB within a time unit for the downlink HARQ transmission from the first carrier to the carrier for the downlink HARQ transmission.

Preferably, when the time-frequency bundle window includes multiple downlink subframes, a time unit in the time-frequency bundle window is time resource from starting point to end point in a downlink subframe of the multiple downlink subframes, the starting point and end point of the downlink subframe are respectively $L2^{th}$ OFDM symbol and the last OFDM symbol, each time unit is sorted according to sequence of downlink subframe transmitted within each time unit, different time units of the same downlink subframe are sorted according to sequence of starting point of the different time units, L2 is a set positive integer.

Preferably, when the time-frequency bundle window includes multiple downlink subframes, the mapping value of the first-category DL DAI of a downlink HARQ transmission within the time-frequency bundle window is to represent the total number of HARQ feedback units, which are transmitted by the eNB within all the downlink subframes of the time-frequency bundle window, from the first time unit to a time unit for the downlink HARQ transmission, from the first carrier to a carrier for the downlink HARQ transmission, from a first downlink subframe to a downlink subframe for the downlink HARQ transmission within the time-frequency bundle window; or, wherein values of the first-category DL DAI of the same time unit in each downlink subframe of the time-frequency bundle window are continuous; or, wherein values of the first-category DL DAI of a downlink HARQ transmission within the time-frequency bundle window include a subframe-dimension DAI value and a carrier-dimension DAI value, the subframe-dimension DAI value is determined with current method, the carrier-dimension DAI value is to represent the total number of HARQ feedback units, which are transmitted by the eNB within the downlink subframe carrying the downlink HARQ transmission from the first time unit to a time unit for the downlink HARQ transmission, from the first carrier to a carrier for the downlink HARQ transmission.

Preferably, when configured starting point of downlink HARQ transmission of each carrier in unlicensed frequency band is aligned, the first-category DAI of downlink HARQ transmission of carriers in licensed frequency band is less than the first-category DAI of downlink HARQ transmission of carriers in the unlicensed frequency band.

Preferably, when no modulo operation is performed to first-category DAI value, sequence of starting point of each downlink HARQ transmission within the time-frequency bundle window is consistent with an ascending order of corresponding DAI value.

Preferably, the HARQ feedback unit is a downlink subframe, a downlink time unit or a transmission block (TB) with downlink HARQ transmission.

Preferably, the method further includes:

after receiving the PDCCH or EPDCCH, obtaining a second-category DL DAI corresponding to the downlink HARQ transmission in the DL-Assignment, and determining a mapping value of the second-category DL DAI; and, mapping the HARQ-ACK bit of each HARQ feedback unit within the time-frequency bundle window to the corresponding bit of the feedback bit sequence, based on the mapping value of the second-category DL DAI.

Preferably, when the time-frequency bundle window includes one downlink subframe, the mapping value of second-category DL DAI of a downlink HARQ transmission within the time-frequency bundle window is to represent total number of HARQ feedback units, which are transmitted by the eNB on all the carriers from starting point of the time-frequency bundle window to a time unit for the downlink HARQ transmission, or to a time unit for transmitting the DL-Assignment.

Preferably, when the time-frequency bundle window includes multiple downlink subframes, the mapping value of second-category DL DAI of a downlink HARQ transmission within the time-frequency bundle window is to represent total number of HARQ feedback units, which are transmitted by the eNB on all the carriers from the first time unit to a time unit for the downlink HARQ transmission in all the downlink subframes within the time-frequency bundle window, from the first downlink subframe to a downlink subframe for the downlink HARQ transmission within the time-frequency bundle window; or, the second-category DL DAI values of a downlink HARQ transmission within the time-frequency bundle window include a subframe-dimension second-category DAI value and a carrier-dimension second-category DAI value, wherein the subframe-dimension second-category DAI value is determined with current method, the carrier-dimension second-category DAI value is to represent the total number of HARQ feedback units, which are transmitted by the eNB on all the carriers within a downlink subframe carrying the downlink HARQ transmission from the first time unit to the time unit for the downlink HARQ transmission.

Preferably, the mapping value of second-category DL DAI of a downlink HARQ transmission within the time-frequency bundle window is to represent the total number of HARQ feedback units, which are predicted to transmit, or actually transmitted by the eNB on all the carriers from starting point to end point of time-frequency bundle window, or from starting point to the last time unit of a subframe carrying the downlink HARQ transmission within the time-frequency bundle window.

Preferably, the method further includes:

when the total number of HARQ feedback units transmitted by the eNB is less than, or equal to the mapping value of second-category DL DAI of a downlink HARQ transmission before current time, feeding back, by the UE, the HARQ-ACK bit, based on the mapping value of second-category DL DAI of the downlink HARQ transmission, or when the total number of HARQ feedback units actually transmitted by the eNB is greater than the mapping value of second-category DL DAI of the downlink HARQ transmission before current time, the method further includes:

updating, by the eNB, the mapping value of the second-category DL DAI corresponding to current downlink HARQ transmission; and, feeding back, by the UE, the HARQ-ACK bit, based on the updated mapping value of the second-category DL DAI.

Preferably, the mapping value of the second-category DL DAI of a downlink HARQ transmission within the time-frequency bundle window is to represent:

the HARQ feedback units of the downlink HARQ transmission are the last X HARQ feedback units on all the carriers, which are from the starting point of the time-frequency bundle window to a time unit for the downlink HARQ transmission, or to a time unit for transmitting the DL-Assignment, wherein X is a set positive integer, values of X are the same or different corresponding to different mapping values of the second-category DL DAI.

Preferably, the mapping value of the second-category DL DAI of a downlink HARQ transmission within the time-frequency bundle window is to represent:

the HARQ feedback units of the downlink HARQ transmission are the last Y HARQ feedback units, which are predicted to transmit by the eNB on all the carriers from the starting point of the time-frequency bundle window to a time unit for the downlink HARQ transmission, or to a time unit for transmitting the DL-Assignment, wherein Y is a set positive integer, values of Y are the same or different corresponding to different mapping values of the second-category DL DAI.

A method for receiving HARQ-ACK information, including:

transmitting, within a time-frequency bundle window corresponding to an uplink subframe feeding back the HARQ-ACK, PDCCH or EPDCCH scheduling each downlink HARQ transmission within the time-frequency bundle window;

enabling a DL-Assignment in the PDCCH or EPDCCH to carry a first-category DL DAI corresponding to a downlink HARQ transmission, wherein a mapping value of the first-category DL DAI is determined based on starting position of the corresponding downlink HARQ transmission within the time-frequency bundle window;

transmitting a HARQ feedback unit of each downlink HARQ transmission within the time-frequency bundle window;

receiving a feedback bit sequence, and extracting the HARQ-ACK bit of each HARQ feedback unit within the time-frequency bundle window, based on the mapping value of the first-category DL DAI.

Preferably, when the time-frequency bundle window includes one downlink subframe, the mapping value of the first-category DL DAI of a downlink HARQ transmission within the time-frequency bundle window is to represent a total number of HARQ feedback units, which are transmitted by an eNB from a first time unit of the downlink subframe to a time unit for the downlink HARQ transmission, and from a first carrier to a carrier for a downlink HARQ transmission of a HARQ feedback unit; or, the mapping value of the first-category DL DAI of a downlink HARQ transmission within the time-frequency bundle window is to represent the total number of HARQ feedback units, which are transmitted by the eNB within the time unit for the downlink HARQ transmission from the first carrier to the carrier of the downlink HARQ transmission;

wherein the time-frequency bundle window includes time units of all the downlink HARQ transmissions in the uplink subframe feeding back the HARQ-ACK, starting point of a time unit within the time-frequency bundle window corresponds to starting point of HARQ feedback unit transmitted within the time unit, each time unit is sorted according to sequence of starting point of each time unit.

Preferably, when the time-frequency bundle window includes multiple downlink subframes, the mapping value of the first-category DL DAI of a downlink HARQ transmission within the time-frequency bundle window is to represent a total number of HARQ feedback units, which are transmitted by an eNB within all the downlink subframes of the time-frequency bundle window from a first time unit to a time unit of the downlink HARQ transmission, from a first carrier to a carrier of the downlink HARQ transmission, from a first downlink subframe of the time-frequency bundle window to a downlink subframe of the downlink HARQ transmission; or, wherein values of the first-category DL DAI of the same time unit in each downlink subframe within the time-frequency bundle window are continuous; or, values of first-category DL DAI of a downlink HARQ transmission within the time-frequency bundle window includes a subframe-dimension DAI value and a carrier-dimension DAI value, wherein the subframe-dimension DAI value is determined with current method, the carrier-dimension DAI value is to represent the total number of HARQ feedback units, which are transmitted by the eNB within the downlink subframe carrying the downlink HARQ transmission from the first time unit to a time unit for the downlink HARQ transmission, and from the first carrier to a carrier for the downlink HARQ transmission;

wherein the time-frequency bundle window includes time units for all the downlink HARQ transmissions in the uplink subframe feeding back the HARQ-ACK, starting point of a time unit within the time-frequency bundle window corresponds to starting point of HARQ feedback unit transmitted within the time unit, each time unit is sorted according to sequence of downlink subframe of each time unit, different time units in the same downlink subframe are sorted according to sequence of starting point of each time unit.

Preferably, the DL-Assignment carries second-category DL DAI corresponding to the downlink HARQ transmission; and the HARQ-ACK bit is extracted based on the mapping value of the second-category DL DAI.

Preferably, when the time-frequency bundle window includes one downlink subframe, the mapping value of the second-category DL DAI of a downlink HARQ transmission within the time-frequency bundle window is to represent the total number of HARQ feedback units, which are transmitted by the eNB on all the carriers from starting point of the time-frequency bundle window to a time unit for the downlink HARQ transmission, or to a time unit for transmitting the DL-Assignment.

Preferably, when the time-frequency bundle window includes multiple downlink subframes, the mapping value of the second-category DL DAI of a downlink HARQ transmission within the time-frequency bundle window is to represent the total number of HARQ feedback units, which are transmitted by the eNB on all the carriers and all the downlink subframes within the time-frequency bundle window, from the first time unit to a time unit for the downlink HARQ transmission, from the first downlink subframe of the time-frequency bundle window to a downlink subframe for the downlink HARQ transmission; or, wherein values of the second-category DL DAI of a downlink HARQ transmission within the time-frequency bundle window include a subframe-dimension second-category DAI value and a carrier-dimension second-category DAI value, the subframe-dimension second-category DAI value is determined with current method, the carrier-dimension second-category DAI value is to represent the total number of HARQ feedback units, which are transmitted by the eNB on all the carriers within the downlink subframe carrying the downlink HARQ transmission, from the first time unit to the time unit for the downlink HARQ transmission.

Preferably, the mapping value of the second-category DL DAI of a downlink HARQ transmission within the time-frequency bundle window is to represent the total number of HARQ feedback units, which are predicted to transmit, or actually transmitted by the eNB on all the carriers from starting point to end point of the time-frequency bundle window, or from starting point of the time-frequency bundle window to the last time unit of the subframe for the downlink HARQ transmission within the time-frequency bundle window.

Preferably, the method further includes:

when the total number of HARQ feedback units transmitted by the eNB is less than, or equal to the mapping value of the second-category DL DAI of a downlink HARQ transmission before current time, feeding back, by the UE, the HARQ-ACK bit, based on the mapping value of the second-category DL DAI of the downlink HARQ transmission; or, when the total number of HARQ feedback units actually transmitted by the eNB is greater than the mapping value of the second-category DL DAI of the downlink HARQ transmission before current time, updating, by the eNB, the mapping value of the second-category DL DAI corresponding to current downlink HARQ transmission, and feeding back, by the UE, the HARQ-ACK bit based on the updated mapping value of the second-category DL DAI.

Preferably, the mapping value of the second-category DL DAI of a downlink HARQ transmission within the time-frequency bundle window is to represent:

the HARQ feedback units in the downlink HARQ transmission are the last X HARQ feedback units on all the carriers, which are from the starting point of the time-frequency bundle window to a time unit for the downlink HARQ transmission, or to a time unit for transmitting the DL-Assignment, wherein X is a set positive integer, values of X are the same or different corresponding to different mapping values of the second-category DL DAI; or, the mapping value of the second-category DL DAI of a downlink HARQ transmission within the time-frequency bundle window is to represent:

the HARQ feedback units of the downlink HARQ transmission are the last Y HARQ feedback units, which are predicted to transmit by the eNB on all the carriers from the starting point of the time-frequency bundle window to the time unit for the downlink HARQ transmission, or to the time unit for transmitting the DL-Assignment, wherein Y is a set positive integer, values of Y are the same or different corresponding to different mapping values of the second-category DL DAI.

An apparatus for feeding back hybrid automatic repeat request acknowledgement (HARQ-ACK) information, comprising, a receiving module, configured to receive a DL-GRANT scheduling downlink HARQ transmission in a time-frequency bundling window corresponding to an uplink subframe for feeding back HARQ-ACK and/or time-frequency bundling windows corresponding to all uplink subframes in a feedback window of uplink subframes for feeding back HARQ-ACK, obtain a DL DAI in the DL-GRANT, and determine a mapping value of each DAI; and a detecting module, configured to detect a HARQ feedback unit of each downlink HARQ transmission within the time-frequency bundle window, and determine a corresponding HARQ-ACK bit; and, a feedback module, configured to map HARQ-ACK bits of each HARQ feedback unit to corresponding bits of a feedback bit sequence according to the mapping value of the corresponding DAI.

An apparatus for receiving HARQ-ACK information, including a transmitting module and a receiving module, wherein the transmitting module is to transmit, within a time-frequency bundle window corresponding to an uplink subframe feeding back the HARQ-ACK, a PDCCH or an EPDCCH scheduling each downlink HARQ transmission within the time-frequency bundle window, enable a DL-Assignment to carry a first-category DL DAI of a corresponding downlink HARQ transmission, wherein a mapping value of the first-category DL DAI is determined, based on starting point of the corresponding downlink HARQ transmission within the time-frequency bundle window, and the transmitting unit is further to transmit a HARQ feedback unit of each downlink HARQ transmission within the time-frequency bundle window; and, the receiving module is to receive a feedback bit sequence, and extract a corresponding HARQ-ACK bit of each HARQ feedback unit within the time-frequency bundle window, according to the mapping value of the first-category DL DAI.

Based on foregoing technical solutions, it can be seen that in the present disclosure, within a time-frequency bundle window corresponding to an uplink subframe feeding back HARQ-ACK, receive PDCCH or EPDCCH scheduling each downlink HARQ transmission within the time-frequency bundle window, obtain a first-category DL DAI corresponding to a downlink HARQ transmission in DL-Assignment, and determine a mapping value of each first-category DL DAI. Detect a HARQ feedback unit in each downlink HARQ transmission within the time-frequency bundle window, and determine a corresponding HARQ-ACK bit. Map the HARQ-ACK bit of each HARQ feedback unit within the time-frequency bundle window to a corresponding bit of a feedback bit sequence, based on the mapping value of the first-category DL DAI. In the foregoing process, the mapping value of the first-category DL DAI is determined, based on starting point of corresponding downlink HARQ transmission within the time-frequency bundle window. Thus, number of scheduled downlink carriers of each current time may be correctly reflected by DL DAI. Efficiency of feedback and reception of HARQ-ACK may be improved, and downlink peak rate of UE may be guaranteed.

DETAILED DESCRIPTION

Figure 1:
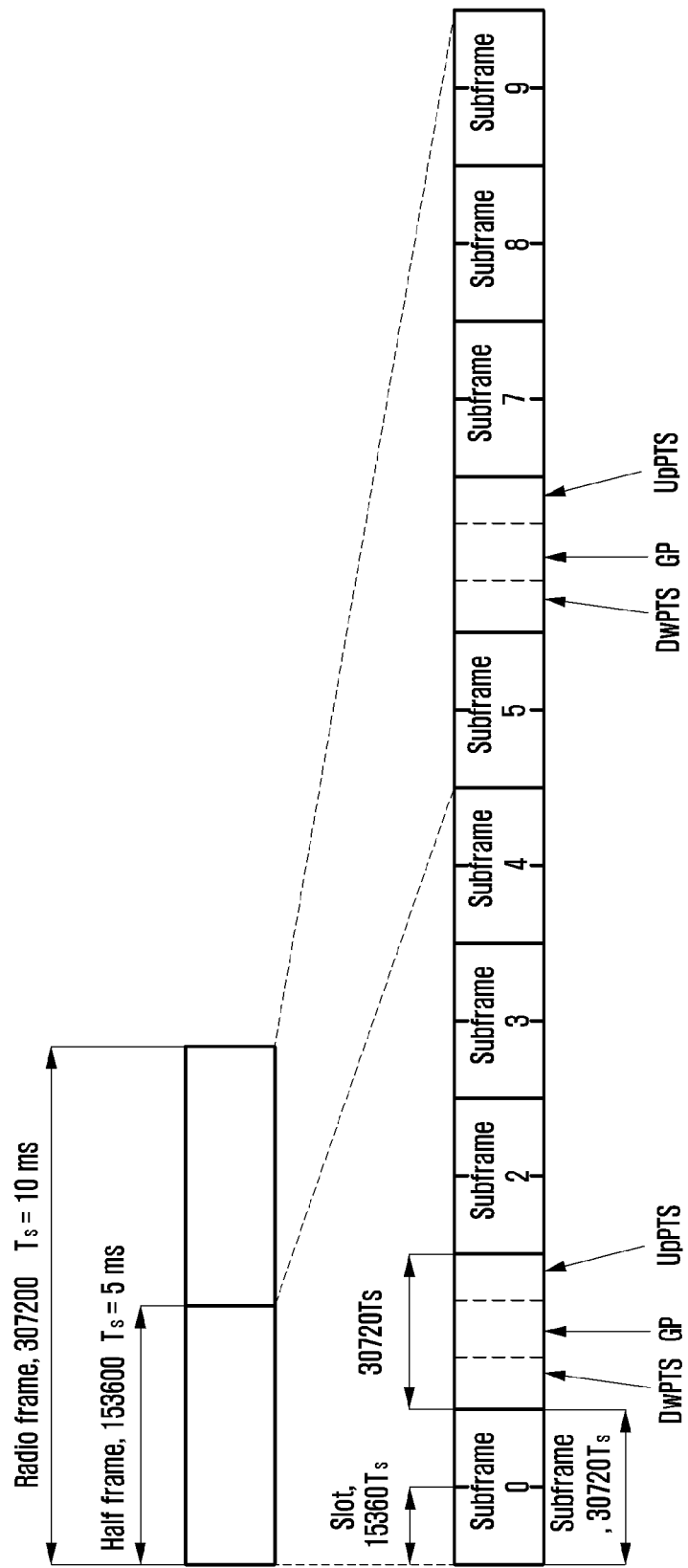
FIG. 1 is a schematic diagram illustrating a frame structure of an existing TDD system.

The present disclosure will be described in detail hereinafter with reference to accompanying drawings and embodiments to make the technical solution and merits therein clearer.

In current HARQ-ACK feedback mechanism, the timing of uplink subframe responsible for carrying ACK/NACK feedback of corresponding PDSCH is fixed. In FDD systems, if a UE receives the PDSCH in subframe n, the UE feeds back HARQ-ACK information on a corresponding uplink carrier of subframe n+k, wherein k is a pre-defined value, e.g., k=4. The uplink carrier may be a primary uplink carrier (Pcell) or a primary secondary uplink carrier (pScell). In TDD systems, as described in the background, the system semi-statically configures the uplink-downlink configuration (as shown in Table 1) or dynamically indicates the uplink-downlink configuration on the basis of the semi-static configuration. Thus, the UE is able to determine a unique value of k (as shown in Table 2) for the subframe n+k responsible for the HARQ-ACK feedback of the PDSCH of each downlink subframe according to the uplink-downlink configuration.

However, in LAA systems, since the uplink-downlink configuration of unlicensed carrier varies dynamically and is not limited to the existing 7 uplink-downlink configurations in TDD systems, if the HARQ-ACK is transmitted on the unlicensed carrier, the value of k of subframe n+k responsible for the HARQ-ACK feedback of the PDSCH of downlink subframe n cannot be determined according to the current TDD configuration and Table 2. In order to solve this problem, one method is: not dynamically change the value of k according to the uplink-downlink subframe situation of the unlicensed carrier, but determine the value of k according to the uplink-downlink configuration of a licensed carrier. Another method is: dynamically indicate the value of k via physical layer signaling. The indication may be explicit or implicit. For example, the value of k may be determined through (1) explicitly indicating the value of k in downlink DCI scheduling the PDSCH, or (2) explicitly indicating, in downlink common DCI which is used for indicating uplink-downlink transmission burst information, the value of k or the uplink-downlink subframe configuration information, so as to determine the value of k. In the embodiments of the present disclosure, manner (1) or (2) may be applied.

Another problem of the LAA system relies in that, if an uplink subframe in which the base station expects the UE to transmit uplink control signal cannot be used for uplink transmission, e.g., in the subframe, channel is occupied by WiFi, then (1) the UE needs to try to transmit on another carrier in the subframe, or (2) try to transmit in another subframe on the same carrier, or (3) a combination of the above. In embodiments of the present disclosure, any one or any combination of the manners (1), (2) and (3) may be applied.

In embodiments of the present disclosure, the HARQ-ACK information may be carried by PUCCH and/or PUSCH.

In embodiments of the present disclosure, the HARQ-ACK of downlink carriers in the same PUCCH group is generally transmitted on one uplink carrier in the PUCCH group, but not transmitted on the uplink carrier of another PUCCH group, unless a predefined condition is met. For example, the predefined condition is CCA check failed. For another example, the predefined condition is an indication for transmitting on another uplink carrier is received. Thus, the PUCCH group may include the HARQ-ACK information of the downlink carriers of the PUCCH group, or include both the HARQ-ACK information of the downlink carriers of the PUCCH group and the HARQ-ACK information of another group.

In some embodiments, in the PUCCH group, it is not restricted that there is an uplink carrier available for transmitting the PUCCH. For example, in a PUCCH group consists of unlicensed carriers, there may be no PUCCH but merely PUSCH. The PUSCH may carry uplink control information. The carrier transmitting the PUCCH carrying the uplink control information may be configured semi-statically or predefined by standards, e.g., the uplink carrier configured as the pScell, or may be determined according to a predefined rule, e.g., an uplink carrier with a minimum Scellindex among those transmitting PUSCH, or an uplink carrier with a minimum Scellindex among those whose PUSCH is scheduled, or other rules.

In some embodiments, in the PUCCH group, it is defined that there must be an uplink carrier available for transmitting the PUCCH. The carrier transmitting the PUCCH may be configured semi-statically or predefined by standards, e.g. the uplink carrier configured as the pScell, or determined according to a predefined rule.

For facilitating the description, in embodiments of the present disclosure, each of the above PUCCH groups is referred to as a PUCCH group in general. Meanwhile, in embodiments of the present disclosure, the PUCCH group which is able to transmit the PUCCH is referred to as a first type PUCCH group, the PUCCH group which is only able to transmit PUSCH is referred to as a second type PUCCH group. The two types of PUCCH groups may be independent or associated with each other. For example, the second type PUCCH group and the first type PUCCH group may have an intersection or not. When they have an intersection, the second type PUCCH group may be a subset of the first type PUCCH group. In the method for feeding back ACK/NACK provided by the embodiments of the present disclosure, for facilitating the description, it is regarded that the two types of PUCCH groups have no intersection. For example, a PUCCH group consists of unlicensed carriers and includes merely the PUSCH has no intersection with a PUCCH group consists of licensed carriers and includes PUCCH. The embodiments of the present disclosure are also applicable for the cases that they have an intersection.

In some embodiments, the second type PUCCH group may carry merely part of the uplink control information. The remaining uplink control information may be carried by another PUCCH group. In some embodiments, the another PUCCH group may be the first type PUCCH group. In other embodiments, the another PUCCH group may be another second type PUCCH group. For example, in the second type PUCCH group consists of unlicensed carriers, the ACK/NACK information of the unlicensed carriers may be carried by the PUSCH in the PUCCH group, and periodic CSI information of the unlicensed carriers may be carried by PUSCH or PUCCH of another PUCCH group, e.g., carried by the Pcell or pScell transmitting PUCCH or PUSCH of a licensed carrier of another PUCCH group. An example is provided in embodiment 8 of the present disclosure, in which the carrier transmitting the periodic CSI and the carrier transmitting the ACK/NACK of the unlicensed carriers belong to different PUCCH groups.

In the PUCCH group, the value of DAI is counted within the PUCCH group. For example, the base station configures 4 carriers for the UE, wherein CC1~CC2 are licensed carriers and CC3~CC4 are unlicensed carriers, CC3 and CC4 belong to a second type PUCCH group. Thus, the values of DAI of the carriers CC1 and CC2 are counted cumulatively and the values of DAI of the carriers CC3 and CC4 are counted cumulatively. The values of DAI of the two groups are counted individually. In some embodiments, the counting manner of the DAI is configured independently. For example, CC1 and CC2 may be configured with no DAI, a determination is made according to the number of configured carriers when the UE feeds back the HARQ-ACK, e.g., the LTE Rel-12 CA manner. For the CC3 and CC4, a total/counter DAI may be configured, e.g., the LTE Rel-13 CA manner.

Alternatively, in the PUCCH group, the value of the DAI transmitted by the base station is cumulatively counted in multiple PUCCH groups. For example, the base station configures 4 carriers for the UE, wherein CC1~CC2 are licensed carriers, and CC3~CC4 are unlicensed carriers and belong to the second type PUCCH group. Thus, the values of DAI of the four carriers CC1~CC4 are counted cumulatively.

In some embodiments, the uplink carriers for feeding back the uplink control information of the licensed carrier and the unlicensed carrier are different. The HARQ-ACK information of the licensed carrier is transmitted on an uplink carrier of the licensed band, whereas the HARQ-ACK information of the unlicensed carrier is transmitted on an uplink carrier of the unlicensed band or on an uplink carrier of the licensed band when a predefined condition is met. This assumption is applicable in various embodiments of the present disclosure and is not repeated in the following embodiments. However, the present disclosure is not restricted to this assumption.

In the following embodiments, assume that an entity feeding back the HARQ-ACK is a UE, an entity receiving the HARQ-ACK is a base station. The present disclosure is also applicable for other scenarios.

In an existing LTE system, HARQ-ACK feedback is required for PDSCH and PDCCH indicating semi-persistent scheduling (SPS) service. For facilitating the description, the following embodiments describe merely the HARQ-ACK corresponding to the PDSCH. But the present disclosure is applicable for all physical channels requiring HARQ-ACK feedback, not only those having been defined by the current LTE system, but also those will be introduced in new systems.

The other aspects to be considered in the following embodiment is the DAI design. During current research for downlink HARQ transmission, DL DAI in DL Assignment corresponding to downlink HARQ transmission are sorted based on index of each scheduled carrier. Accompanying with emergence of partial subframe of carriers in unlicensed frequency band, and occurrence of shorter TTI supporting smaller time delay, transmission starting position of PDCCH/EPDCCH/PDSCH of different carriers within the same subframe may be different. That is, starting position of downlink HARQ transmission may be different. Thus, DL DAI determined with foregoing method cannot accurately reflect number of scheduled downlink carriers. Subsequently, a UE cannot perform accurate feedback and reception of HARQ based on DL DAI.

Based on foregoing analysis, the present disclosure puts forward a novel solution for feeding back and receiving HARQ-ACK. A corresponding DL DAI of downlink HARQ transmission is set, based on starting position of the downlink HARQ transmission. Thus, number of scheduled downlink carriers of each current time may be correctly reflected by DL DAI. Accuracy and efficiency for feedback and reception of HARQ-ACK may be improved. Downlink peak rate of a UE may be guaranteed, and system performance may also be enhanced.

The solutions provided by the present disclosure include two aspects, which are respectively a method for feeding back HARQ-ACK information at UE side and a method for receiving HARQ-ACK information at eNB side.

Specifically, the method for feeding back HARQ-ACK at UE side may include the following blocks.

In block a, within a time-frequency bundle window corresponding to an uplink subframe feeding back HARQ-ACK, receive PDCCH or EPDCCH scheduling each downlink HARQ transmission within the time-frequency bundle window, obtain a first-category DL DAI corresponding to a downlink HARQ transmission in DL-Assignment, and determine a mapping value of each first-category DL DAI. The mapping value of the first-category DL DAI is determined, based on starting position of the corresponding downlink HARQ transmission within the time-frequency bundle window.

In block b, detect a HARQ feedback unit of each downlink HARQ transmission within the time-frequency bundle window, and determine a corresponding HARQ-ACK bit.

In block c, map the HARQ-ACK bit of each HARQ feedback unit within the time-frequency bundle window to a corresponding bit of a feedback bit sequence, based on the mapping value of the first-category DL DAI.

In the present disclosure, the method for receiving HARQ-ACK information at eNB side includes the following blocks.

In block a1, within a time-frequency bundle window corresponding to an uplink subframe feeding back HARQ-ACK, transmit PDCCH or EPDCCH scheduling each downlink HARQ transmission within the time-frequency bundle window, and enable DL-Assignment in PDCCH or EPDCCH to carry a first-category DL DAI corresponding to a downlink HARQ transmission. Mapping value of first-category DL DAI is determined, based on starting position of corresponding downlink HARQ transmission within the time-frequency bundle window.

In block b1, transmit a HARQ feedback unit of each downlink HARQ transmission within the time-frequency bundle window.

In block c1, receive a feedback bit sequence, extract a corresponding HARQ-ACK bit of each HARQ feedback unit within the time-frequency bundle window, based on the mapping value of the first-category DL DAI.

Based on foregoing methods for feeding back and receiving HARQ, DL DAI is applicable to PDSCH/PDCCH/ EPDCCH transmission with shorter length, e.g. shorter than one subframe. The DL DAI may also accurately reflect the total number of HARQ feedback units, which have been received up to the present time point at which DL assignment is received within the time-frequency bundle window and up to the present carrier of which the DL assignment is received. Subsequently, accuracy for feeding back and receiving HARQ may be improved. Meanwhile, system performance may also be enhanced. Detailed descriptions will be provided for specific implementation of the present disclosure with two embodiments. HARQ feedback method and HARQ reception method correspond to each other. There are repeated contents in specific process. To make descriptions more clear, descriptions will be provided at UE side. Special process at eNB side will be described together.

Embodiment 1

Figure 2:
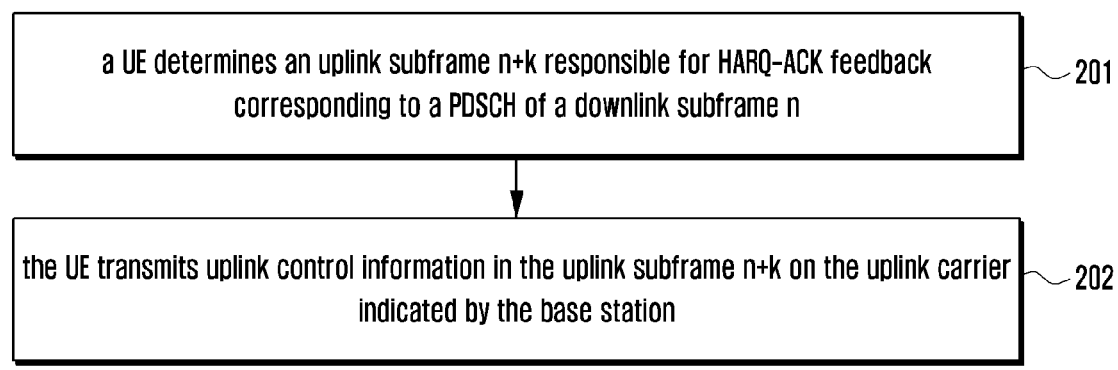
FIG. 2 is a flowchart illustrating a method for feeding back HARQ-ACK information according to some embodiments of the present disclosure.

The present disclosure provides a method for feeding back HARQ-ACK information, as shown in FIG. 2. The method includes the following.

In step 201, a UE determines an uplink subframe n+k responsible for HARQ-ACK feedback corresponding to a PDSCH of a downlink subframe n.

The value of k may be determined according to HARQ-ACK timing of existing FDD-FDD and TDD-FDD carrier aggregation. As to the FDD-FDD, the first FDD corresponds to a reference carrier, and the second FDD corresponds to an unlicensed carrier. As to the TDD-FDD, the TDD corresponds to a reference carrier and the FDD corresponds to an unlicensed carrier. The meaning of the FDD corresponding to the unlicensed carrier is that, when determining the timing for the unlicensed band, the assumption of the FDD is applied.

In some embodiments, for the FDD-FDD situation, i.e., the licensed carriers aggregated with the unlicensed carriers are all FDD carriers, for any downlink subframe n of the unlicensed carriers, the value of k of the uplink subframe n+k for feeding back the HARQ-ACK is the same, and is same as the value of k of the aggregated licensed carriers, e.g., k=4.

In some embodiments, for the TDD-FDD situation, i.e., the licensed carriers aggregated with the unlicensed carriers include both FDD carriers and TDD carriers or include merely TDD carriers, it is possible to determine the value of k of the uplink subframe n+k for feeding back the HARQ-ACK of the downlink subframe n of the unlicensed carriers based on a combination of the HARQ-ACK timing of the reference carrier (as shown in Table 2) determined according to the TDD uplink-downlink configuration and the HARQ-ACK timing of the unlicensed carrier based on the FDD assumption (e.g. k=4).

In some embodiments, the reference carrier is Pcell or pScell.

In some embodiments, the reference carrier is a licensed carrier.

For example, the UE is configured with three carriers, wherein CC1 is a licensed carrier, configured as Pcell and is an FDD carrier, i.e., adopting frame structure 1 defined in TS 36.211, CC2 is a unlicensed carrier and is configured as Scell, i.e., adopting frame structure 3 defined in TS 36.211, CC3 is a unlicensed carrier and is configured as Scell, i.e., adopting frame structure 3 defined in TS 36.211. For any downlink subframe non CC2 or CC3, the value of k of the uplink subframe n+k for feeding back the HARQ-ACK is determined according to the rule of CC1, i.e., k=4.

For another example, the UE is configured with 3 carriers, wherein CC1 is a licensed carriers, configured as Pcell and is a TDD carrier, i.e., adopting frame structure 2 defined by TS 36.211, the uplink-downlink configuration is as shown by configuration 1 of Table 1, DSUUDDSUUD. As such, the timing for the HARQ-ACK feedback corresponds to the values of k corresponding to the uplink-downlink configuration 1 in Table 2, i.e., for downlink subframe #0, the corresponding HARQ-ACK uplink subframe is #7 (k=7), for downlink subframe #1, the HARQ-ACK uplink subframe is #7 (k=6), for downlink subframe #4, the corresponding HARQ-ACK uplink subframe is #8 (k=4), for downlink subframe #5, the corresponding HARQ-ACK uplink subframe is uplink subframe #2 of a next frame (k=7), for downlink subframe #6, the corresponding HARQ-ACK uplink frame is uplink subframe #2 of the next frame (k=6), for downlink subframe #9, the corresponding HARQ-ACK uplink subframe is uplink subframe #3 of the next frame (k=4). CC2 is an unlicensed carrier and is configured as Scell, i.e., adopting frame structure 3 defined by TS 36.211. CC3 is an unlicensed carrier and is configured as Scell, i.e., adopting frame structure 3 defined by TS 36.211. For any downlink subframe n on CC2/CC3, the value of k of the uplink subframe n+k for feeding back the HARQ-ACK is determined according to the rule of CC1, i.e., for downlink subframe #0, the corresponding HARQ-ACK uplink subframe is #7 (k=7); for downlink subframe #1, the corresponding HARQ-ACK uplink subframe is #7 (k=6); for downlink subframe #4, the corresponding HARQ-ACK uplink subframe is #8 (k=4); for downlink subframe #5, the corresponding HARQ-ACK uplink subframe is #2 of next frame (k=7); for downlink subframe #6, the corresponding HARQ-ACK uplink subframe is #2 of next frame (k=6); for downlink subframe #9, the corresponding HARQ-ACK uplink subframe is #3 of next frame (k=4).

In step 202, the UE transmits uplink control information in the uplink subframe n+k on the uplink carrier indicated by the base station.

In some embodiments, the uplink control information includes at least the HARQ-ACK information.

In some embodiments, the uplink carrier indicated by the base station is the Pcell or an unlicensed carrier configured for transmitting the PUCCH.

In some embodiments, the uplink carrier indicated by the base station is the Pcell or an unlicensed carrier determined according to a predefined rule for feeding back the uplink control information.

In some embodiments, indication information for indicating the uplink carrier by the base station is included in DL assignment DCI scheduling the PDSCH, e.g., 1 bit. In some embodiments, new bit(s) may be added in the DL assignment DCI scheduling the PDSCH. In some embodiments, existing bit(s) in the DL assignment DCI scheduling the PDSCH may be re-defined, e.g., TPC bits, at least one combination of the bits may be used for indicating the carrier, e.g., whether the transmission is on the Pcell/pScell, or is on the unlicensed carrier. The re-definition of the existing bit(s) may be configured by the base station. For example, the base station may dynamically indicate which carrier is responsible for the transmission. Thus, three kinds of combinations of the TPC bits may be used for indicating the carrier to transmit ACK/NACK and the corresponding resources on that carrier. One combination of the TPC bits may be used for indicating that there is no carrier fallback. In some embodiments, the indication information is included in the common DCI.

Referring to the example of step 201, the UE is configured with 3 carriers, CC1 is a licensed carrier and is Pcell, CC2/CC3 are unlicensed carriers and CC2 is pScell. Suppose that the uplink control information of CC1 is merely fed back on CC1, and the uplink control information of CC2/CC3 is fed back on CC2. Thus, the indication information of the base station is 1 bit, indicating that whether the HARQ-ACK information is fed back on the Pcell (CC1) or the pScell (CC2).

In some embodiments, the uplink carrier indicated by the base station is not restricted to the Pcell. For example, the base station may semi-statically configure two uplink carriers, e.g., CC2 and CC3. The base station indicates that the HARQ-ACK is fed back on which carrier via physical layer signaling. For another example, the base station may semi-statically configure a fallback uplink carrier corresponding to a second type PUCCH group. The base station dynamically indicates via physical layer signaling whether the HARQ-ACK is fed back on the fallback carrier or the corresponding uplink carrier of the second type PUCCH group. Suppose that the base station configures 4 carriers for the UE, wherein carriers CC1 and CC2 are licensed carriers, CC1 is Pcell, CC3 and CC4 are unlicensed carriers, CC3/CC4 belong to a second type PUCCH group, CC2 is a fallback uplink carrier for the second type PUCCH group. The base station is able to dynamically indicate whether the UE should transmit the HARQ-ACK on CC2 or CC3/CC4.

In some embodiments, the UE determines, according to the HARQ-ACK feedback timing determined based on the reference carrier and the related art, bit length and bit sequence of the HARQ-ACK feedback. Or, the UE may determine the bit length and bit sequence of the HARQ-ACK feedback according to the method provided by embodiment 3.

In some embodiments, if the UE determines the bit length of the HARQ-ACK feedback according to the HARQ-ACK feedback timing determined based on the reference carrier, suppose that the DAI transmitted by the base station is counted individually for different PUCCH groups, when carriers of different PUCCH groups have an intersection, e.g., the second type PUCCH group is a subset of the first type PUCCH group, the total/counter DAI of all carriers in the second type PUCCH group are counted cumulatively, and the total/counter DAI of carriers within the same first type PUCCH group but not included in the second type PUCCH group are counted cumulatively. The two types of DAI are counted independently.

In some embodiments, when transmitting the uplink control information on the carrier indicated by the base station, the UE determines an uplink transmission power according to power control parameters of the carrier.

In some embodiments, when transmitting the uplink control information on the carrier indicated by the base station, the UE needs to determine positions of the resources for transmitting the uplink control information on the carrier. For example, the UE is configured with 3 carriers, CC1 is a licensed carrier and is Pcell, CC2/CC3 are unlicensed carriers and belong to a second type PUCCH group. Suppose that the uplink control information of the CC1 is transmitted on merely CC1. If PUSCH is transmitted on CC2, the uplink control information of CC2/CC3 is fed back on CC2; otherwise, the uplink control information of CC1/CC2/CC3 is fed back on CC1. If the carrier indicated by the base station is CC1, the UE determines, according to the bit length of the uplink control information to be fed back on CC1, a PUCCH format for feeding back the uplink control information on CC1 and transmission resources for the corresponding PUCCH format. For example, if the carrier indicated by the base station is a carrier of the second type PUCCH group, the UE feeds back the HARQ-ACK of CC1 on CC1 and feeds back the HARQ-ACK of CC2 and CC3 on CC2 on which PUSCH is transmitted. The PUCCH on CC1 is of PUCCH format 1a/1b and the PUCCH resources are determined based on CCEs of the PDCCH on CC1. If the carrier indicated by the base station is CC1, the UE feeds back the HARQ-ACK of CC1, CC2 and CC3 on CC1 adopting the PUCCH format 3, the PUCCH resources are indicated by ARI in the DL assignment of CC2/CC3.

In this embodiment, the manner that the base station informs the UE on which carrier the HARQ-ACK is to be fed back has the following advantages: the base station is able to determine, according to the overhead of the uplink control information on the licensed carrier, whether to let the UE to transmit on the licensed carrier such as the Pcell to feed back the HARQ-ACK of the unlicensed carrier. For another example, the base station is able to determine, according to a service situation or CCA situation of the unlicensed carrier, whether to schedule downlink transmission on the unlicensed carrier in the subframe in which HARQ-ACK may be fed back, so as to determine whether to let the UE to transmit on the licensed carrier. For example, if the base station determines to schedule the downlink transmission on the unlicensed carrier in a corresponding HARQ-ACK subframe, the base station may indicate the UE to feed back the HARQ-ACK on the Pcell in the corresponding subframe.

Figure 3:
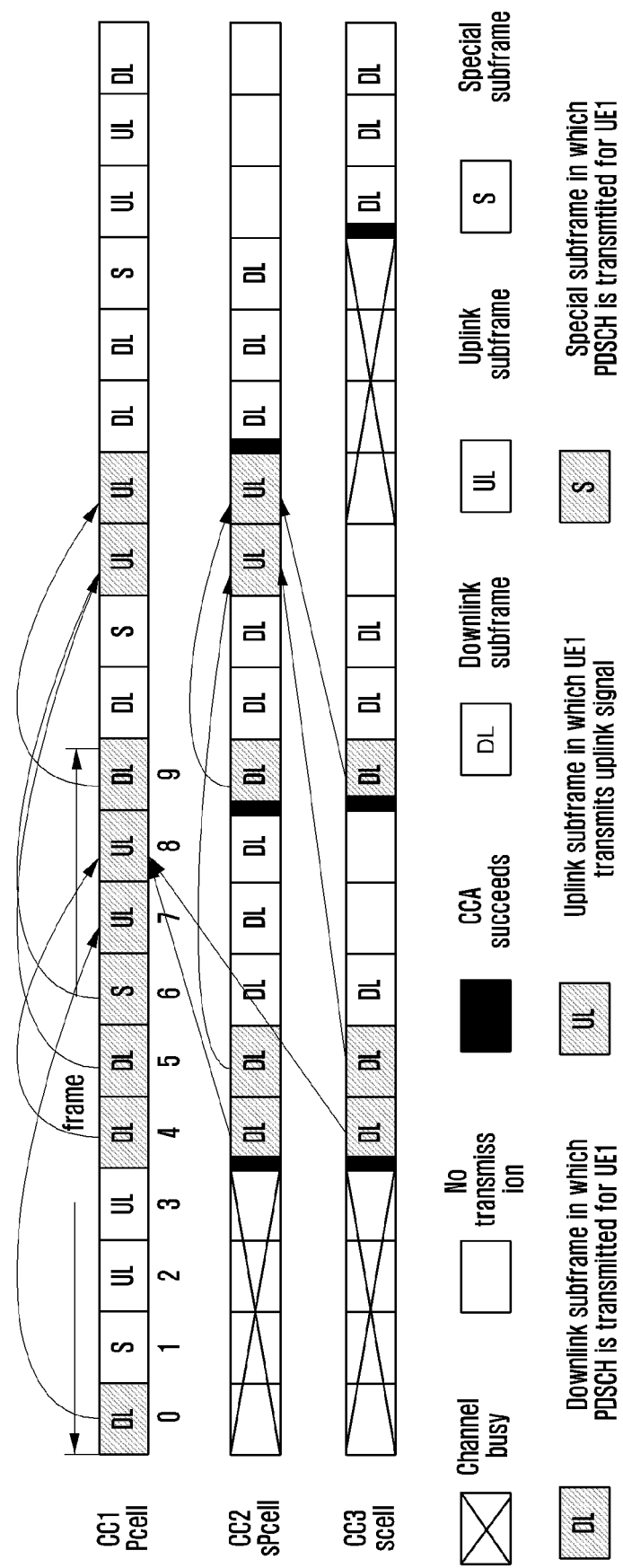
FIG. 3 is a schematic diagram illustrating a method for feeding back HARQ-ACK information based on the HARQ-ACK timing of existing TDD-FDD carrier aggregation according to some embodiments of the present disclosure, in which it is assumed that the unlicensed carrier follows the HARQ-ACK timing of FDD according to some embodiments of the present disclosure.
Figure 4:
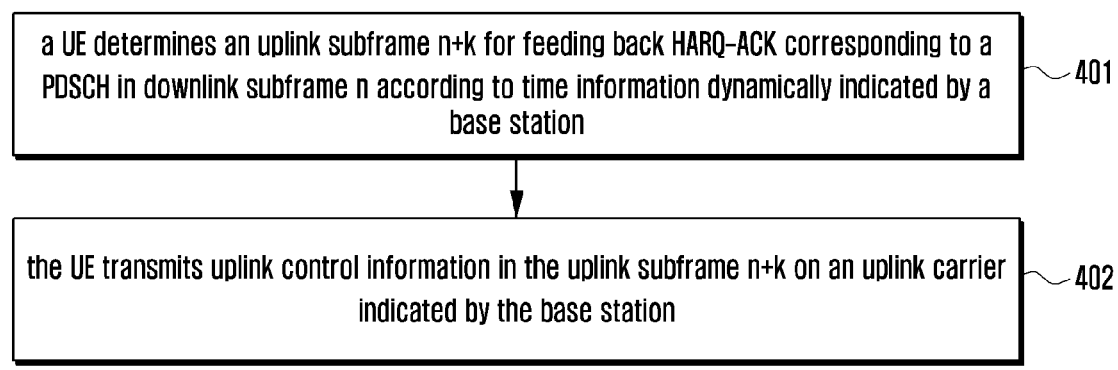
FIG. 4 is a flowchart illustrating another method for feeding back HARQ-ACK information according to some embodiments of the present disclosure.

Several application scenarios are provided to make the solution of the present disclosure easier to be understood. As shown in FIG. 3, UE 1 is configured with 3 carriers. CC1 is a licensed carrier, configured as PCell and is a TDD carrier, the uplink-downlink configuration 1 is adopted. CC2/CC3 are unlicensed carriers, CC2 is a pScell. The base station transmits PDSCH for UE 1 in downlink subframes 0, 4, 5, 6 and 9 of CC1. Then UE 1 feeds back ACK/NACK in uplink subframes 7 and 8 of the same frame and uplink subframes 2, 2, 3 of the next frame. The base station does not seize the channel in downlink subframes 0~3 of CC2, passes the CCA check in subframe 4 and occupies the channel for downlink transmission till subframe 8, performs a CCA check again and occupies the channel from subframe 9 to subframe 2 of the next frame. In subframes 4, 5 and 9, the base station transmits the PDSCH for UE 1. The UE performs uplink transmission in uplink subframes 2 and 3. The base station does not seize the channel in downlink subframes 0~3 on CC3, passes the CCA check in subframe 4 and occupies the channel for downlink transmission till subframe 6, performs a CCA check again and occupies the channel from subframe 9 to subframe 2 of a next frame. In subframes 4, 5 and 9, the base station transmits PDSCH for UE 1. It can be seen that, if the HARQ-ACK timing of CC1 is applied for CC2/CC3, the HARQ-ACK for the PDSCH transmitted in subframe 4 of CC2 and CC3 should be fed back in subframe 8. However, subframe 8 of CC2 is a downlink subframe and cannot transmit the HARQ-ACK. Therefore, the base station may inform UE 1 to feed back the HARQ-ACK of CC1, CC2 and CC3 in the subframe 8 on CC1. For the downlink subframe 5, according to the HARQ-ACK timing of CC1, the HARQ-ACK of the PDSCH transmitted in the downlink subframe 5 of CC2 and CC3 should be fed back in subframe 2 of the next frame. Subframe 2 of CC2 is an uplink subframe. Therefore, the base station may inform UE 1 to feed back the HARQ-ACK of CC2 and CC3 in the subframe 2 of the next frame on CC2. It should be noted that, CC2 and CC3 do not have fixed uplink-downlink configuration. The base station may determine the uplink-downlink configuration according to service amount and busy/idle situation of the channel. In this example, CC2 has a large amount of downlink services. Therefore, the base station may configure less uplink subframes and more downlink subframes for CC2, so as to transmit more downlink services on CC2. At this time, the HARQ-ACK feedback may be dynamically allocated to the Pcell for transmission. For another example, the base station wants to ensure that the HARQ-ACK for a data packet transmitted in downlink subframe 4 on CC3 can be fed back in time. However, the time cannot be ensured if the HARQ-ACK is transmitted on CC2, e.g., UE 1 cannot pass the CCA check if the channel is occupied by WiFi in subframe 8. Therefore, the base station may dynamically schedule UE 1 to transmit the HARQ-ACK on the Pcell.

Embodiment 2

The present disclosure provides a method for feeding back HARQ-ACK information. The method includes the following.

In step 401, a UE determines an uplink subframe n+k for feeding back HARQ-ACK corresponding to a PDSCH in downlink subframe n according to time information dynamically indicated by a base station.

In step 402, the UE transmits uplink control information in the uplink subframe n+k on an uplink carrier indicated by the base station.

Different from embodiment 1, in step 401, the uplink subframe for transmitting the HARQ-ACK determined by the UE is not predefined or determined based on a combination of the configured HARQ-ACK timing of a reference carrier and the HARQ-ACK timing of the unlicensed carrier, but is determined according to physical layer signaling transmitted by the base station.

In some embodiments, the physical layer signaling is DL DCI of DL assignment or common DCI.

In some embodiments, the physical layer signaling is the TPC bits in the DL DCI of the DL assignment, for indicating the uplink subframe for feeding back the HARQ-ACK. For example, in a second type PUCCH group, there is no PUCCH, and the HARQ-ACK is carried by the PUSCH. Therefore, the TPC bits in the Dl DCI are not used for power control of the PUCCH and also not used for indicating resources (ARI) of the PUCCH. The TPC bits may be used for indicating the time information for feeding back the HARQ-ACK. Likewise, the TPC bits may be used for indicating, e.g., resource of aperiodic SRS.

In some embodiments, the base station may indicate the uplink carrier according to the method provided by embodiments of the present disclosure or the related art.

Embodiment 3

Figure 5:
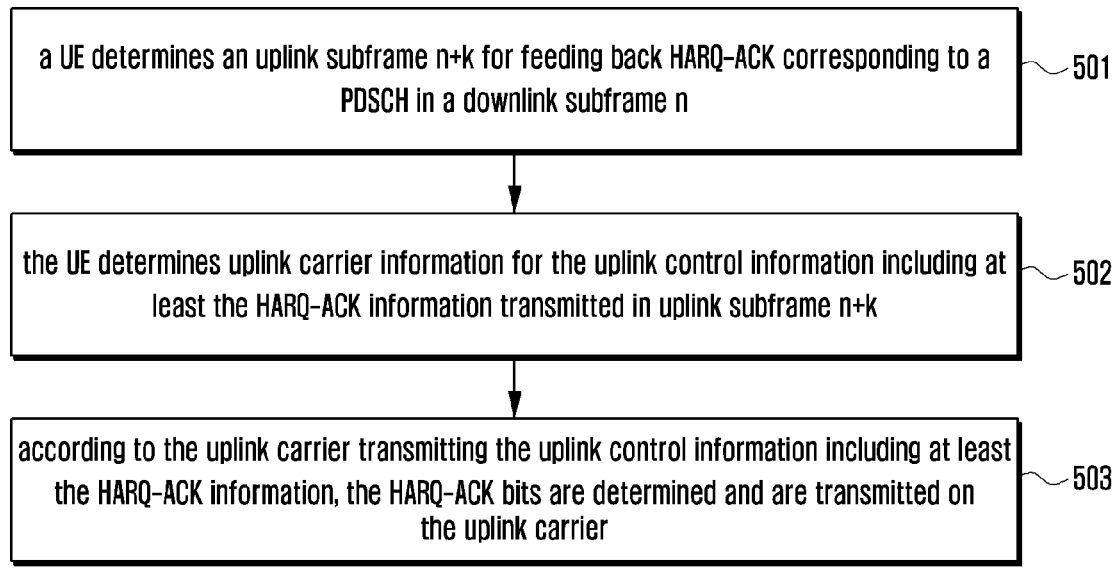
FIG. 5 is a flowchart illustrating yet another method for feeding back HARQ-ACK information according to some embodiments of the present disclosure.

The present disclosure provides a method for feeding back HARQ-ACK information, as shown in FIG. 5. The method includes the following.

In step 501, a UE determines an uplink subframe n+k for feeding back HARQ-ACK corresponding to a PDSCH in a downlink subframe n.

In some embodiments, the UE may determine the uplink subframe n+k according to the method provided by step 201 of embodiment 1 or the method provided by step 401 in embodiment 2.

In step 502, the UE determines uplink carrier information for the uplink control information including at least the HARQ-ACK information transmitted in uplink subframe n+k.

In some embodiments, the uplink carrier information indicates on which uplink carrier the uplink control information containing at least the HARQ-ACK information is transmitted.

In some embodiments, the uplink carrier includes at least a first uplink carrier and a second uplink carrier.

In some embodiments, the first uplink carrier is an unlicensed carrier.

In some embodiments, the first uplink carrier is an uplink carrier available for transmitting PUCCH in a PUCCH group.

In some embodiments, the first uplink carrier is an uplink carrier determined according to a predefined rule and available for transmitting PUSCH containing UCI in a second type PUCCH group.

In some embodiments, the second uplink carrier is a licensed carrier.

In some embodiments, the second uplink carrier is a Pcell.

In some embodiments, the second uplink carrier is the Pcell and is a licensed carrier.

In some embodiments, the second uplink carrier is predefined, e.g., predefined to be the Pcell in standards.

In some embodiments, the second uplink carrier is an uplink carrier available for transmitting PUCCH in a PUCCH group.

In some embodiments, the second uplink carrier is an uplink carrier available for transmitting UCI in the first type PUCCH group.

In some embodiments, the second uplink carrier is semi-statically configured by the base station, e.g., the base station may configure an uplink carrier on the licensed band for each second type PUCCH group. The uplink carrier on the licensed band is available for transmitting PUCCH and the PUCCH carries the HARQ-ACK information of the carriers in the corresponding second type PUCCH group. In some embodiments, the HARQ-ACK information of the licensed carrier is transmitted on the Pcell/Scell of the first type PUCCH group where it belongs to.

In some embodiments, the UE may perform a CCA check on the first uplink carrier before the uplink subframe n+k, if the CCA check is passed, the UE determines to transmit the HARQ-ACK on the first uplink carrier; otherwise, the UE transmits the HARQ-ACK on the second carrier. It should be noted that, the description herein does not consider the situation that the base station transmits a UL grant but the UE fails to detect the UL grant. However, in the case that the UE fails to detect the UL grant, the UE certainly cannot transmit the corresponding PUSCH. In this case, if there is no corresponding PUSCH transmission, the UE transmits the HARQ-ACK on the second carrier.

In some embodiments, the UE may determine whether to transmit the HARQ-ACK on the first or second carrier according to the information indicating the uplink carrier for transmitting the uplink control information transmitted by the base station. The indication information may be transmitted according to the method provided by embodiment 1 or 2.

In some embodiments, the UE may determine whether the HARQ-ACK is fed back on the first or the second uplink carrier according to a total number of bits of the uplink control information can be fed back on the second uplink carrier. For example, suppose that the total number of bits of the HARQ-ACK of the downlink carriers of the PUCCH group corresponding to the second uplink carrier is PUCCH format X, and the sum of the number of bits of the HARQ-ACK should have been fed back on the first uplink carrier and the number of bits of the HARQ-ACK of the downlink carriers of the PUCCH group corresponding to the second uplink carrier is PUCCH format Y. If format X and format Y are same, the UE may transmit on the second carrier to transmit the HARQ-ACK when it cannot be transmitted on the first carrier. If format X and format Y are different, the UE can fed back the HARQ-ACK on merely the first carrier or give up the feedback of the corresponding HARQ-ACK. For another example, PUCCH format X and format Y are same, but the number of PRBs, e.g., 4 PRBs allocated by the base station for the PUCCH format X, is insufficient for carrying the sum of the number of bits of the HARQ-ACK which should have been fed back on the first uplink carrier and the number of bits of the HARQ-ACK of the downlink carriers of the PUCCH group corresponding to the second uplink carrier, e.g., 8 PRBs, the UE is merely able to feed back the HARQ-ACK on the first carrier or give up the feedback of the corresponding HARQ-ACK.

In some embodiments, the UE determines the uplink carrier for transmitting the uplink control information, and further determines the resources of the uplink carrier for transmitting the uplink control information. The resources may be determined according to one or more of the following manners.

Manner 1: if the UE transmits the HARQ-ACK on the second uplink carrier, the PUCCH resources may be indicated by the TPC in the DL assignment of downlink carriers in the second type PUCCH group that the first uplink carrier belongs to (ARI).

For example, if the base station schedules merely the downlink carrier Pcell in the first type PUCCH group that the second uplink carrier belongs to, the TPC in the DL assignment scheduling the downlink carrier Pcell merely indicates the power control information but does not indicate PUCCH resource information, i.e., not ARI. Thus, when the UE transmits, on the second uplink carrier, the HARQ-ACK of the downlink carrier Pcell in the first type PUCCH group and the HARQ-ACK of the downlink carriers of the second type PUCCH group that the first uplink carrier belongs to, the utilized PUCCH resources are indicated by the TPC in the DL assignment of the downlink carriers of the second type PUCCH group that the first uplink carrier belongs to (ARI).

For another example, the TPC in the DL assignment of the downlink carriers in the first type PUCCH group that the second uplink carrier belongs to may indicate the PUCCH resources when merely the HARQ-ACK of the downlink carriers of the first type PUCCH group that the second uplink carrier belongs to is fed back, whereas the TPC in the DL assignment of the downlink carriers in the second type PUCCH group that the first uplink carrier belongs to indicates the PUCCH resources when the HARQ-ACK of the downlink carriers in the first type PUCCH group that the second uplink carrier belongs to and the HARQ-ACK of the downlink carriers of the second type PUCCH group that the first uplink carrier belongs to are fed back on the second uplink carrier.

Manner 2: when the UE transmits HARQ-ACK on the second uplink carrier, the PUCCH resources may be indicated by the TPC in the DL assignment of the downlink carriers in the first type PUCCH group that the second uplink carrier belongs to (ARI).

For example, the TPC in the DL assignment of the downlink carriers in the first type PUCCH group that the second uplink carrier belongs to is able to indicate both the PUCCH resources when merely the HARQ-ACK of the downlink carriers in the first type PUCCH group that the second uplink carrier is fed back, and the PUCCH resources when the HARQ-ACK of the downlink carriers of the first type PUCCH group that the second uplink carrier belongs to and the HARQ-ACK of the downlink carriers in the second type PUCCH group that the first uplink carrier belongs to are fed back. The TPC in the DL assignment of the downlink carriers in the second type PUCCH group that the first uplink carrier belongs to may be used for indicating other information, e.g., indicating time information for feeding back the HARQ-ACK as mentioned in other embodiments, or indicating carrier information, or indicating information about aperiodic SRS, etc.

Manner 3: when the UE transmits the HARQ-ACK on the second uplink carrier, the PUCCH resources may be indicated by the TPC in the DL assignment of the downlink carriers in the second type PUCCH group that the first uplink carrier belongs to and the TPC in the DL assignment of the downlink carriers in the first type PUCCH group that the second uplink carrier belongs to (ARI). The ARI information of the two kinds of TPC are same.

In some embodiments, when the UE transmits HARQ-ACK on the second uplink carrier, the PUCCH format is determined according to the number of bits of the uplink control information can be transmitted, and the resources may be indicated according to the PUCCH format and the TPC in the DL assignment of the downlink carriers of the second type PUCCH group that the first uplink carrier belongs to and/or the TPC in the DL assignment of downlink carriers of the first type PUCCH group that the second uplink carrier belongs to.

In some embodiments, when the UE transmits the HARQ-ACK on the second uplink carrier, the resources for transmitting the uplink control information on the second uplink carrier may be determined according to the method provided by embodiment 1 or according to the related art.

In step 503, according to the uplink carrier transmitting the uplink control information including at least the HARQ-ACK information, the HARQ-ACK bits are determined and are transmitted on the uplink carrier.

Furthermore, if the HARQ-ACK information is transmitted on the first uplink carrier, the transmitted HARQ-ACK information includes merely the HARQ-ACK information corresponding to the PDSCH of the downlink carriers in the PUCCH group that the first uplink carrier belongs to. If the HARQ-ACK information is transmitted on the second uplink carrier, the transmitted HARQ-ACK information includes both the HARQ-ACK information corresponding to the PDSCH of the downlink carriers of the PUCCH group where the first uplink carrier belongs to and the HARQ-ACK information corresponding to the PDSCH of the downlink carriers of the PUCCH group that the second uplink carrier belongs to, and so on.

In some embodiments, the UE sorts the HARQ-ACK bits of the PDSCH of the downlink carriers of the PUCCH group that the first uplink carrier belongs to and the HARQ-ACK bits of the PDSCH of the downlink carriers of the PUCCH group that the second uplink carrier belongs to according to a predefined order. For example, it is possible to sort according to carrier indexes of the first uplink carrier and the second uplink carrier. For example, the HARQ-ACK corresponding to an uplink carrier with a small Scellindex is placed in the front, and the HARQ-ACK corresponding to an uplink carrier with a large Scellindex is placed behind. For another example, if the PUCCH group that the second uplink carrier belongs to includes a Pcell, the HARQ-ACK bits corresponding to the downlink carriers of the PUCCH group are placed in the front, and the HARQ-ACK bits of the PDSCH of the downlink carriers in the PUCCH group that the first uplink carrier belongs to are placed behind. When determining the HARQ-ACK bit length, the UE may use the following manner 1 or 2.

Manner 1: when determining the HARQ-ACK bits of the carrier group placed in the front, the UE determines the number of the HARQ-ACK bits according to a maximum number of bits can be fed back, i.e., the same as the mechanism in LTE Release 12, which determines the number of bits according to the number of configured carriers and information indicated by UL DAI/DL DAI, but not according to the number of PDSCHs (such as total DAI) actually transmitted by the base station. In other words, the base station configures that the number of HARQ-ACK bits of the carrier group placed in the front is determined according to the number of configured carriers, i.e., the HARQ-ACK transmission manner of CA in Rel-12. As to the HARQ-ACK bits of the carrier group placed in the last, if the base station configures that the HARQ-ACK bits are determined according to the number of PDSCHs actually transmitted, the UE determines the number of bits according to the number of PDSCHs actually transmitted (such as total DAI). For example, the HARQ-ACK bits of the PUCCH group that the second uplink carrier belongs to are placed in the most front, suppose that it is a FDD system, the PUCCH group includes 2 carriers, each carrier corresponds to 2 HARQ-ACK bits. Thus, no matter how many carriers that the base station schedules, the UE feeds back 4 bits. If the UE detects the PDSCH and the detection is correct, the UE feeds back an ACK. If the detection is error or the UE fails to detect the PDSCH, the UE feeds back an NACK. This manner has an advantage that, if the UE fails to detect the PDSCH in the PUCCH group that the second uplink carrier belongs to but does not aware of this, it does not affect the UE when arranging the HARQ-ACK bits of the PUCCH group that the first uplink carrier belongs to, which avoids misunderstanding of the base station and the UE about the bit length and bit arrangement of the HARQ-ACK.

In some embodiments, the number of configured carriers refers to the number of carriers configured in one PUCCH group.

Figure 6:
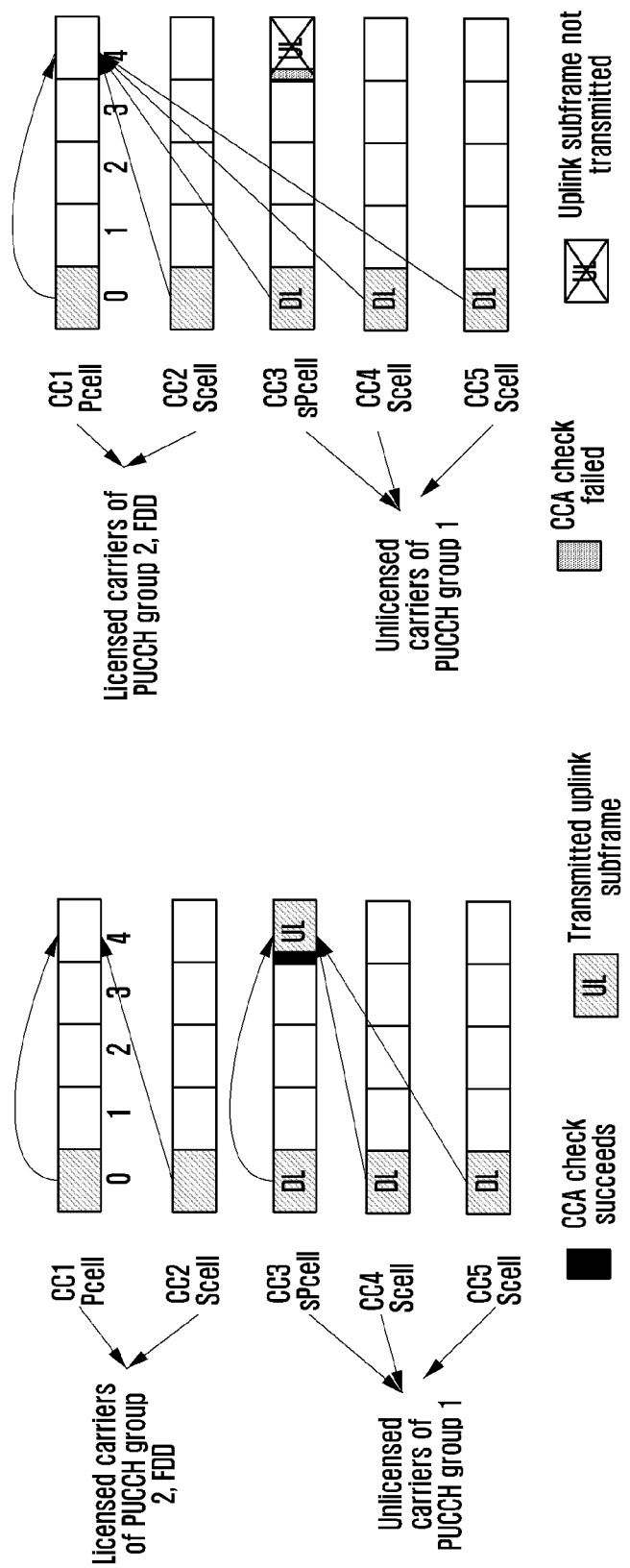
FIG. 6 is a schematic diagram illustrating a method for feeding back HARQ-ACK information via an uplink carrier dynamically selected based on busy/idle state of the carriers according to some embodiments of the present disclosure.

As shown in FIG. 6, UE 1 is configured with 5 carriers, wherein CC1 is a licensed carrier and is a Pcell, CC2 is a licensed carrier and belongs to the same PUCCH group with CC1. These two carriers are both FDD carriers, and the transmission mode (TM) of each of them is to support up to two transmission blocks. CC1 is the second uplink carrier. CC3~CC5 are unlicensed carriers and belong to the same PUCCH group. The transmission mode (TM) of each of them is 2 transmission blocks. CC3 is a pScell and is the first uplink carrier. Suppose that the base station transmits total DAIs. The total DAIs within different PUCCH groups are independent each other. Total DAI=1 is transmitted in the DL DCI on CC1, denoting that merely one PDSCH is transmitted in the second type PUCCH group. Total DAI=2 is transmitted in the DL DCI on CC3 and CC4, denoting that two PDSCHs are transmitted in the first type PUCCH group. Suppose that UE 1 receives the PDSCH on CC1, CC3 and CC4 in subframe 0, UE 1 determines that HARQ-ACK information needs to be fed back in subframe 4. Thus, before subframe 4, UE 1 performs a CCA check on CC3. If the CCA check is passed, UE 1 feeds back the HARA-ACK of CC3 and CC4 on CC3, the number of HARQ-ACK bits is 4; and feeds back the HARQ-ACK of CC1 on CC1, the number of HARQ-ACK bits is 2. However, if the CCA check on CC3 fails, the feedback for the PDSCH of CC1, CC3 and CC4 are transmitted on CC1. At this time, when arranging the HARQ-ACK bits, the UE needs to arrange the HARQ-ACK bits of CC1 and CC2 in the front and then the HARQ-ACK bits of CC3~CC5. In other words, the UE feeds back 4+4 bits, wherein the former 4 bits are the HARQ-ACK bits of CC1 and CC2, the latter 4 bits are HARQ-ACK bits of CC3 and CC4. Although UE 1 correctly receives the total DAI of CC1 and is able to determine that there is merely one PDSCH in the second type PUCCH group, UE 1 still needs to determine the number of bits to be fed back according to the number of carriers CC1+CC2, wherein the ACK/NACK of CC1 is generated according to a CRC check result, and CC2 corresponds to NACK.

Manner 2: if the UE determines in step 502 to transmit the uplink control information containing the HARQ-ACK on the second uplink carrier, the HARQ-ACK bits of all carrier groups is determined according the maximum number of bits can be fed back, i.e., the same as the mechanism in LTE Release 12, which determines the number of bits according to the number of configured carriers and/or information indicated by UL DAI/DL DAI, but not according to the number of PDSCHs actually transmitted by the base station (such as total DAI). However, once the UE determines to feed back on the first uplink carrier, the number of bits is determined according to the number of PDSCHs (such as total DAI) actually transmitted by the base station.

In some embodiments, the UE assumes that the total DAI and/or counter DAI transmitted by the base station are counted individually in each PUCCH group.

In some embodiments, the number of configured carriers refers to the number of carriers configured in one PUCCH group.

The above shows an example for determining the number of bits based on a FDD-FDD scenario. The embodiments of the present disclosure are also applicable for the TDD-FDD scenario, merely the corresponding FDD operations need to be mapped to the TDD operations. For example, in step 503, if the HARQ-ACK is transmitted on the first uplink carrier, the number of bits is determined according to the number of PDSCHs (e.g., total DAI) actually transmitted by the base station according to current TDD system. If the HARQ-ACK is transmitted on the second uplink carrier, the HARQ-ACK of the second type PUCCH group is determined according to the maximum number of bits can be fed back according to the current TDD system.

In another implementation of the this embodiment, if the uplink carrier feeding back the HARQ-ACK corresponding to the first uplink carrier may be the first uplink carrier or the second uplink carrier, e.g., if the determination is made based on the indication of the base station or a CCA check result of the UE as described above, the HARQ-ACK feedback mode of the UE is configured to be determined according to the maximum number of PDSCHs can be transmitted by the base station, i.e., the HARQ-ACK feedback manner of carrier aggregation in LE Release-12. As such, no matter that the UE feeds back the HARQ-ACK on the first or the second carrier, the number of HARQ-ACK bits is always determined according to the maximum number of PDSCHs can be transmitted by the base station.

Embodiment 4

Figure 7:
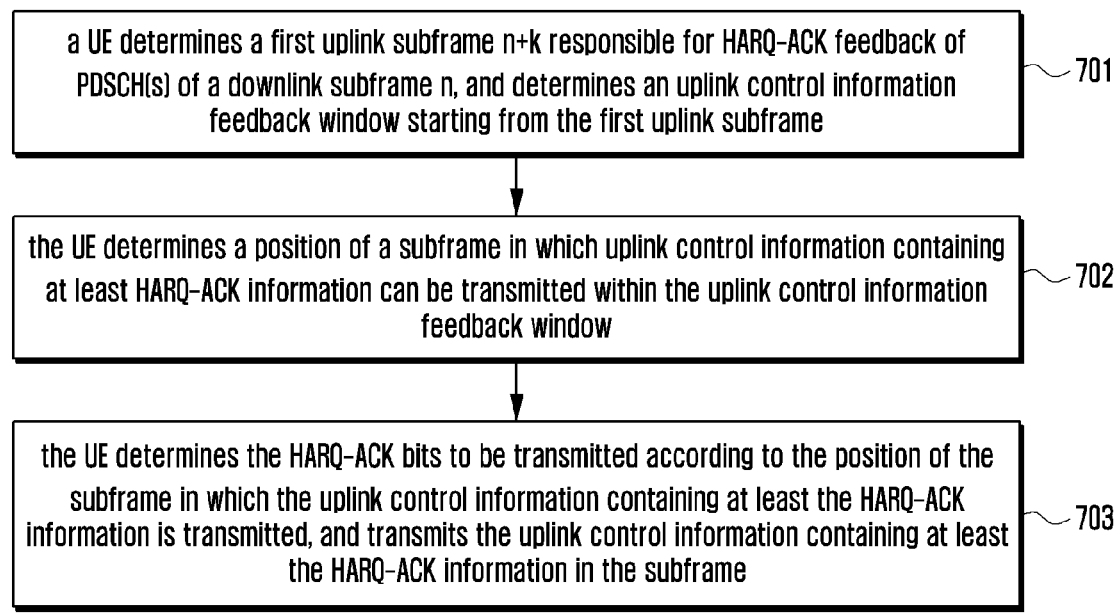
FIG. 7 is a flowchart illustrating still another method for feeding back HARQ-ACK information according to some embodiments of the present disclosure.

The present disclosure provides a method for feeding back HARQ-ACK information. As shown in FIG. 7, the method includes the following.

In step 701, a UE determines a first uplink subframe n+k responsible for HARQ-ACK feedback of PDSCH(s) of a downlink subframe n, and determines an uplink control information feedback window starting from the first uplink subframe.

In some embodiments, the UE may determine the uplink subframe n+k according to the method as described in step 201 of embodiment 1 or the method described in step 401 of embodiment 2.

The uplink control information feedback window may be semi-statically configured by the base station. It is a time window starting from the first uplink frame and having a length of N. In some embodiments, the length N of the feedback window may be 1, i.e., the UE has merely one opportunity to attempt to transmit the uplink control information. In some embodiments, the length N of the feedback window may be an integer larger than 1. When determining the length of the feedback window, a tradeoff between delay of the uplink control information and a transmission probability of the uplink control information may be considered.

Figure 8A:
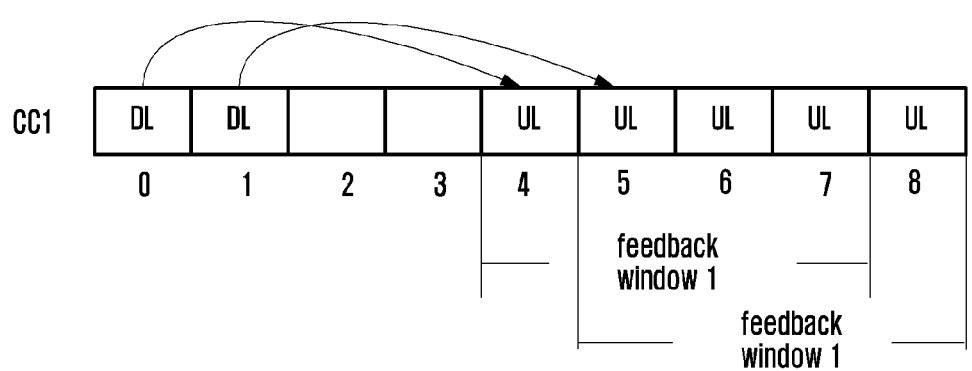
FIG. 8 is a schematic diagram illustrating a feedback window according to some embodiments of the present disclosure.
Figure 8B:
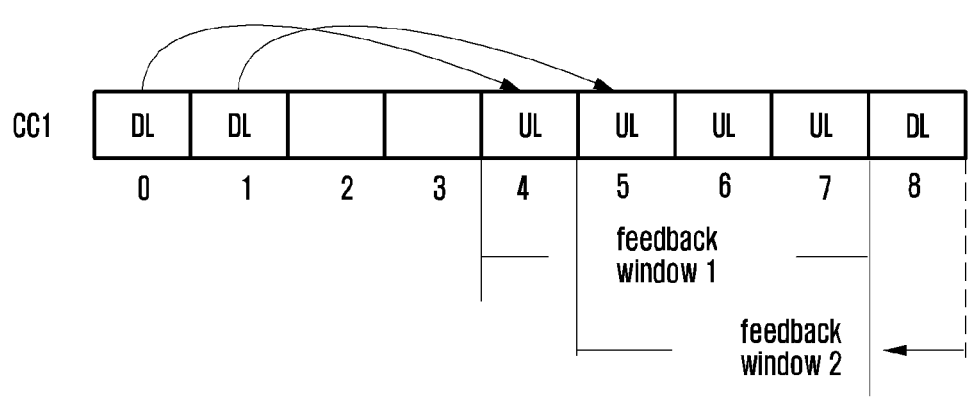

In some embodiments, the UE may transmit the uplink control information in a first idle uplink subframe in the feedback window. For different first uplink subframes, the feedback windows have the same length, as shown in FIG. 8(*a*). If the subframe 4 or subframe 5 is the first uplink subframe, the length of the feedback window is 4. Thus, the UE may transmit at least uplink control information corresponding subframe 4 in subframes 4~7 or transmit at least uplink control information corresponding subframe 5 in subframes 5~8. It should be noted that, since the length of uplink/downlink burst on the unlicensed carrier is variable, it is possible that there is no available uplink subframe within the feedback window, e.g., it has been switched to downlink subframes. The UE is able to determine that the subframes in the feedback window cannot be used for uplink transmission based on explicit signaling indication, e.g., at least indication of ending of uplink burst indicated by the base station via common DCI, or other information indicating the uplink/downlink burst. In another manner, instead of based on the explicit signaling indication, the UE is able determine whether subframes within the feedback window can be used for uplink transmission via blind detection, e.g., CCA check. Thus, although the same feedback window length is configured for each uplink subframe, the number of subframes actually can be used for uplink transmission is different, as shown in FIG. 8(*b*). When subframe 4 is the first subframe, the length of the feedback window is 4. The UE may transmit at least the uplink control information corresponding to subframe 4 in subframes 4~7. When subframe 5 is the first subframe, although the configured length of the feedback window is 4, since subframe 8 is a downlink subframe, the subframes actually available for the UE is subframes 5~7. It can be seen that, the defined feedback window determines a maximum delay of the HARQ-ACK fed back by the UE.

The uplink control information feedback window may be dynamically configured by the base station. The start point is still the first uplink subframe. But the length of the feedback window may be dynamically indicated by the base station, e.g. via DL assignment scheduling PDSCH or common DCI, or via other dedicated DCI.

In step 702, the UE determines a position of a subframe in which uplink control information containing at least HARQ-ACK information can be transmitted within the uplink control information feedback window.

In some embodiments, the subframe for transmitting the uplink control information must be within the feedback window. The feedback window starts from the first uplink subframe n+k determined in step 701, then follows a second uplink subframe, a third uplink subframe, until the end of the feedback window.

In some embodiments, the UE may perform a CCA check before the first uplink subframe. If the CCA check succeeds, the UE determines to transmit HARQ-ACK in the first uplink subframe. Otherwise, the UE performs a CCA check before the second uplink subframe. If the CCA check succeeds, the UE determines to transmit HARQ-ACK in the second uplink subframe. The process proceeds until the last uplink subframe in the feedback window. If the CCA check is not successful until the last uplink subframe, the UE gives up the transmission of the uplink control information, or attempts to transmit the uplink control information on another carrier, which is not restricted in the present disclosure.

It can be seen from the above that, if the CCA check by the UE is failed in the uplink subframe $X_1$ but succeeds in another subframe (subframe $X_2$) in the feedback window, and the subframe $X_2$ also has corresponding uplink control information to be transmitted, both the uplink control information of the subframe $X_2$ and the uplink control information of the uplink subframe $X_1$ are transmitted in the uplink subframe $X_2$. The detailed operation may be seen in step 703.

In step 703, the UE determines the HARQ-ACK bits to be transmitted according to the position of the subframe in which the uplink control information containing at least the HARQ-ACK information is transmitted, and transmits the uplink control information containing at least the HARQ-ACK information in the subframe.

Furthermore, if the HARQ-ACK information is transmitted in the first uplink subframe, the transmitted HARQ-ACK information includes merely the HARQ-ACK information corresponding to the PDSCH(s) of the downlink carriers corresponding to the first uplink subframe. If the HARQ-ACK information is transmitted in the second uplink subframe, the transmitted HARQ-ACK information includes both the HARQ-ACK information corresponding to the PDSCH(s) of the downlink carriers corresponding to the first uplink subframe and the HARQ-ACK information corresponding to the PDSCH(s) of the downlink carriers corresponding to the second uplink carrier, and so on.

In some embodiments, the PDSCH(s) of the downlink carriers corresponding to the uplink subframe X may be the PDSCHs on all downlink carriers in all downlink subframes in the time-frequency bundling window corresponding to the uplink subframe X. The length of the time-frequency bundling window may be 1, i.e., one uplink subframe corresponds to merely one downlink subframe. The length of the time-frequency bundling window may be determined according to conventional TDD uplink-downlink configuration (Table 1, Table 2). The length of the time-frequency bundling window may also be determined according to a newly-defined uplink-downlink configuration. The time-frequency bundling window may also be determined according to an HARQ-ACK feedback time dynamically indicated by the base station, e.g., the base station may indicate via DL assignment that the HARQ-ACK corresponding to the downlink subframe n is expected to be fed back in the uplink subframe n+k, thus it can be determined how many downlink subframes correspond to the uplink subframe n+k.

In some embodiments, according to a predefined order, the UE sorts the HARQ-ACK of the PDSCH(s) of the downlink carriers corresponding to the first uplink subframe, and/or sorts the HARQ-ACK of the PDSCH(s) of downlink carriers corresponding to the first uplink subframe and the HARQ-ACK of PDSCH(s) of downlink carriers corresponding to the second uplink subframe, and so on, and/or sorts the HARQ-ACK of PDSCH(s) of downlink carriers corresponding to the first uplink carrier until the HARQ-ACK of PDSCH(s) of downlink carriers corresponding to the last uplink subframe in the feedback window.

In some embodiments, the UE sorts the HARQ-ACK bits of PDSCHs of downlink carriers corresponding to different uplink subframes according to the sequence of the uplink subframes. For example, when sorting the HARQ-ACK of the PDSCH(s) of downlink carriers corresponding to the first uplink subframe and that of the second uplink subframe, the HARQ-ACK of the PDSCH(s) of downlink carriers corresponding to the first uplink subframe is arranged in the front, and the HARQ-ACK of the PDSCH(s) of downlink carriers corresponding to the second uplink subframe is placed behind. When the UE arranges the HARQ-ACK bits, the following manner 1 or manner 2 may be adopted.

Figure 9:
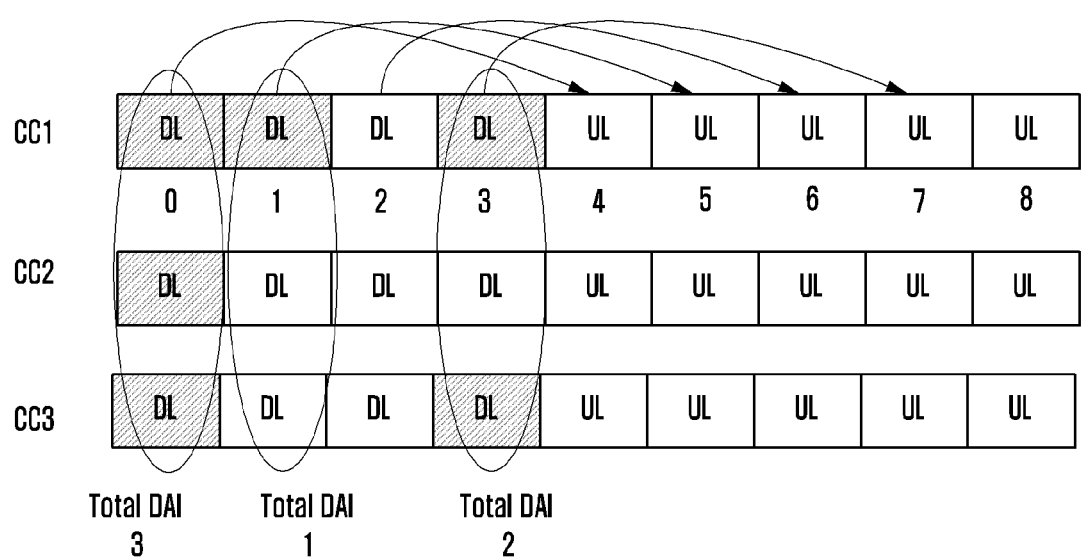
FIG. 9 is a schematic diagram illustrating a method for feeding back HARQ-ACK information according to some embodiments of the present disclosure.

Manner 1: in some embodiments, the UE assumes that a total DAI and/or counter DAI transmitted by the base station are counted individually in the downlink subframes within respective time-frequency bundling window corresponding to the respective uplink subframe X. For example, as shown in FIG. 9, if the first uplink subframe is respectively subframe 4, 5, 6, and 7, the length of the time-frequency windows respectively corresponding to the first uplink subframes are all 1, the corresponding downlink subframe is respectively 0, 1, 2, and 3. Thus, the total DAI and counter DAI in the DL assignment in each of these downlink subframes is counted individually. For facilitating the description, FIG. 9 merely shows the total DAI, the same applies to the counter DAI.

When the UE feeds back the HARQ-ACK bits in uplink subframe X, suppose that the HARQ-ACK bits includes the HARQ-ACK bits respectively corresponding to uplink subframes $X_1$, $X_2$, . . . and $X_n$. As such, the number of HARQ-ACK bits corresponding to the uplink subframe $X_n$ is determined according to the number of PDSCH(s) actually transmitted (e.g. total DAI), whereas the HARQ-ACK bits corresponding to the uplink subframes $X_1$, $X_2$, . . . and $X_{n-1}$ should be determined according to the maximum number of bits can be fed back, i.e. the same as the mechanism in LTE Release 12, in which the number of bits is determined according to the number of configured carriers and/or information indicated in UL DAI/DL DAI, but not according to the number of PDSCH(s) actually transmitted by the base station (e.g., total DAI).

In some embodiments, after the UE successfully transmits the HARQ-ACK bits corresponding to a downlink subframe, the HARQ-ACK bits having been transmitted will not be transmitted in a subsequent uplink subframe.

In some embodiments, the number of configured carriers refers to the number of carriers configured in one PUCCH group.

Figure 10:
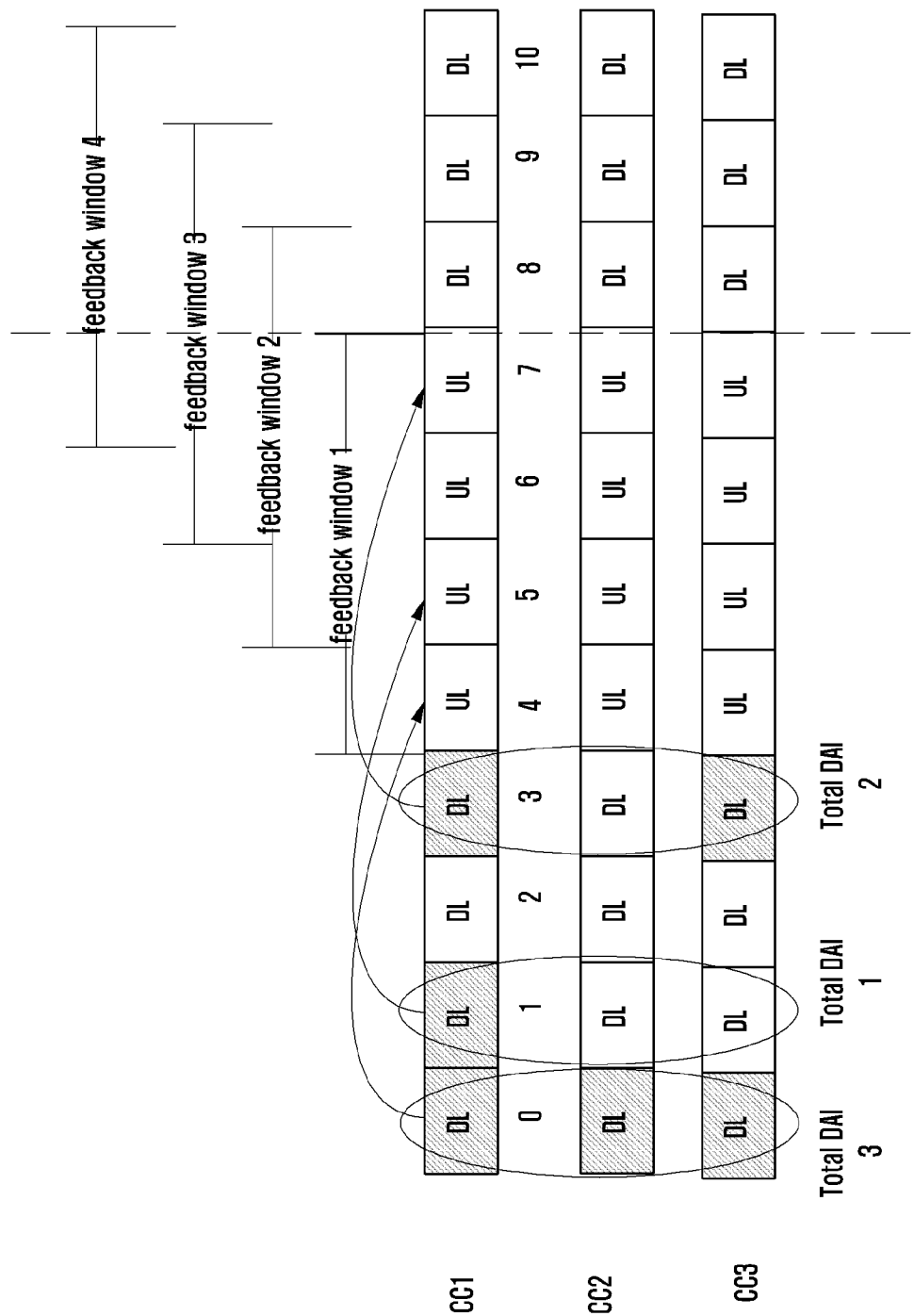
FIG. 10 is a schematic diagram illustrating another method for feeding back HARQ-ACK information according to some embodiments of the present disclosure.

As shown in FIG. 10, suppose that a downlink burst includes subframes 0~3, an uplink burst includes subframes 4~7, and a next downlink burst including subframes 8~10. UE 1 is configured with 4 CCs, CC0 is a licensed carrier and is configured as a Pcell, CC1~CC3 are unlicensed carriers in the same PUCCH group, CC1 is a pScell for feeding back the HARQ-ACK of CC1~CC3, and belongs to a PUCCH group different from CC0. For facilitating the description, the description is provided merely with respect to CC1~CC3 but not to CC0. As to CC0, the feedback may be performed according to a conventional method. Suppose that the transmission modes of CC1~CC3 are all 2 transmission blocks.

In downlink subframe 0, the base station transmits PDSCH for UE 1 on CC1~CC3. In downlink subframe 1, the base station transmits PDSCH for UE 1 on CC1. In downlink subframe 3, the base station transmits PDSCH for UE 1 on CC1 and CC3. Thus, the base station transmits total DAI=3 in subframe 0, transmits total DAI=2 in subframe 1, and transmits total DAI=2 in subframe 3. The first uplink subframe corresponds to downlink subframe 0 is subframe 4, the feedback window includes subframes 4~7. The first uplink subframe corresponds downlink subframe 1 is subframe 5, and the feedback window includes subframes 5~8. The first uplink subframe corresponds downlink subframe 3 is subframe 7, and the feedback window includes subframes 7~10. However, since the subframes 8~10 are downlink subframes of a new downlink burst, the effective feedback windows respectively include subframes 4~7, subframes 5~7 and subframe 7. Hereinafter, a detailed description is provided with reference to the following situations. It should be noted that the processing is similar for other situations.

If a CCA check performed by UE 1 before uplink subframe 4 succeeds, UE 1 transmits 6 HARQ-ACK bits for downlink subframe 0 in uplink subframe 4.

If a CCA check performed by UE 1 before uplink subframe 4 is failed, but the CCA check in uplink subframe 5 succeeds, UE 1 transmits 6 HARQ-ACK bits for downlink subframe 0 and transmits 2 HARQ-ACK bits for downlink subframe 1 in uplink subframe 5, a total of 8 bits.

If a CCA check performed by UE 1 before uplink subframes 4 and 5 are both failed, but the CCA check in subframe 6 succeeds, UE 1 transmits 6 HARQ-ACK bits of downlink subframe 0 and 2 HARQ-ACK bits of downlink subframe 1 in uplink subframe 6, a total of 8 bits.

If the CCA check performed by UE 1 before uplink subframes 4 and 5 are both failed, but the CCA check in subframe 6 succeeds and the CCA check before uplink subframe 7 succeeds, UE 1 transmits 6 HARQ-ACK bits of downlink subframe 0 and 2 HARQ-ACK bits of downlink subframe 1 in uplink subframe 6, a total of 8 bits. UE 1 transmits in uplink subframe 7 the HARQ-ACK of downlink subframes 2 and 3, a total of 6+4=10 bits. It should be noted that, although UE 1 does not detect the DL DCI in downlink subframe 2, UE 1 still needs to generate 6 HARQ-ACK bits for the 3 carriers, and then arranges the 4 HARQ-ACK bits of subframe 3, so as to avoid that the dislocation of the HARQ-ACK bits of subframe 3 due to UE 1 failing to detect the PDSCH transmitted by the base station in subframe 2. It should also be noted that, since UE 1 has transmitted the HARQ-ACK bits of downlink subframes 0 and 1 in uplink subframe 6, UE 1 does not transmit the HARQ-ACK bits of downlink subframes 0 and 1 again when transmitting HARQ-ACK bits in uplink subframe 7.

If the CCA checks performed by UE 1 before uplink subframe 6 are all failed but the CCA check in uplink subframe 7 succeeds, UE 1 transmits in uplink subframe 7, 6 HARQ-ACK bits of downlink subframe 0, 6 HARQ-ACK bits of downlink subframe 1, 6 HARQ-ACK bits of downlink subframe 2, and 4 HARQ-ACK bits of downlink subframe 3, a total of 22 bits.

Manner 2: in some embodiments, the UE assumes that the values of total DAI and/or counter DAI transmitted by the base station are determined cumulatively for downlink subframes in all time-frequency bundling windows corresponding to all uplink subframes in the uplink control information feedback window.

Alternatively, it may be regarded that, a new time-frequency bundling window is defined. It starts from the first subframe in the time-frequency bundling window corresponding to the first uplink subframe in the feedback window, and ends at the last subframe in the time-frequency bundling window corresponding to the last uplink subframe in the feedback window.

When receiving the total DAI and/or counter DAI, the UE assumes that the total DAI and/or counter DAI indicates a cumulative number of PDSCHs transmitted by the base station within all time-frequency windows from the first downlink subframe of the first time-frequency bundling window determined by the base station to the subframe in which the UE receives the total DAI and/or counter DAI. In some embodiments, the UE may regard that the value of the total DAI and/or counter DAI is determined cumulatively from the first downlink frame in which the total DAI and/or counter DAI is received to the current downlink subframe in which the UE receives the total DAI and/or counter DAI in all time-frequency bundling windows within a certain time period such as one UL burst.

Figure 11:
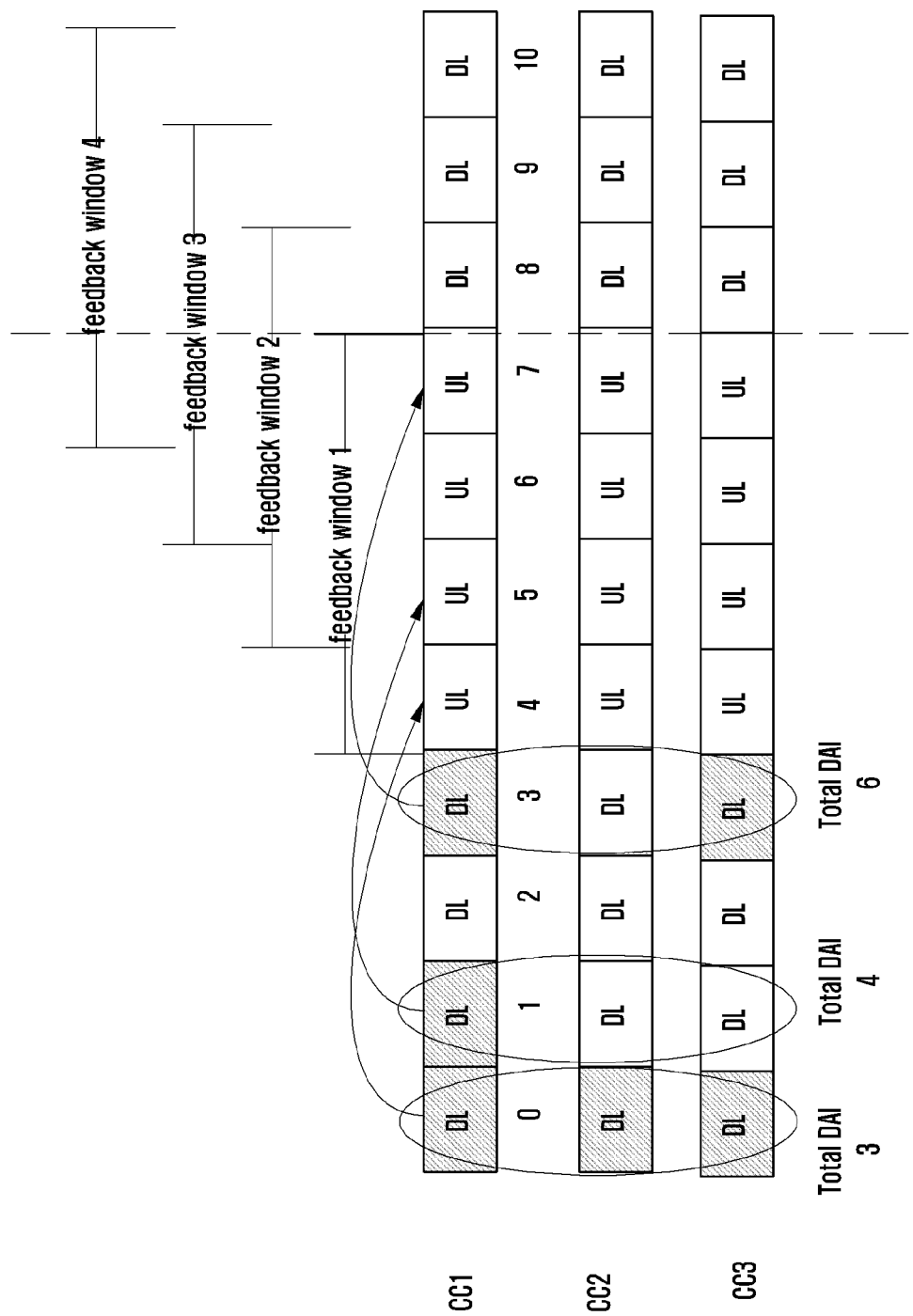
FIG. 11 is a schematic diagram illustrating still another method for feeding back HARQ-ACK information according to some embodiments of the present disclosure.

For example, as shown in FIG. 11, the time-frequency bundling windows respectively correspond to first uplink subframes 4, 5, 6 and 7 are all 1, the corresponding downlink subframes are respectively 0, 1, 2 and 3. Thus, the values of the total DAI and counter DAI in the DL assignment in these downlink subframes are determined cumulatively in subframes 0~3. The base station transmits total DAI=3 in subframe 0, transmits total DAI=4 in subframe 1, and transmits total DAI=6 in subframe 3. For facilitating the description, FIG. 11 merely shows the total DAI. It is similar for the counter DAI.

In some embodiments, for the HARQ-ACK feedback in any uplink subframe, the UE determines the number of HARQ-ACK bits and arranges the HARQ-ACK bits according to the number of PDSCHs actually transmitted by the base station, e.g., according to the total DAI and counter DAI.

In some embodiments, when feeding back the HARQ-ACK, the UE feeds back the corresponding HARQ-ACK bits in the first subframe in the feedback window. If the UE does not feed back the HARQ-ACK bits in the first subframe successfully, the UE attempts to feed back the HARQ-ACK bits in the second subframe. At this time, the HARQ-ACK bits include both the HARQ-ACK that the UE fails to feed back in the first subframe and the HARQ-ACK bits corresponding to the second subframe. If the UE successfully feeds back the HARQ-ACK bits in the first subframe, the UE has two manners to feed back the HARQ-ACK bits in the second subframe. In one manner, the UE feeds back in the second subframe both the HARQ-ACK bits corresponding to the first subframe and the HARQ-ACK bits corresponding to the second subframe. In the other manner, the UE feeds back merely the HARQ-ACK bits corresponding to the second subframe. The first manner is able to avoid the impact of incorrect determination about the feedback situation of the first subframe to the receiving of the HARQ-ACK of the second subframe of the base station. The second manner helps to effectively reduce the overhead of the HARQ-ACK feedback.

In one implementation of this embodiment, the UE is able to know from which downlink subframe that the total DAI and the counter DAI transmitted by the base station are counted. For example, the UE may make a determination through obtaining indication information of uplink/downlink burst. Accordingly, it is required that the base station also determines the first subframe for counting the DAI according to the indication information of the uplink/downlink burst when transmitting the total DAI and counter DAI.

In another implementation of this embodiment, the UE may not know from which downlink subframe the total DAI and counter DAI transmitted by the base station are counted. The UE merely needs to arrange the HARQ-ACK bits according to the received total DAI and counter DAI. Accordingly, it is not restricted that the base station must determine the first subframe for counting the DAI according to a certain rule when transmitting the total DAI and counter DAI. The base station may make a determination by itself or according to a predefined rule.

As shown in FIG. 11, suppose that a downlink burst includes subframes 0~3, an uplink burst includes subframes 4~7, and a next downlink burst includes subframes 8~10. UE 1 is configured with 4 CCs, wherein CC0 is a licensed carrier and is a Pcell, CC1~CC3 are unlicensed carriers in the same PUCCH group, CC1 is a pScell for feeding back the HARQ-ACK of CC1~CC3, and belongs to a PUCCH group different from CC0. For facilitating the description, the description is provided merely with respect to CC1~CC3 but not to CC0. As to CC0, the feedback may be performed according to a conventional method. Suppose that the transmission modes of CC1~CC3 are all 2 transmission blocks. In downlink subframe 0, the base station transmits PDSCH for UE 1 on CC1~CC3. In downlink subframe 1, the base station transmits PDSCH for UE 1 on CC1. In downlink subframe 3, the base station transmits PDSCH for UE 1 on CC1 and CC3. Thus, the base station transmits total DAI=3 in subframe 0, transmits total DAI=4 in subframe 1, and transmits total DAI=6 in subframe 3. The first uplink subframe corresponds to downlink subframe 0 is subframe 4, the feedback window includes subframes 4~7. The first uplink subframe corresponds downlink subframe 1 is subframe 5, and the feedback window includes subframes 5~8. The first uplink subframe corresponds downlink subframe 3 is subframe 7, and the feedback window includes subframes 7~10. However, since the subframes 8~10 are downlink subframes of a new downlink burst, the effective feedback windows respectively include subframes 4~7, subframes 5~7 and subframe 7. Hereinafter, a detailed description is provided with reference to the following situations. It should be noted that the processing is similar for other situations.

If a CCA check performed by UE 1 before uplink subframe 4 succeeds, UE 1 transmits 6 HARQ-ACK bits of downlink subframe 0 in uplink subframe 4.

If a CCA check performed by UE 1 before uplink subframe 4 is failed, but the CCA check in uplink subframe 5 succeeds, UE 1 transmits 6 HARQ-ACK bits of downlink subframe 0 and 2 HARQ-ACK bits of downlink subframe 1 in uplink subframe 5, a total of 8 bits.

If a CCA check performed by UE 1 before uplink subframes 4 and 5 are both failed, but the CCA check in subframe 6 succeeds, UE 1 transmits 6 HARQ-ACK bits of downlink subframe 0 and 2 HARQ-ACK bits of downlink subframe 1 in uplink subframe 6, a total of 8 bits.

If the CCA check performed by UE 1 before uplink subframes 4 and 5 are both failed, but the CCA check in subframe 6 succeeds and the CCA check before uplink subframe 7 succeeds, UE 1 transmits 6 HARQ-ACK bits of downlink subframe 0 and 2 HARQ-ACK bits of downlink subframe 1 in uplink subframe 6, a total of 8 bits. UE 1 transmits in uplink subframe 7 the HARQ-ACK of downlink subframes 2 and 3, a total of 0+4=4 bits. It should be noted that, UE 1 does not detect the DL DCI in downlink subframe 2, UE 1 determines the HARQ-ACK bits corresponding to two PDSCHs to be transmitted in uplink subframe 7 according to the total DAI=6 detected in downlink subframe 3 and the total DAI=4 detected in downlink subframe 2, i.e., 4 HARQ-ACK bits. It is possible that UE 1 also fails to detect the PDSCH in downlink subframe 3. At this time, UE 1 cannot determine whether the miss-detection happens in downlink subframe 2 or downlink subframe 3. But this does not affect the bit length and bit sequence of the HARQ-ACK. It should also be noted that, since UE 1 has transmitted the HARQ-ACK bits of downlink subframes 0 and 1 in uplink subframe 6, UE 1 does not transmit the HARQ-ACK bits of downlink subframes 0 and 1 again when transmitting HARQ-ACK bits in uplink subframe 7.

If the CCA checks performed by UE 1 before uplink subframe 6 are all failed but the CCA check in uplink subframe 7 succeeds, UE 1 transmits in uplink subframe 7, 6 HARQ-ACK bits of downlink subframe 0, 2 HARQ-ACK bits of downlink subframe 1, and 4 HARQ-ACK bits of downlink subframe 3, a total of 12 bits.

It should be noted that, in this embodiment, it is possible to assume that the total DAI and/or counter DAI are counted individually in each PUCCH group. For facilitating the description, this embodiment describes merely one PUCCH group. However, in a practical application, there may be multiple PUCCH groups, e.g., one PUCCH group including at least a licensed carrier, and another PUCCH group including merely unlicensed carriers. In this embodiment, the description is provided with respect to the PUCCH group including merely unlicensed carriers. As to the PUCCH group including at least a licensed carrier, the implementation is not restricted in the present disclosure, e.g. uplink control signal may be fed back according to a conventional method, or according to other methods.

Figure 12:
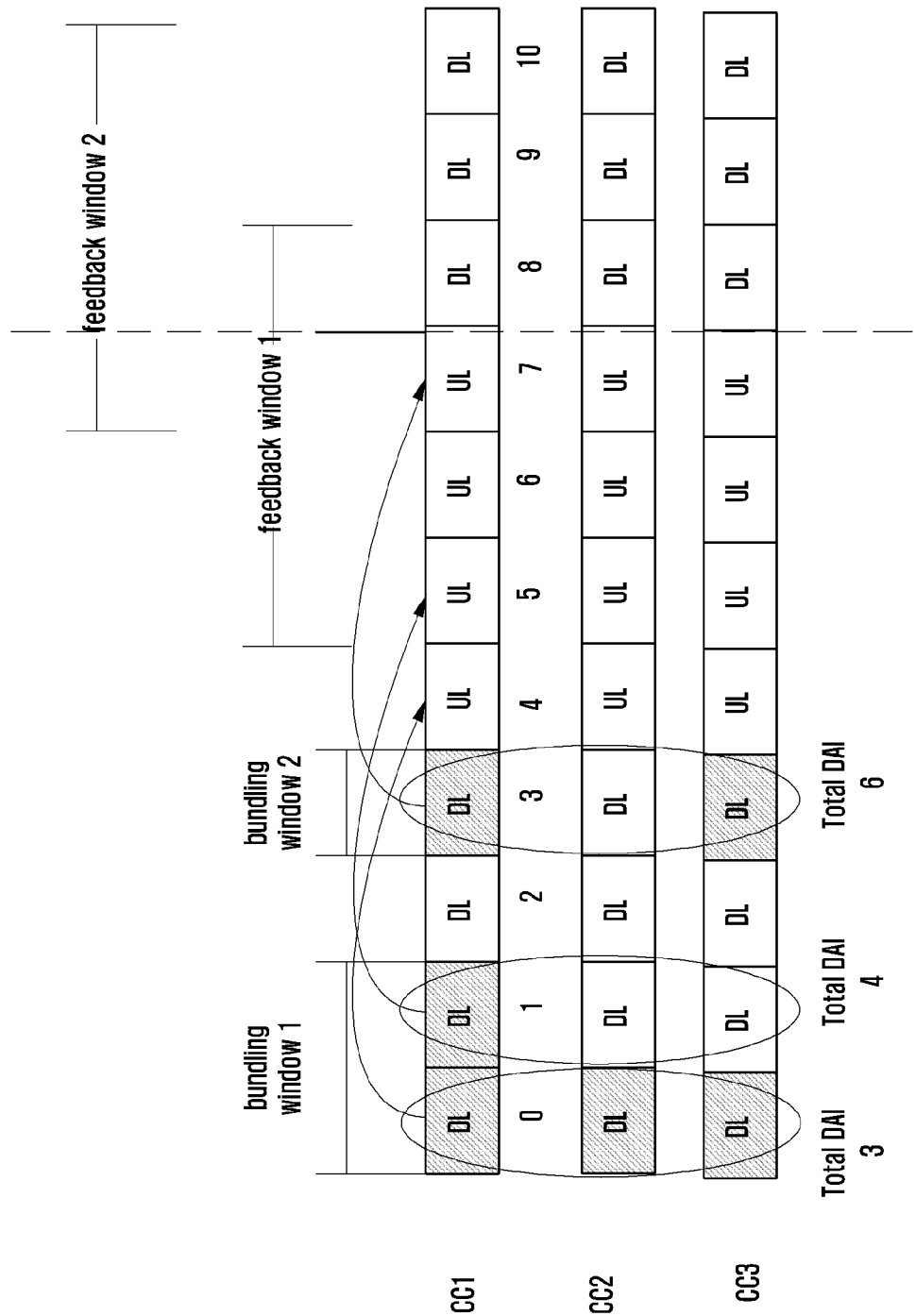
FIG. 12 is a schematic diagram illustrating yet another method for feeding back HARQ-ACK information according to some embodiments of the present disclosure.

The above shows embodiments for determining the number of bits in the FDD-FDD scenario. The embodiments of the present disclosure are also applicable for the TDD-FDD scenario and the idea is the same. Merely the FDD operations need to be mapped to the TDD operations. For example, in the manner 2 of step 703, the number of bits is determined according to the number of PDSCHs actually transmitted by the base station (e.g. total DAI) according to the conventional TDD system. In manner 1 of step 701, as to the HARQ-ACK bits of the PDSCH corresponding to the uplink subframe not successfully transmitted, the number of bits may be determined according to the maximum number of bits can be fed back in the TDD system. In the TDD operations, it is possible that the length of the time-frequency bundling window of one uplink subframe is larger than 1, and it is possible that the lengths of time-frequency bundling windows of different uplink subframes are different. If the manner 2 in step 703 is adopted, when transmitting the total DAI and counter DAI, the base station needs to determine the value of the total DAI and counter DAI according to the number of PDSCHs can be transmitted in all downlink subframes of all time-frequency bundling windows corresponding to the uplink subframes from the first uplink frame to the current uplink subframe in the feedback window. As shown in FIG. 12, downlink subframes 0 and 1 form the HARQ-ACK time-frequency bundling window of uplink subframe 5, the length is 2. Downlink subframe 3 is the HARQ-ACK time-frequency bundling window of uplink subframe 7, the length is 1.

The above describes the situation that the uplink control information includes merely the HARQ-ACK. The present disclosure is also applicable for the situation that the uplink control information includes HARQ-ACK and/CSI.

This embodiment is applicable for transmitting uplink control information on a predefined uplink carrier, e.g. pScell, and pScell is an unlicensed carrier. This embodiment may be combined with embodiment 3, i.e., it is determined according to the method of embodiment 3 that the transmission is implemented on one of the multiple uplink carriers, and it is determined according to this embodiment the transmission is implemented in one of the multiple uplink subframes of the uplink carrier. The sequence for determining the carrier and the subframe is not restricted.

Embodiment 5

This embodiment describes from a base station side, corresponding to embodiment 3.

Figure 13:
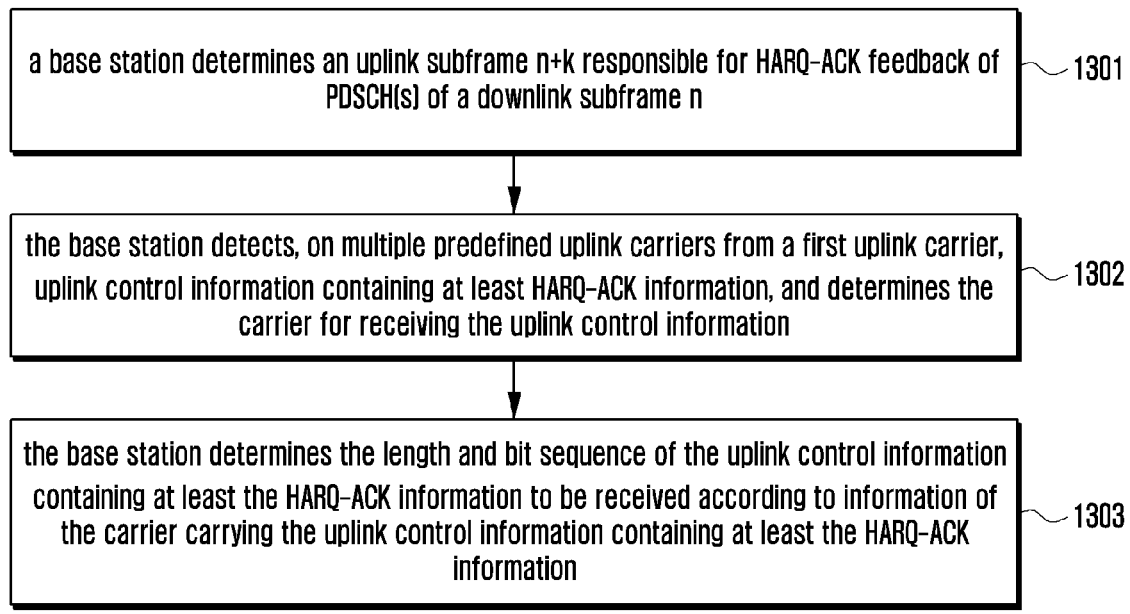
FIG. 13 is a schematic diagram illustrating an HARQ-ACK information receiving method according to some embodiments of the present disclosure.

The present disclosure provides a method for receiving HARQ-ACK information, as shown in FIG. 13. The method includes the following.

In step 1301, a base station determines an uplink subframe n+k responsible for HARQ-ACK feedback of PDSCH(s) of a downlink subframe n.

The base station may determine the above uplink subframe according to the HARQ-ACK feedback timing preconfigured for the UE, or the HARQ-ACK timing dynamically indicated to the UE.

In step 1302, the base station detects, on multiple predefined uplink carriers from a first uplink carrier, uplink control information containing at least HARQ-ACK information, and determines the carrier for receiving the uplink control information.

The predefined uplink carriers may be defined in standards or configured by the base station.

The base station may determine whether the UE transmits the uplink control information containing at least the HARQ-ACK information on a carrier through blind detection, e.g., detecting reference signal, or CRC check, or correlation detection method. Or, the base station may determine whether the UE transmits the uplink control information containing at least the HARQ-ACK information on a corresponding carrier through detecting an indication transmitted by the UE indicating whether the UE has transmitted the corresponding uplink control information. For example, if the UE needs to transmit PUSCH and corresponding uplink control information, but the LBT detection of the UE is failed, the UE may report, e.g., on the Pcell, to the base station that there is no transmission on a corresponding carrier. Therefore, the base station can determine whether the UE has transmitted the uplink control information containing at least the HARQ-ACK information through detecting the information reported by the UE.

In step 1303, the base station determines the length and bit sequence of the uplink control information containing at least the HARQ-ACK information to be received according to information of the carrier carrying the uplink control information containing at least the HARQ-ACK information.

In some embodiments, the base station assumes that the transmitted HARQ-ACK information includes merely the HARQ-ACK information corresponding to the PDSCH(s) of downlink carriers in the PUCCH group corresponding to the first uplink carrier if the UE transmits the HARQ-ACK information on the first uplink carrier, and assumes that the transmitted HARQ-ACK information includes both the HARQ-ACK information of the PDSCH(s) of downlink carriers in the PUCCH group corresponding to the first uplink carrier and the HARQ-ACK information corresponding to the PDSCH(s) of downlink carriers in the PUCCH group of the second uplink carrier if the UE transmits the HARQ-ACK information on the second uplink carrier, and so on.

In some embodiments, the base station assumes that the UE determines the sequence of the HARQ-ACK bits of the PDSCH(s) of the downlink carriers in the PUCCH group of the first uplink carrier and the HARQ-ACK bits of the PDSCH(s) of the downlink carriers in the PUCCH group of the second uplink carrier according to a predefined order. For example, the PUCCH group that the second uplink carrier belongs to include a Pcell, thus the HARQ-ACK bits corresponding to the downlink carriers in this PUCCH group are placed in the front, and the HARQ-ACK bits of the PDSCH(s) of the downlink carriers in the PUCCH group that the first uplink carrier belongs to are placed behind.

In a first manner, the base station assumes that the UE determines the number of HARQ-ACK bits of the PUCCH group whose HARQ-ACK bits are placed in the front according to maximum number of bits can be fed back, i.e., the same as the mechanism in LTE Release 12, in which the number of bits is determined according to number of configured carriers and/or information indicated in UL DAI/DL DAI, but not according to the number of PDSCH(s) actually transmitted by the base station (e.g. total DAI). As to the PUCCH group whose HARQ-ACK bits are placed behind, the number of bits is determined according to the number of PDSCH(s) actually transmitted by the base station (e.g. total DAI).

In a second manner, the base station assumes that if the uplink control information containing the HARQ-ACK is received on the second uplink carrier, the number of HARQ-ACK bits of all PUCCH groups is determined according to the maximum number of bits can be fed back, i.e., the same as the mechanism in LTE Release 12, in which the number of bits is determined according to the number of configured carriers and/or information indicated in UL DAI/DL DAI, but not according to the number of PDSCH(s) actually transmitted by the base station (total DAI). The base station assumes that if the uplink control information containing the HARQ-ACK is received on the first uplink carrier, the number of the HARQ-ACK bits is determined according to the number of PDSCH(s) actually transmitted by the base station (e.g. total DAI).

Embodiment 6

This embodiment describes from the base station side and is corresponding to embodiment 4.

Figure 14:
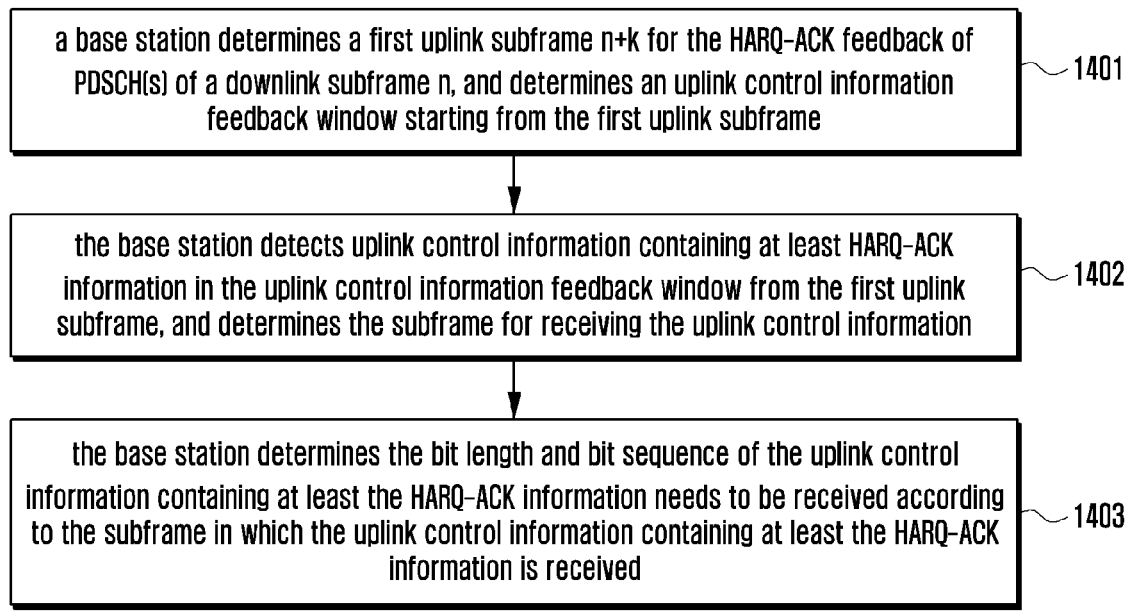
FIG. 14 is a schematic diagram illustrating another HARQ-ACK information receiving method according to some embodiments of the present disclosure.

The present disclosure provides a method for receiving HARQ-ACK information, as shown in FIG. 14. The method includes the following.

In step 1401, a base station determines a first uplink subframe n+k for the HARQ-ACK feedback of PDSCH(s) of a downlink subframe n, and determines an uplink control information feedback window starting from the first uplink subframe.

The base station may determine the first uplink subframe and the feedback window according to HARQ-ACK feedback time information and/or feedback window information preconfigured for the UE or according to the HARQ-ACK feedback time information and/or feedback window information dynamically indicated to the UE.

In step 1402, the base station detects uplink control information containing at least HARQ-ACK information in the uplink control information feedback window from the first uplink subframe, and determines the subframe for receiving the uplink control information.

The base station may determine whether the UE transmits the uplink control information containing at least the HARQ-ACK information in a corresponding subframe through blind detection, e.g., detecting reference signal, or CRC check, or correlation detection method. Or, the base station may determine whether the UE transmits the uplink control information containing at least the HARQ-ACK information in a corresponding subframe through detecting an indication transmitted by the UE indicating whether the UE has transmitted the corresponding uplink control information.

In step 1403, the base station determines the bit length and bit sequence of the uplink control information containing at least the HARQ-ACK information needs to be received according to the subframe in which the uplink control information containing at least the HARQ-ACK information is received.

In some embodiments, the base station assumes that the UE arranges the HARQ-ACK bits of the PDSCHs of downlink carriers corresponding to different uplink subframes according to the sequence of the uplink subframes.

In some embodiments, the base station assumes that, if the uplink control information containing at least the HARQ-ACK information is detected in an uplink subframe X1 in the feedback window, the uplink control information detected in a following uplink subframe X2 does not include the HARQ-ACK information transmitted by the UE in the uplink subframe X1.

In a first manner: when transmitting the total DAI and counter DAI, the base station determines the values of the total DAI and/or counter DAI in the downlink subframes of the time-frequency bundling window corresponding to respective uplink subframe X individually. The base station assumes that when the UE feeds back HARQ-ACK bits in uplink subframe X, the HARQ-ACK bits includes the HARQ-ACK bits corresponding to uplink subframes $X_1$, $X_2$, . . . and $X_n$, thus the number of HARQ-ACK bits corresponding to the uplink subframe $X_n$ is determined according to the number of PDSCH(s) actually transmitted (e.g. total DAI), whereas the number of HARQ-ACK bits corresponding to the uplink subframes $X_1$, $X_2$, . . . and $X_n$ is determined according to the maximum number of bits can be fed back. If the UE successfully transmits the HARQ-ACK bits corresponding to a downlink subframe, the HARQ-ACK bits are not transmitted in the subsequent uplink subframe.

In a second manner: when transmitting the total DAI and counter DAI, the base station determines the values of the total DAI and counter DAI cumulatively in downlink subframes in all time-frequency bundling windows corresponding to all uplink subframes in the uplink control information feedback window. The base station assumes that for the HARQ-ACK fed back in any uplink subframe, the UE determines the length of the HARQ-ACK bits and the sequence the HARQ-ACK bits according to the number of PDSCH(s) actually transmitted by the base station, e.g., according to the total DAI and counter DAI. If the UE successfully transmits the HARQ-ACK bit corresponding to a downlink subframe, the HARQ-ACK bit is not transmitted in subsequent uplink subframes.

It can be seen that, the base station detects the uplink control information in uplink subframe $X_2$ based on a detected result of the uplink control information in uplink subframe $X_1$. For example, the base station needs to determine whether the UE has transmitted uplink control information in uplink subframe $X_1$, so as to determine the length and sequence of the HARQ-ACK bits in the uplink control information in the uplink subframe $X_2$.

For example, in the example as shown in FIG. 11, the downlink burst includes subframes 0~3, the uplink burst includes subframes 4~7, and then follows another downlink burst including subframes 8~10. UE 1 is configured with 4 CCs, wherein CC0 is a licensed carrier and is a Pcell, CC1~CC3 are unlicensed carriers in the same PUCCH group, CC1 is a pScell for feeding back the HARQ-ACK of CC1~CC3, and belongs to a PUCCH group different from CC0. For facilitating the description, the description is provided merely with respect to CC1~CC3 but not to CC0. As to CC0, the feedback may be performed according to a conventional method. Suppose that the transmission modes of CC1~CC3 are all 2 transmission blocks. In downlink subframe 0, the base station transmits PDSCH for UE 1 on CC1~CC3. In downlink subframe 1, the base station transmits PDSCH for UE 1 on CC1. In downlink subframe 3, the base station transmits PDSCH for UE 1 on CC1 and CC3. Thus, the base station transmits total DAI=3 in subframe 0, transmits total DAI=4 in subframe 1, and transmits total DAI=6 in subframe 3. The first uplink subframe corresponds to downlink subframe 0 is subframe 4, the feedback window includes subframes 4~7. The first uplink subframe corresponds downlink subframe 1 is subframe 5, and the feedback window includes subframes 5~8. The first uplink subframe corresponds downlink subframe 3 is subframe 7, and the feedback window includes subframes 7~10. However, since the subframes 8~10 are downlink subframes of a new downlink burst, the effective feedback windows respectively include subframes 4~7, subframes 5~7 and subframe 7. Hereinafter, a detailed description is provided with reference to the following situations. It should be noted that the processing is similar for other situations.

The base station detects uplink control information containing HARQ-ACK in uplink subframe 4. The base station assumes that the HARQ-ACK of downlink subframe 0 is expected to be received in uplink subframe 4, which includes 6 bits.

If the base station does not detect the uplink control information containing the HARQ-ACK in uplink subframe 4, the base station detects uplink control information containing HARQ-ACK in uplink subframe 5. The base station assumes that 6 HARQ-ACK bits of downlink subframe 0 and 2 HARQ-ACK bits of downlink subframe 1 are expected to be received in uplink subframe 5, a total of 8 bits.

If the base station does not detect the uplink control information containing HARQ-ACK in uplink subframes 4 and 5, the base station detects uplink control information containing HARQ-ACK in uplink subframe 6. The base station assumes that the 6 HARQ-ACK bits of downlink subframe 0 and 2 HARQ-ACK bits of downlink subframe 1 are expected to be received in uplink subframe 6, a total of 8 bits.

If the base station does not detect the uplink control information containing HARQ-ACK in uplink subframes 4 and 5, the base station detects in uplink subframe 6, and expects to receive 6 HARQ-ACK bits of downlink subframe 0 and 2 HARQ-ACK bits of downlink subframe 1, a total of 8 bits. If the detection succeeds, the base station detects in uplink subframe 7, and expects to receive the HARQ-ACK of downlink subframes 2 and 3, a total of 0+4=4 bits.

If the base station does not detect the uplink control information containing the HARQ-ACK before uplink subframe 7, the base station detects in uplink subframe 7. The base station expects to receive 6 HARQ-ACK bits of downlink subframe 0, 2 HARQ-ACK bits of downlink subframe 1 and 4 HARQ-ACK bits of downlink subframe 3 in the uplink subframe 7, a total of 12 bits.

In some embodiments, the base station assumes that, no matter whether the uplink control information containing the HARQ-ACK information is detected in an uplink subframe $X_1$ in the feedback window, the uplink control information detected in a following uplink subframe $X_2$ still includes the HARQ-ACK information transmitted by the UE in the uplink subframe $X_1$. In other words, in the example as shown in FIG. 11, no matter whether the base station detects the HARQ-ACK information in uplink subframe 4, the base station assumes that, if the detection in subframe 5 succeeds, the number of HARQ-ACK bits is 8. If the detection in subframe 6 succeeds, the number of HARQ-ACK bits is 8. If the detection in subframe 7 succeeds, the number of HARQ-ACK bits is 12.

Embodiment 7

Figure 16:
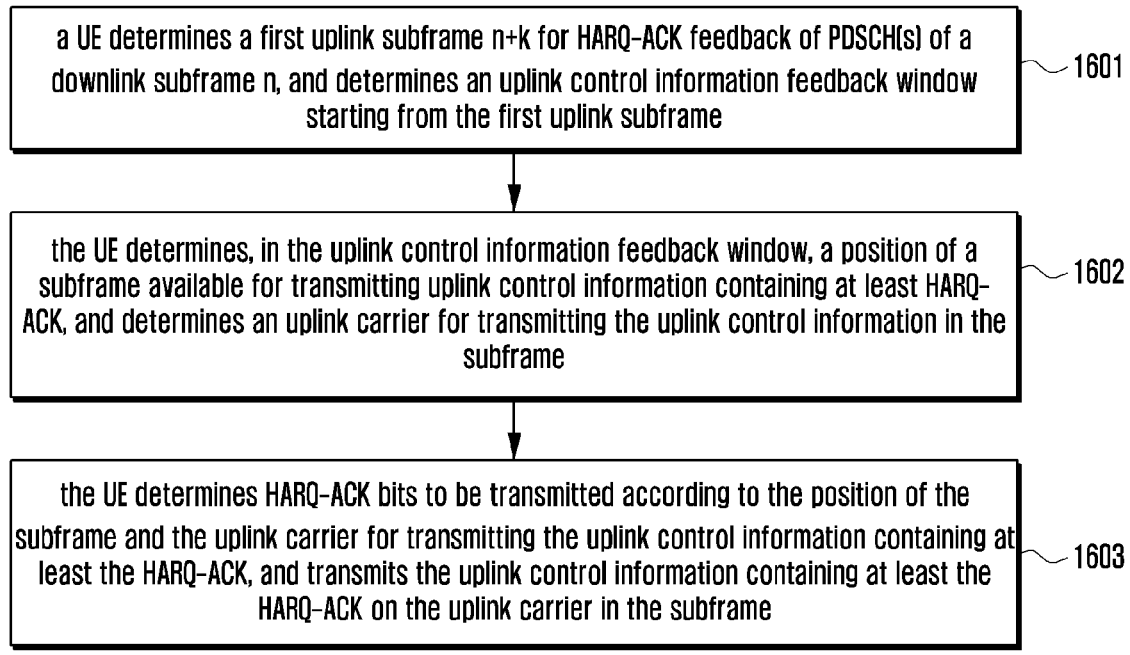
FIG. 16 is a schematic diagram illustrating another method for feeding back HARQ-ACK information according to some embodiments of the present disclosure.

The present disclosure provides a method for feeding back HARQ-ACK information. As shown in FIG. 16, the method includes the following.

In step 1601, a UE determines a first uplink subframe n+k for HARQ-ACK feedback of PDSCH(s) of a downlink subframe n, and determines an uplink control information feedback window starting from the first uplink subframe.

In some embodiments, the length of the feedback window is configured by an eNB.

In some embodiments, the length of the feedback window is defined by a system.

In some embodiments, the length N of the feedback window is an integer larger than 1.

In step 1602, the UE determines, in the uplink control information feedback window, a position of a subframe available for transmitting uplink control information containing at least HARQ-ACK, and determines an uplink carrier for transmitting the uplink control information in the subframe.

In step 1603, the UE determines HARQ-ACK bits to be transmitted according to the position of the subframe and the uplink carrier for transmitting the uplink control information containing at least the HARQ-ACK, and transmits the uplink control information containing at least the HARQ-ACK on the uplink carrier in the subframe.

In step 1602, the process that the UE determines the uplink carrier available for transmitting the uplink control information according to the position of the subframe for transmitting the uplink control information containing at least the HARQ-ACK includes: in the first uplink subframe of the uplink control information feedback window, a first uplink carrier is an uplink carrier determined according to a predefined criteria, e.g., the first uplink carrier is an uplink carrier with a minimum Scellindex among those scheduled to transmit PUSCH in the uplink subframe, and/or an uplink carrier indicated by higher layer signaling/physical layer signaling. If the UE cannot transmit on the uplink carrier, e.g., the LBT detection is failed, the UE attempts to transmit the uplink control information in a second uplink subframe in the uplink control information feedback window. A second uplink carrier selected by the UE has a predefined relationship with the first uplink carrier in the first uplink subframe. For example, the uplink carrier transmitting the uplink control information in the second uplink subframe is an uplink carrier with a second minimum Scellindex among those actually being scheduled to transmit PUSCH in the second uplink subframe. It should be noted that, besides the uplink control information whose transmission is delayed (e.g. the uplink control information should have been transmitted in the first uplink subframe), the second uplink subframe may further carry the uplink control information whose transmission is not delayed (e.g., the uplink control information should be transmitted in the second uplink subframe). The uplink control information whose transmission is not delayed is still transmitted on the uplink carrier with the minimum Scellindex among those scheduled to transmit PUSCH in the second uplink subframe. It can be seen that, the delayed and non-delayed uplink control information are transmitted on different uplink carriers, which avoids the impact to the non-delayed uplink control information brought out by the delayed uplink control information, e.g. the impact to the HARQ-ACK code book. The process proceeds similarly till the end of the uplink control information feedback window.

Figure 17:
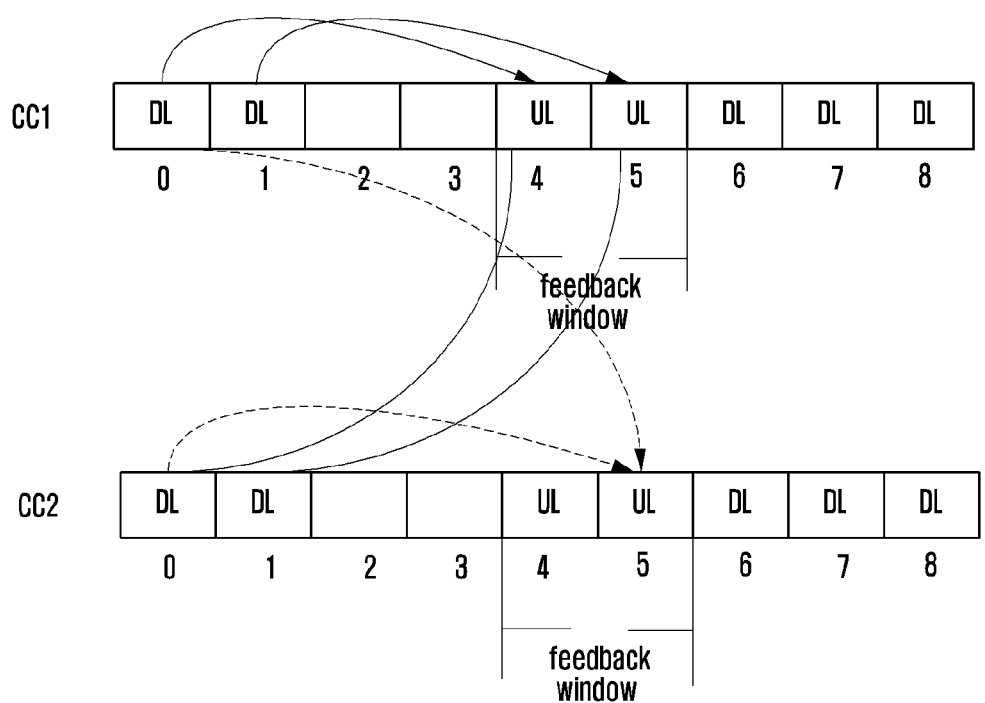
FIG. 17 is a schematic diagram illustrating yet another method for feeding back HARQ-ACK information according to some embodiments of the present disclosure.

As shown in FIG. 17, the eNB configures 1 licensed carrier CC0 and 2 unlicensed carriers CC1 and CC2 for the UE. The HARQ-ACK feedback for CC0 may be implemented according to a conventional method. FIG. 17 merely shows the implementation for CC1 and CC2. The first uplink subframe corresponding to downlink subframe 0 is uplink subframe 4, the first uplink carrier is CC1, the second uplink subframe is uplink subframe 5, and the second uplink carrier is CC2. The first uplink subframe corresponding to downlink subframe 1 is uplink subframe 5, and the first uplink carrier is CC1. If the UE finishes LBT detection on CC1 before uplink subframe 4, the UE feeds back the HARQ-ACK of downlink carriers CC1 and CC2 of downlink subframe 0 in uplink subframe 4, and feeds back the HARQ-ACK of downlink carriers CC1 and CC2 of downlink subframe 1 in uplink subframe 5. If the UE does not finish the LBT detection on uplink carrier CC1 before uplink subframe 4, finishes the LBT on CC1 before uplink subframe 5 but does not finish the LBT on CC2, the UE feeds back the HARQ-ACK of downlink carriers CC1 and CC2 of downlink subframe 1 in uplink subframe 5 on uplink carrier 1, and gives up the HARQ-ACK of downlink carriers CC1 and CC2 of downlink subframe 0. If the UE does not finish the LBT on CC1 before uplink subframe 4, but finishes the LBT on CC1 and the LBT on CC2 before uplink subframe 5, the UE feeds back the HARQ-ACK of downlink carriers CC1 and CC2 of downlink subframe 1 in uplink subframe 5 on CC1, and feeds back the HARQ-ACK of downlink carriers CC1 and CC2 of downlink subframe 0 in subframe 5 on CC2. If the UE does not finish the LBT on CC1 before uplink subframe 4, and does not finish the LBT on CC1 before uplink subframe 5, but finishes the LBT on CC2 before uplink subframe 5, the UE feeds back the HARQ-ACK of downlink carriers CC1 and CC2 of downlink subframe 0 in uplink subframe 5 on CC2, and gives up the HARQ-ACK of downlink carriers CC1 and CC2 of downlink subframe 1. If the UE does not finish the LBT on CC1 and CC2 in subframes 5 and 6, the UE gives up all HARQ-ACK feedback.

Embodiment 8

Figure 18:
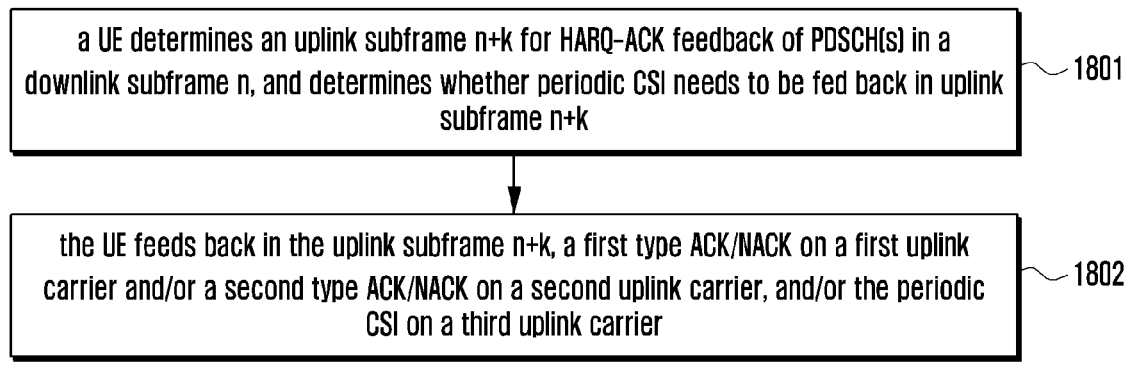
FIG. 18 is a schematic diagram illustrating a method for feeding back CSI information according to some embodiments of the present disclosure.

The present disclosure provides a method for feeding back HARQ-ACK information. As shown in FIG. 18, the method includes the following.

In step 1801, a UE determines an uplink subframe n+k for HARQ-ACK feedback of PDSCH(s) in a downlink subframe n, and determines whether periodic CSI needs to be fed back in uplink subframe n+k.

In step 1802, the UE feeds back in the uplink subframe n+k, a first type ACK/NACK on a first uplink carrier and/or a second type ACK/NACK on a second uplink carrier, and/or the periodic CSI on a third uplink carrier.

In some embodiments, the first type ACK/NACK includes the ACK/NACK of some or all carriers in a first type PUCCH group, the some or all carriers do not belong to a second type PUCCH group. The second type ACK/NACK includes ACK/NACK of carriers in the second type PUCCH group.

In some embodiments, the first type ACK/NACK includes at least ACK/NACK of a licensed carrier. The second type ACK/NACK includes ACK/NACK of unlicensed carriers.

In some embodiments, the first uplink carrier is a licensed carrier in the first type PUCCH group. If the UE support simultaneous transmission of the PUCCH and PUSCH, the first uplink carrier is an uplink carrier available for transmitting the PUCCH in the first type PUCCH group, e.g. Pcell and/or pScell defined in existing standards, generally a licensed carrier. If the UE does not support simultaneous transmission of PUCCH and PUSCH, the first uplink carrier is an uplink carrier available for transmitting PUCCH in the first type PUCCH group or a licensed carrier in the first type PUCCH group.

In some embodiments, the second uplink carrier is a licensed carrier and/or an unlicensed carrier in the second type PUCCH group.

In some embodiments, the third uplink carrier is a licensed carrier.

In some embodiments, the third uplink carrier is a licensed carrier in the first type PUCCH group.

In some embodiments, the third uplink carrier is a licensed carrier corresponding to the second type PUCCH group configured by the base station. The licensed carrier may not belong to the second PUCCH group.

In some embodiments, the UE may feed back the period CSI on the third uplink carrier according to any one or any combination of the following manners.

Manner 1: if the UE is configured to be able to transmit PUCCH and PUSCH simultaneously, and the UE is scheduled to transmit PUSCH on at least one licensed carrier in subframe n+k, and there is no first type ACK/NACK needs to be fed back on the first uplink carrier, the UE feeds back the periodic CSI on the PUCCH of the third uplink carrier Pcell and/or pScell. Additionally or alternatively, if the UE is configured to be able to transmit PUCCH and PUSCH simultaneously, and the UE is scheduled to transmit PUSCH on at least one licensed carrier in subframe n+k, and it is required to feed back first type ACK/NACK on the first uplink carrier, the UE feeds back the first type ACK/NACK on the PUCCH of the first uplink carrier Pcell/pScell, selects a carrier from the at least one licensed carrier scheduled for transmitting the PUSCH as the third uplink carrier, and transmits the periodic CSI on the PUSCH of the third uplink carrier (it should be noted that, the first uplink carrier and the third uplink carrier may be the same uplink carrier, or different uplink carriers, but both of them are licensed carriers). Additionally or alternatively, if the UE is configured to be able to transmit PUCCH and PUSCH simultaneously, the UE is merely scheduled to transmit PUSCH on at least one unlicensed carrier in subframe n+k, but is not scheduled to transmit PUSCH on licensed carrier, the UE feeds back the periodic CSI and/or the first type ACK/NACK on the PUCCH of the third uplink carrier Pcell and/or pScell. At this time, the first uplink carrier and the third uplink carrier are the same carrier. In this manner, the transmission of the PUSCH on the unlicensed carrier is generally not affected by the transmission on the licensed carrier.

Manner 2: if the UE is not configured to be able to transmit PUCCH and PUSCH simultaneously, and the UE is scheduled to transmit PUSCH on at least one licensed carrier in subframe n+k, the UE selects a carrier from those scheduled to transmit the PUSCH according to a predefined rule as the third uplink carrier, and feeds back the periodic CSI and/or the first type ACK/NACK on the PUSCH of the third uplink carrier. At this time, the first uplink carrier and the third uplink carrier are the same carrier. Additionally or alternatively, if the UE is not configured to be able to transmit PUCCH and PUSCH simultaneously, and the UE is scheduled to transmit the PUSCH on merely at least one unlicensed carrier in subframe n+k, but is not scheduled to transmit the PUSCH on the licensed carrier, the UE feeds back the periodic CSI and/or the first type ACK/NACK and/or the second type ACK/NACK on the PUCCH of the third uplink carrier Pcell and/or pScell, and does not transmit the PUSCH on the unlicensed carrier. At this time, the first uplink carrier and the third uplink carrier are the same carrier. In this manner, the transmission of the PUSCH on the unlicensed carrier is generally affected by the transmission of the PUCCH on the licensed carrier, i.e., if PUCCH is transmitted on the licensed carrier, the PUSCH cannot be transmitted on the unlicensed carrier.

It should be noted that, the second type ACK/NACK is generally transmitted on merely the second uplink carrier. For example, if the second type PUCCH group includes at least one uplink carrier transmitting PUCCH, the second type ACK/NACK is transmitted on the second uplink carrier. Merely in some special cases, the transmission is on the first uplink carrier. The fallback condition has been described in other embodiments of the present disclosure and is not repeated herein.

Suppose that the eNB configures 5 carriers for the UE, wherein CC1 and CC2 are licensed carriers, CC3~CC5 are unlicensed carrier. CC1 is a Pcell, CC1~CC5 belong to the same first type PUCCH group. The PUCCH may be transmitted on CC1. CC3~CC5 belong to the same second type PUCCH group. The ACK/NACK of CC1 and CC2 can only be transmitted on the PUCCH of CC1 or the PUSCH of CC1/CC2. In most cases, the ACK/NACK of CC3~CC5 is not transmitted on CC1/CC2. For example, if there is PUSCH transmission on at least one of CC3~CC5, the ACK/NACK is transmitted on the at least one PUSCH on CC3~CC5. But in some special cases, the ACK/NACK of CC3~CC5 may be transmitted on CC1/CC2, e.g., when there is no PUSCH transmission on any one of CC3~CC5. As to the periodic CSI, the periodic CSI of any one of CC1~CC5 cannot be transmitted on CC3~CC5, i.e., can only be transmitted on CC1/CC2.

Figure 19:
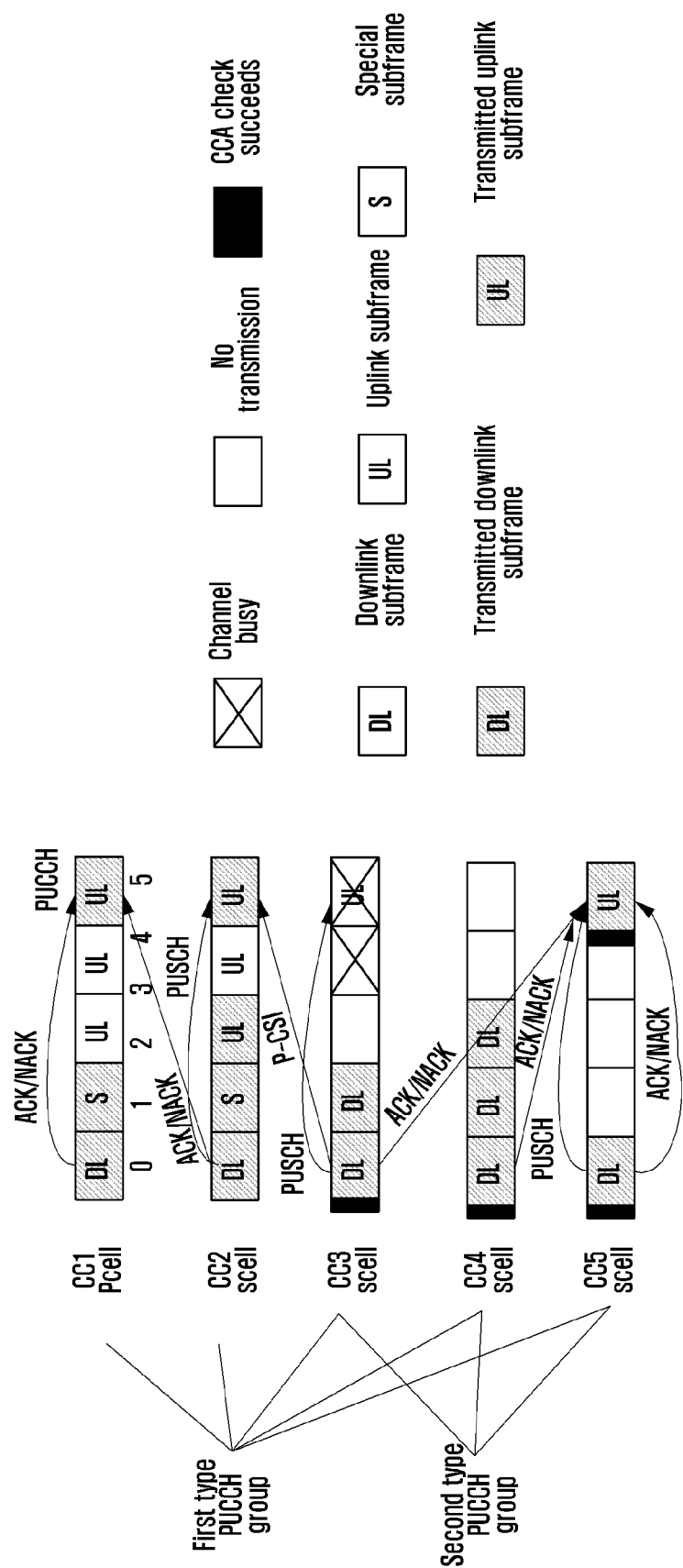
FIG. 19 is a schematic diagram illustrating another method for feeding back CSI information according to some embodiments of the present disclosure.

As shown in FIG. 19, the eNB schedules the UE in subframe n to transmit PUSCH on the CC2, CC3 and CC5 in subframe n+4. In subframe n+4, the UE needs to feed back the ACK/NACK of CC1~CC5 and the periodic CSI of CC3. Suppose that the UE is configured to be able to transmit PUCCH and PUSCH simultaneously. Thus, in subframe n+4, the UE feeds back the ACK/NACK of CC1 and CC2 on the PUCCH on CC1, transmits PUSCH on CC2, and feeds back the periodic CSI of CC3 on the PUSCH on CC2. The UE performs LBT detection on CC3 and CC5, transmits PUSCH on the CC on which the LBT detection succeeds, and feeds back the ACK/NACK of CC3~CC5 on the PUSCH on one or more CCs on which the LBT detection succeeds according to a predefined rule. The predefined rule may be configured according to method described in other embodiments of the present disclosure or according to a conventional method.

Figure 20:
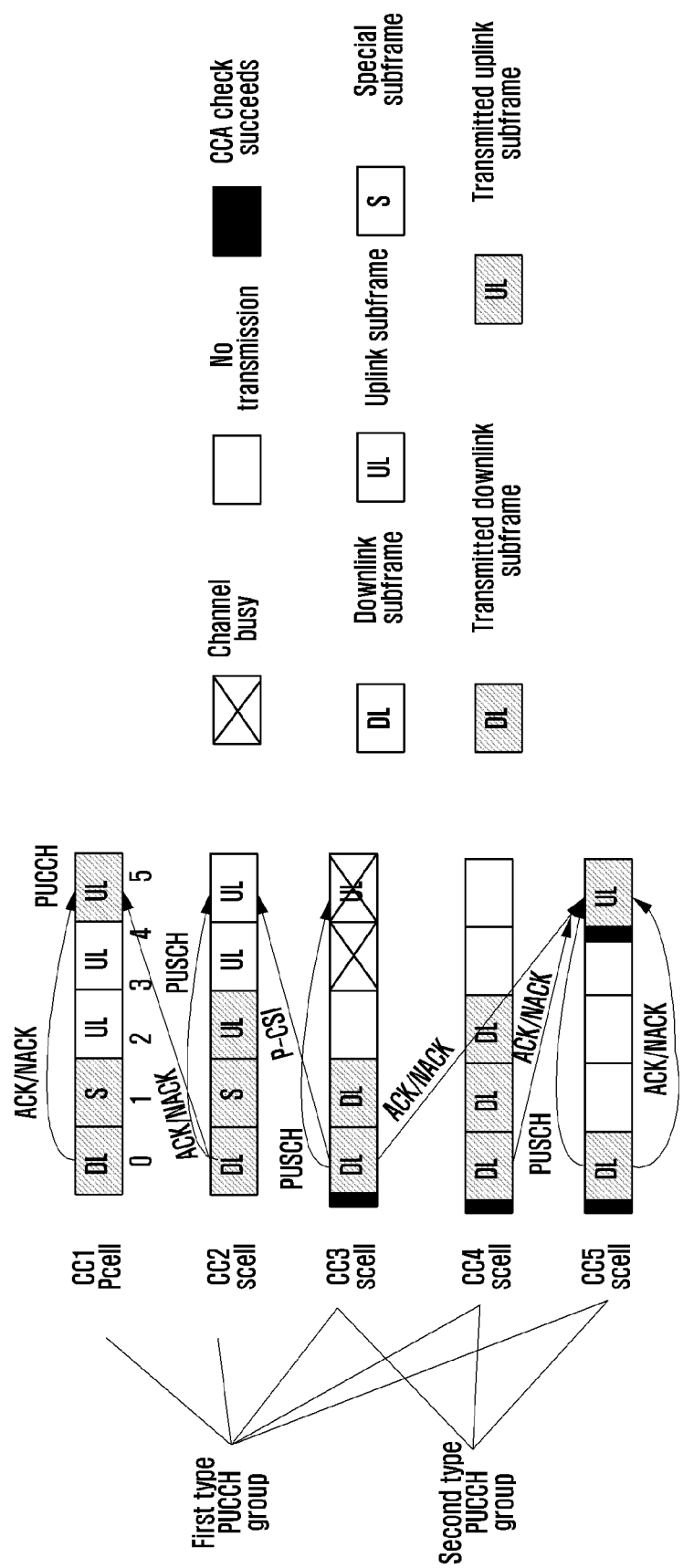
FIG. 20 is a schematic diagram illustrating yet another method for feeding back CSI information according to some embodiments of the present disclosure.
Figure 21:
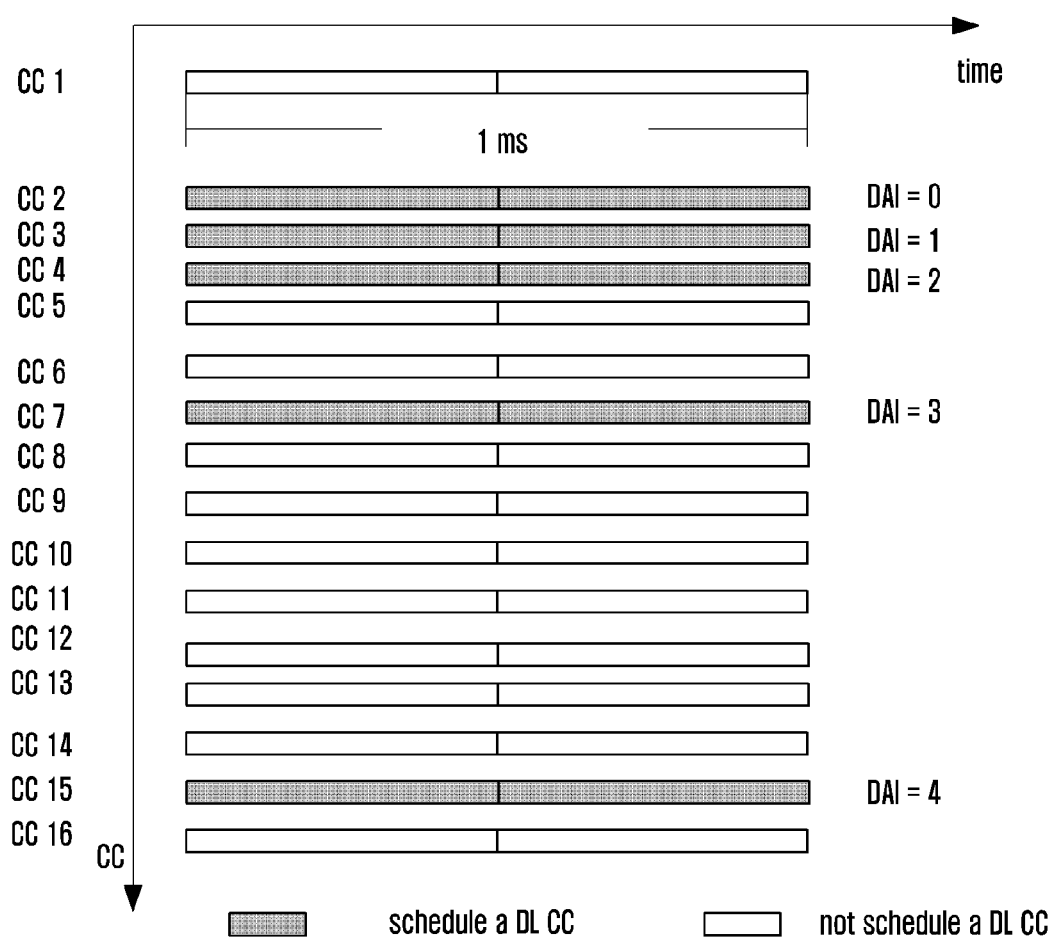
FIG. 21 is a schematic diagram illustrating transmission starting position of a scheduled carrier, when all the aggregated carriers are in the licensed frequency band.
Figure 22:
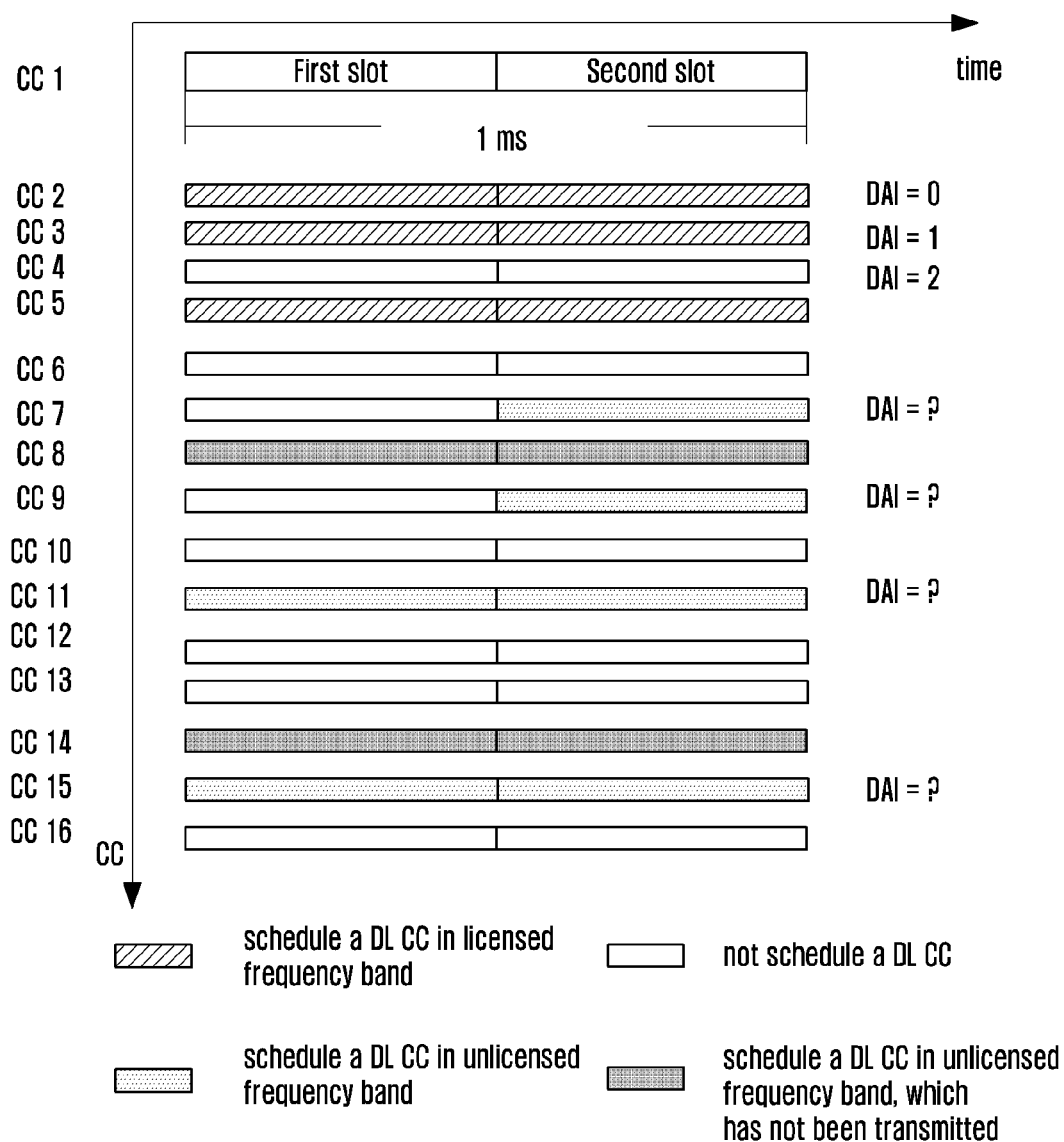
FIG. 22 is a schematic diagram illustrating transmission starting position of a scheduled carrier, when some aggregated carriers are in the licensed frequency band, while the remaining aggregated carriers are in the unlicensed frequency band.
Figure 23A:
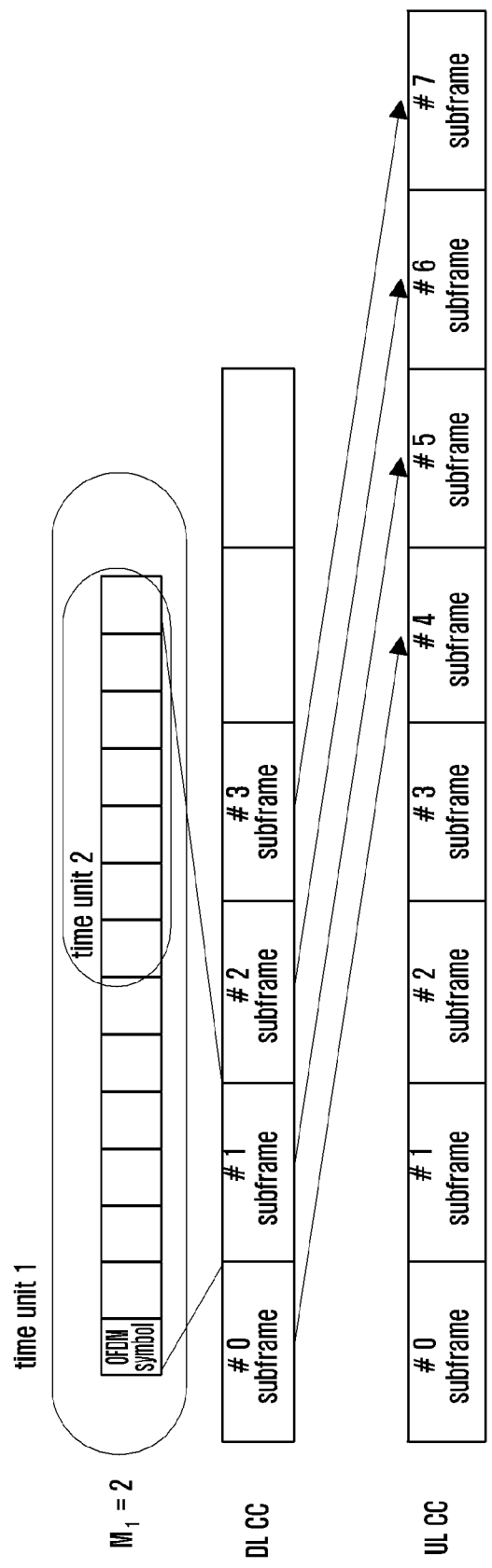
FIG. 23A is a schematic diagram illustrating a time-frequency bundle window, when downlink CC is a FDD carrier.
Figure 23B:
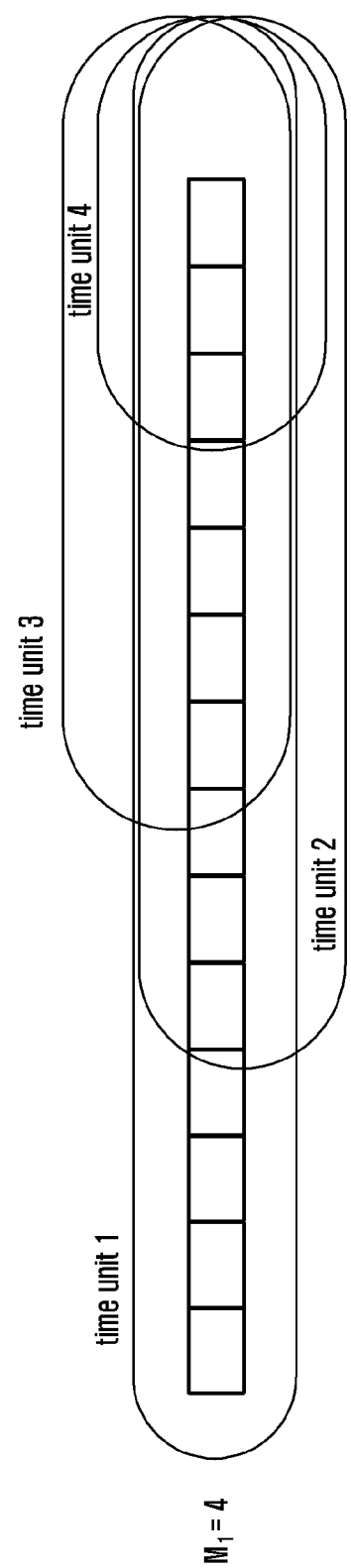
FIG. 23B is a schematic diagram illustrating a time-frequency bundle window, when downlink CC is a FDD carrier.
Figure 24:
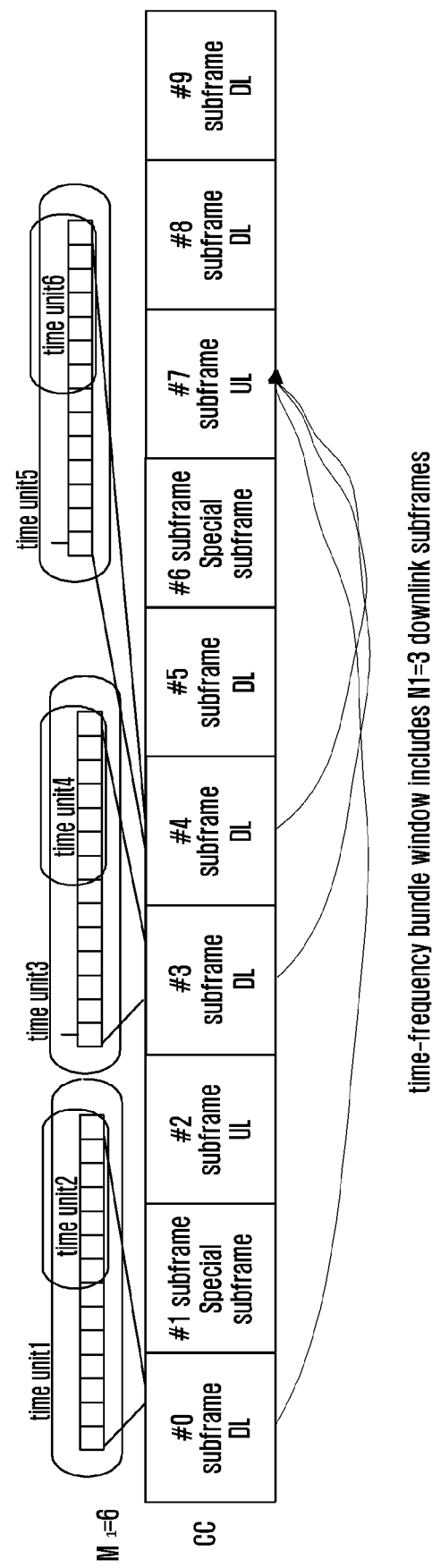
FIG. 24 is a schematic diagram illustrating a time-frequency bundle window, when downlink CC is a TDD carrier.

For another example, as shown in FIG. 20, the eNB schedules in subframe n the UE to transmit PUSCH in subframe n+4 on CC3 and CC5. In subframe n+4, the UE needs to feed back the ACK/NACK of CC1~CC5 and the periodic CSI of CC3. Suppose that the UE is configured to be able to transmit PUCCH and PUSCH simultaneously. Thus, in subframe n+4, the UE feeds back the ACK/NACK of CC1 and CC2 on the PUCCH of CC1, and feeds back the periodic CSI of CC3 on the PUCCH of CC1. The UE performs an LBT detection on CC3 and CC5, transmits PUSCH on the CC on which the LBT detection succeeds, and transmits the ACK/NACK of CC3~CC5 on the PUSCH of one or more CCs on which the LBT detection succeeds according to a predefined rule. It can be seen that, in order to ensure that the periodic CSI (whether the periodic CSI of the licensed carrier or the periodic CSI of the unlicensed carrier) is not transmitted on the unlicensed carrier, if there is at least one licensed carrier in the same first type PUCCH group transmitting PUSCH, the periodic CSI can be transmitted on the PUSCH of the at least one licensed carrier. If there is no licensed carrier transmitting PUSCH in the same first type PUCCH group, the periodic CSI can only be transmitted on the PUCCH of the Pcell or pScell, but not transmitted on the PUSCH of the unlicensed carrier. As to the selection of the PUSCH of the licensed carrier for transmitting the periodic CSI, the PUSCH of a carrier with a minimum Scellindex among those transmitting PUSCH may be selected.

Manner 3: if the UE successfully transmits PUSCH and HARQ-ACK on one uplink carrier of the second type PUCCH group in subframe n+k, and the UE needs to transmit the periodic CSI of downlink carriers of the second type PUCCH group, the UE transmits the periodic CSI on a licensed carrier (the third uplink carrier) corresponding to the second type PUCCH group configured by the base station. The third uplink carrier may carry the periodic CSI by the PUCCH or PUSCH. In some embodiments, the transmission of the periodic CSI of the downlink carriers corresponding to the third uplink carrier may be performed according to a conventional method, i.e., transmitting on a licensed carrier, e.g. the Pcell/pScell of the first type PUCCH group.

Embodiment 9

This embodiment provides a method for transmitting uplink control information on an unlicensed carrier, including the following.

In step 3801, a UE receives a UL grant scheduling a PUSCH on an unlicensed carrier.

In step 3802, the UE determines whether the UL grant received in step 3801 is used for scheduling the UE to transmit PUSCH carrying uplink data, or used for scheduling the UE to transmit PUSCH carrying merely uplink control signaling.

In some embodiments, if the UL grant is DCI scheduling one transmission block (TB), the UL grant indicates Imcs=29, the resource allocation indicates that a group of interlace PRBs are scheduled, and a CSI request indicates a aperiodic CSI reporting, the UE determines that the PUSCH scheduled by the base station does not carry uplink data (no TB for UL-SCH), the UE reports merely uplink control information.

In some embodiments, if the UL grant is DCI scheduling multiple TBs, the UL grant indicates that Imcs=29, merely one TB is scheduled and merely one data stream is scheduled, the resource allocation indicates that the one interlace PRB is scheduled, and the CSI request indicates aperiodic CSI reporting of one carrier or one CSI process, the UE determines that the PUSCH scheduled by the base station does not carry uplink data (no TB for UL-SCH), the UE reports merely uplink control information.

In some embodiments, one interlace includes a group of PRBs with equal intervals in the frequency domain. For example, on a 20 MHz system bandwidth, 10 PRBs with equal intervals form a group, which corresponds to one interlace.

In step 3803, the UE transmits uplink data or merely transmits uplink control signaling according to a transmission mode of the PUSCH determined according to the UL grant.

Figure 15:
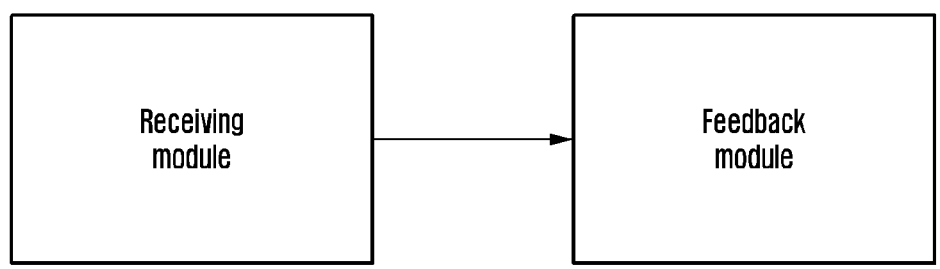
FIG. 15 is a schematic diagram illustrating a structure of an apparatus for feeding back HARQ-ACK information according to some embodiments of the present disclosure.

In accordance with the above method, embodiments of the present disclosure provide an apparatus. As shown in FIG. 15, the apparatus includes a receiving module and a feedback module; wherein the receiving module is configured to receive a DL-GRANT scheduling downlink HARQ transmission in a time-frequency bundling window corresponding to an uplink subframe responsible for HARQ-ACK feedback and/or time-frequency bundling windows corresponding to all uplink subframes in a feedback window of uplink subframes responsible for HARQ-ACK feedback, obtain a DL DAI and/or a total DAI and/or a counter DAI in the DL-GRANT, and determine a mapping value of each DAI; and the feedback module is configured to map HARQ-ACK bits of each HARQ feedback unit to corresponding bits of a feedback bit sequence according to the mapping value of the corresponding DAI.

Embodiment 10

The embodiment provides a method for feeding back HARQ-ACK information, which is applicable to a downlink multicarrier transmission system, e.g., CA system or DC system. The method may include the following blocks.

In step 3901, a UE receives DL-Assignment scheduling a downlink HARQ transmission within a time-frequency bundle window, which corresponds to an uplink subframe feeding back HARQ-ACK, obtains a first-category DL DAI in the DL-Assignment, and determines a mapping value of each first-category DL DAI.

In step 3902, the UE detects a HARQ feedback unit of each downlink HARQ transmission within the time-frequency bundle window, and determines a corresponding HARQ-ACK bit.

In step 3903, the UE determines the total length $O_{ACK}$ of feedback bit sequence fed back in subframe n, based on detected DAI.

In step 3904, the UE maps the HARQ-ACK bit of each HARQ feedback unit to a corresponding bit of the feedback bit sequence, based on the mapping value of the corresponding first-category DL DAI, and reports the feedback bit sequence to eNB.

The HARQ feedback unit refers to an entity, which corresponds to each HARQ-ACK bit fed back by the UE. In the present disclosure, the HARQ feedback unit may be a downlink subframe, or a downlink time unit, or a TB.

Specifically, when the HARQ feedback unit is the downlink subframe, each downlink subframe with downlink HARQ transmission may generate one HARQ-ACK bit (which may be referred to as HARQ-ACK bit of subframe in the following for short) mapping to the feedback bit sequence. When TM of the downlink subframe is one TB, foregoing one HARQ-ACK bit refers to HARQ-ACK bit corresponding to TB transmitted in the subframe; otherwise, when TM of the downlink subframe is two TBs, foregoing one HARQ-ACK bit refers to a result, which is obtained after performing spatial HARQ-ACK bundling to two HARQ-ACK bits corresponding to two TBs transmitted within the subframe.

When the HARQ feedback unit is the downlink time unit, each downlink time unit with downlink HARQ transmission may generate one HARQ-ACK bit (which may be referred to as HARQ-ACK bit of time unit in the following for short) mapping to the feedback bit sequence. When TM of the downlink time unit is one TB, foregoing one HARQ-ACK bit corresponds to TB transmitted in the time unit; otherwise, when TM of the downlink time unit is two TBs, foregoing one HARQ-ACK bit refers to a result, which is obtained after performing spatial bundling to two HARQ-ACK bits corresponding to two TBs transmitted in the time unit.

When the HARQ feedback unit is the TB, HARQ-ACK bit of each TB corresponds to one bit in the feedback bit sequence fed back. For a subframe or time unit with downlink HARQ transmission in a carrier, in which TM of the carrier is one TB, one bit in foregoing feedback bit sequence corresponds to the subframe or time unit; otherwise, when TM of a carrier is two TBs, for a subframe or time unit with downlink HARQ transmission of the carrier, two bits in foregoing feedback bit sequence correspond to the subframe or time unit.

The UE determines category of the HARQ feedback unit after receiving signaling from eNB. Foregoing signaling includes at least one of: broadcast message, radio resource control (RRC) layer signaling, media access control (MAC) layer signaling, or physical layer signaling.

In an example, the time-frequency bundle window includes time units for all the downlink HARQ transmissions, which need to feed back HARQ-ACK in uplink subframe n. All the time units are sorted according to a set rule.

In an example, the time unit is N OFDM symbols. Length N of each time unit may be different. Detailed descriptions for number of downlink subframes in the time-frequency bundle window, and definition for time unit in the time-frequency bundle window will be provided in the following.

(1) When the time-frequency bundle window includes one DL subframe, the time-frequency bundle window includes $M_1$ time units. The $M_1$ time units respectively take $L_1^{th}$, $L_2^{th}$, ..., $L_m^{th}$ OFDM symbols in the downlink subframe as the starting point. The last Z OFDM symbols in the downlink subframe are time resources of end point. For example, Z=1. That is, sort each time unit based on sequence of starting point of each time unit. A time unit with earlier starting point is before another time unit with later starting point within the time-frequency bundle window. For example, as shown in FIG. 33a, $M_1$=2, the first time unit corresponds to first OFDM symbol in the downlink subframe. That is, #$0^{th}$ OFDM symbol is time resource of starting point to end point, in which end point is the last OFDM symbol in the downlink subframe. Starting point to end point refers to one subframe. The second time unit corresponds to eighth OFDM symbol in the downlink subframe. That is, #$7^{th}$ OFDM symbol is time resource of starting point to end point, in which end point is the last OFDM symbol in the downlink subframe. Starting point to end point is a slot. In another example, as shown in FIG. 33b, $M_1$=4, the first time unit corresponds to first OFDM symbol in the downlink subframe. That is, #$0^{th}$ OFDM symbol is time resource of starting point to end point, in which end point is the last OFDM symbol in the downlink subframe. The starting point to end point is one subframe. The second time unit corresponds to fifth OFDM symbol in the downlink subframe. That is, #$4^{th}$ OFDM symbol is time resource of starting point to end point, which includes 10 OFDM symbols. The end point is the last OFDM symbol in the downlink subframe. The third time unit corresponds to eighth OFDM symbol in the downlink subframe. That is, #$7^{th}$ OFDM symbol is time resource of starting point to end point, which is one slot. The end point is the last OFDM symbol in the downlink subframe. The fourth time unit corresponds to twelfth OFDM symbol in the downlink subframe. That is, #$11^{th}$ OFDM symbol is time resource of starting point to end point, which includes 3 OFDM symbols. The end point is the last OFDM symbol in the downlink subframe. Foregoing two examples are illustrative, the technical solution provided by the present disclosure is also applicable to other examples, in which downlink subframe is divided into smaller time unit with other granularity in time dimension. To facilitate descriptions, descriptions will be provided in the following with an example, in which $M_1$=2 and starting points of two time units are respectively start of a subframe and start of the second slot.

(2) When the time-frequency bundle window includes multiple subframes, e.g., $N_1$ downlink subframes, the time-frequency bundle window includes $M_2$ time units. Any time unit corresponds to time resource of starting point to end point, which includes last Z OFDM symbols of a downlink subframe in $N_1$ subframes, e.g., Z=1. The start pointing is $L^{th}$ OFDM symbol in the downlink subframe. For example, foregoing $M_2$ time units respectively correspond to the following time resources: time resource of starting point to end point, in which starting point is $L_1^{th}$, $L_2^{th}$, ..., $L_M^{th}$ OFDM symbol in a first downlink subframe, end point is the last OFDM symbol in the first downlink subframe; time resource of starting point to end point, in which starting point is $L_1^{th}$, $L_2^{th}$, ..., $L_M^{th}$ OFDM symbol in a second downlink subframe, end point is the last OFDM symbol in the second downlink subframe; . . . , time resource of start pointing to end point, in which starting point is $L_1^{th}$, $L_2^{th}$, ..., $L_M^{th}$ OFDM symbol in $N_1^{th}$ downlink subframe, end point is the last OFDM symbol in $N_1^{th}$ downlink subframe. That is, sort each time unit based on sequence of each downlink subframe transmitted within the time unit. Sort different time units in the same downlink subframe, based on sequence of starting point of each time unit. A time unit with earlier downlink subframe is before another time unit with later downlink subframe in the time-frequency bundle window. For different time units of the same downlink subframe, a time unit with earlier starting point is before another time unit with later starting point in the time-frequency bundle window.

DAI value of downlink HARQ transmission corresponding to each time unit within the time-frequency bundle window may be determined with the following methods.

(1) When the time-frequency bundle window includes one downlink subframe, eNB transmits DL-Assignment scheduling carrier c. The first-category DL DAI in DL-Assignment is to indicate the total number of HARQ feedback units. The HARQ feedback units are transmitted by eNB in the downlink subframe from the first time unit to $k^{th}$ time unit for downlink HARQ transmission scheduled by DL-Assignment, or from the first time unit to $k^{th}$ time unit for transmitting DL-Assignment, and from the first carrier to carrier c scheduled by DL-Assignment. Carrier index corresponds to DAI value based on a predefined rule. The foregoing first carrier is a carrier with the minimum DAI value. For example, ascending order or descending order of carrier index corresponds to ascending order of DAI. Value $m_{DAI1,c,k}$ of first-category DAI may be implemented with the following pseudo code.

```
set m_DAI1 = 0
set i = 1
set j=1
  while i<=M_1
    while j<=Nc
``` if on carrier j, subframe $(n-k_c)$ is a downlink subframe, HARQ-ACK bit of the subframe is fed back in uplink subframe n, and eNB starts to transmit PDCCH/EPDCCH scheduling PDSCH with $i^{th}$ downlink time unit within subframe $(n-k_c)$, in which $(n-k_c)$ represents subframe number,

```
m_DAI1 = m_DAI1+1
    if (i==k) &&(j==c)   m_DAI1,c,k = m_DAI1
    else
        m_DAI1 = m_DAI1
    end if
    j=j+1;
  end while
  i=i+1;
end while
``` j represents carrier index of a carrier transmitted within a time unit of the time-frequency bundle window, 0<j=Nc;

Nc represents the total number of downlink member carriers feeding back HARQ-ACK in the uplink subframe;

the subframe number of the downlink subframe within the time-frequency bundle window is $(n-k_c)$; n represents subframe number of the uplink subframe; $k_c$ is a predefined value, e.g., $k_c$=4;

i represents the index of time unit within downlink subframe $(n-k_c)$, $0<i \leq M_1$.

It should be noted that, when transmitting PDCCH/EPDCCH in a downlink subframe of the same carrier, the PDCCH/EPDCCH usually is transmitted from one of $M_1$ starting points. Multiple PDCCH/EPDCCH with different transmission starting points will not occur. Besides, for one DL transmission burst on carriers in the unlicensed frequency band, starting point of PDCCH/EPDCCH within the first subframe may be one of $M_1$ starting points. However, in subsequent subframes of the DL transmission burst, starting point of PDCCH/EPDCCH is fixed and determined uniquely, or, time unit for transmitting starting point of PDCCH/EPDCCH is fixed.

When the UE learns that first-category DAI values of all the carriers received in downlink subframe $(n-k_c)$ within the time-frequency bundle window are discontinuous, e.g., suppose the total number of PDCCH/EPDCCH of all the PDSCHs and PDCCH/EPDCCH indicating downlink SPS release is $U_{DAI}$, which are detected by the UE from the first time unit to current time unit k, and from the first carrier to carrier c, when the first-category DAI value in the received DL-Assignment DCI meets the following condition: $m_{DAI1} \neq (U_{DAI}-1) \mod 4+1$, the UE detects that at least one DL-Assignment has been missed. In the feedback bit sequence of the UE, the bit corresponding to HARQ feedback unit of PDSCH scheduled by missed PDCCH/EPDCCH may be configured to be NACK.

Figure 25:
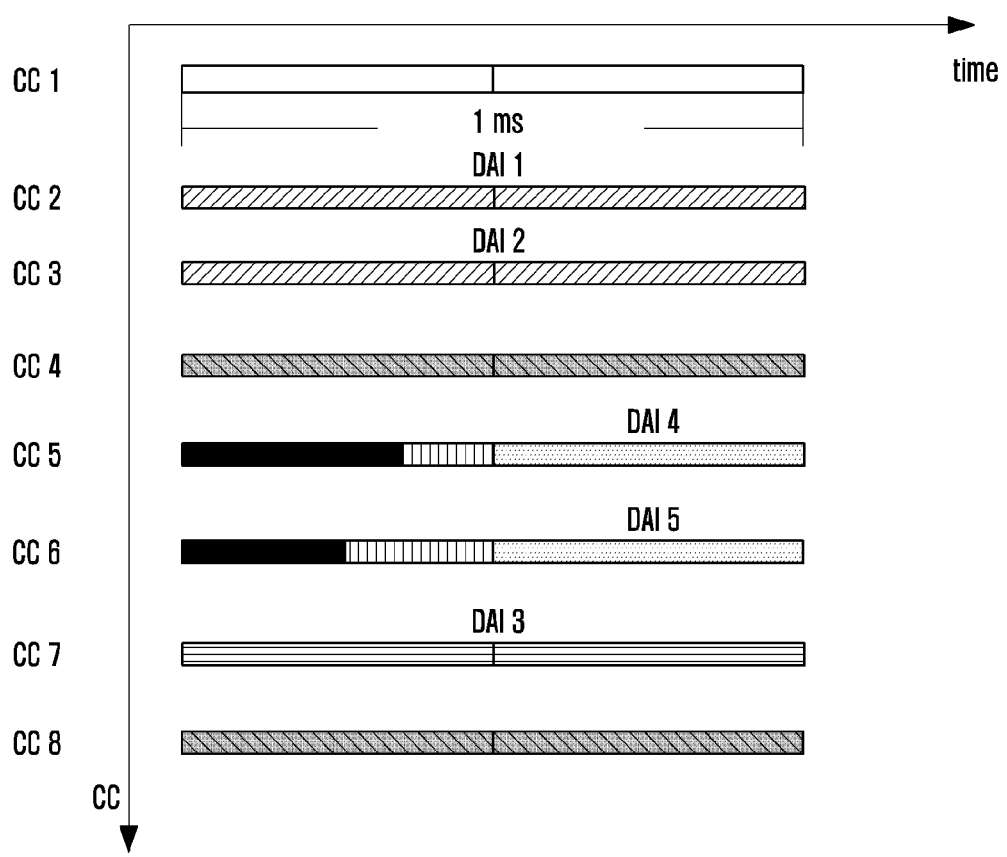
FIG. 25 is a first schematic diagram illustrating a first-category DL DAI, in accordance with an example of the present disclosure.

FIG. 25 illustrates a more detailed example. In the example, eNB has configured 8 carriers for the UE. CC1, CC2 and CC3 are carriers in the licensed frequency band, while CC4-CC8 are carriers in the unlicensed frequency band. The eNB predicts to schedule 7 carriers in downlink subframe $(n-k_c)$ within the time-frequency bundle window to perform downlink transmission, e.g., CC2-CC8. CC2 and CC3 are transmitted from the first time unit of the subframe, e.g., from the starting point of the subframe. Transmission of carriers in the unlicensed frequency band depends on a result, which is obtained after performing LBT carrier detection. CC4 does not pass clear channel assessment (CCA) detection, which cannot occupy a channel in the subframe. CC5 and CC6 occupy the channel in the second slot, and transmit HARQ feedback units. CC8 does not pass CCA detection, and cannot occupy the channel. However, CC7 occupies the channel, and starts to transmit HARQ feedback unit at the start of the subframe. Thus, when transmitting DAI, for carriers starting to be transmitted in the first time unit, the eNB firstly numbers the first-category DAI according to an ascending order of carrier index. That is, CC2 DAI=1, CC3 DAI=2, CC7 DAI=3. And then, for carriers starting to be transmitted in the second time unit, the eNB numbers the first-category DAI according to an ascending order of carrier index. That is, CC5 DAI=4, CC6 DAI=5.

After receiving DAI, the UE maps HARQ-ACK bit of each HARQ feedback unit to a corresponding bit of the feedback bit sequence, based on mapping value of DL DAI. Thus, after receiving DAIS of these 5 carriers, the UE determines the total length of ACK/NACK bits fed back, based on DAI of a CC with maximum carrier index received in the second slot, that is, DAI value of CC6. Suppose these 5 carriers support one-TB TM, the length of ACK/NACK bits is 5. The UE sorts corresponding ACK/NACK based on sequence of DAI 1-5. When the UE receives partial DAI, for example, (a) the UE receives DAIS 1, 2, 4, 5 of CC2, CC3, CC5, CC6, when the UE detects DAI 4, $U_{DAI}$=3, $m_{DAI1}$=4, the UE learns that $m_{DAI1} \neq (U_{DAI}-1) \mod 4+1$, and determines that one DAI is missed. The UE still determines that the total length of ACK/NACK bits fed back is 5 bits, based on DAI of a CC with maximum carrier index received in the second slot, that is, DAI value of CC6. For ACK/NACK corresponding to DAIS 1, 2, 4, 5 and NACK of missed DAI 3, the UE sorts foregoing ACK/NACK bits based on sequence of DAI. Suppose PDSCHs of CC2, CC3, CC5 and CC6 are demodulated correctly, ACK bits generated by the UE are ACK ACK NACK ACK ACK. Although the UE cannot determine whether the HARQ feedback unit corresponding to missed DAI 3 is transmitted from the first slot or second slot, the UE still determines position of the corresponding NACK in the ACK sequence fed back;

(b) when the UE receives DAIS 1, 3, 5 of CC2, CC7 and CC6, the UE determines that two DAIS are missed. The UE still determines that the total length of ACK/NACK bits fed back is 5 bits, based on DAI of a CC with maximum carrier index received in the second slot, that is, DAI value of CC6. For ACK/NACK corresponding to DAIS 1, 3, 5 and NACK of missed DAIS 2, 4, the UE sorts ACK/NACK according to DAI sequence. When PDSCHs of CC2, CC7, CC6 are correctly demodulated, ACK bits generated by the UE are ACK NACK ACK NACK ACK. The UE determines that PDSCH corresponding to missed DAI 2 is transmitted from the first slot, based on DAI 1 and DAI 3 detected in the first slot. However, the UE cannot determine whether PDSCH corresponding to missed DAI 4 is transmitted from the first slot or the second slot. The UE still determines the position of corresponding NACK in the ACK sequence fed back.

(2) When the time-frequency bundle window includes multiple downlink subframes, the first-category DAI scheduling carrier c transmitted by eNB may indicate the total number of HARQ feedback units, which are transmitted by eNB in all the downlink subframes within the time-frequency bundle window from the first time unit to $k^{th}$ time unit, from the first carrier to carrier c, from the first downlink subframe (that is, downlink subframe $(n-k_{max,c})$) to downlink subframe $(n-k_c)$ within the time-frequency bundle window. $k_c \in K_c$ $K_c$ depends on HARQ timing relationship employed by HARQ-ACK of downlink subframe on carrier c, which is fed back by UE in uplink subframe n. DAI value $m_{DAI1,c,k,n-kc}$ may be determined with two methods denoted with pseudo code.

A first method: perform a joint count to first-category DAI in subframe dimension and carrier dimension.

```
set m_DAI1=0
set l= k_max,c
set i=1
set j=1
while 1>= k_min,c
    while i<=M_l
        while j<=Nc
``` if on carrier j, subframe (n−1) is a downlink subframe, HARQ-ACK bit of subframe (n−1) is fed back in an uplink subframe n, eNB starts to transmit PDCCH/EPDCCH scheduling PDSCH in $i^{th}$ downlink time unit within subframe (n−1), in which (n−1) represents subframe number,

```
m_DAI1 = m_DAI1+1
if (i==k) &&(j==c) &&(l== k_c)   m_DAI1,c,k,n-kc = m_DAI1
    else
        m_DAI1 = m_DAI1
    end if
    j=j+1;
    end while
i=i+1;
end while
l=l−1;
end while
``` j represents carrier index of a carrier transmitted within a time unit of the time-frequency bundle window, 0<j≤Nc;

Nc represents the total number of downlink member carriers feeding back HARQ-ACK in the uplink subframe;

the subframe number of the downlink subframe within the time-frequency bundle window is $(n-k_c)$; n represents subframe number of the uplink subframe; $k_c$ represents a predefined value, e.g., $k_c=4$;

i represents an index of a time unit within downlink subframe $(n-k_c)$, 0<i≤M$_1$;

$k_{min,c}$ represents the last downlink subframe within the time-frequency bundle window.

Figure 26:
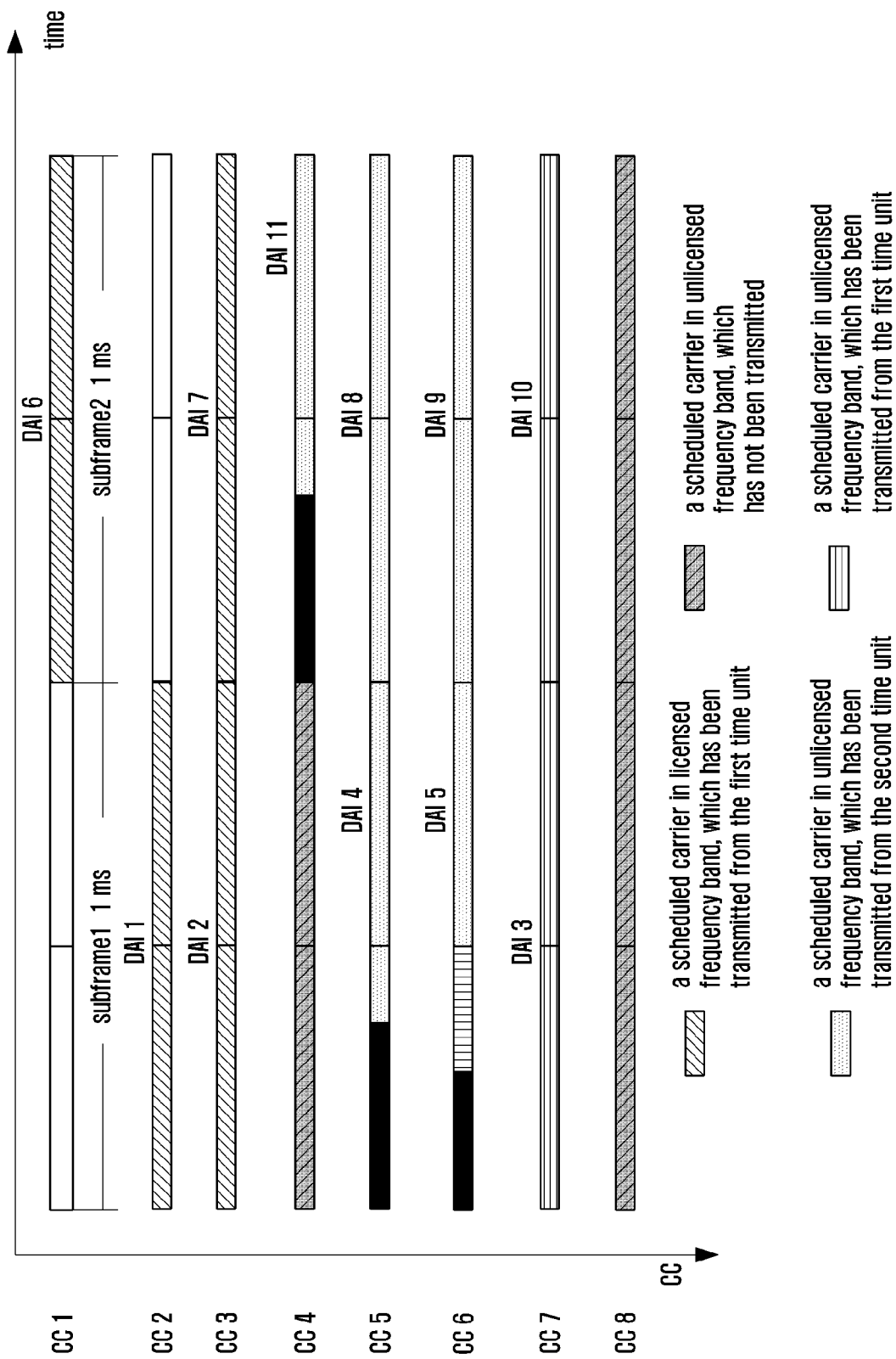
FIG. 26 is a second schematic diagram illustrating the first-category DL DAI, in accordance with an example of the present disclosure.

FIG. 26 illustrates a more detailed example. In the example, eNB has configured 8 carriers for the UE. CC1-CC3 are carriers in the licensed frequency band. CC4-CC8 are carriers in the unlicensed frequency band. The time-frequency bundle window includes two downlink subframes, which are respectively subframes 1 and 2. The eNB predicts to schedule 7 carriers in subframe 1 to perform downlink transmission, e.g., CC2-CC8. CC2 and CC3 are transmitted from the first time unit of the subframe, e.g., from the starting point of the subframe. Transmission of carriers in the unlicensed frequency band depends on a result, which is obtained after performing LBT carrier detection. CC4 does not pass CCA detection, and cannot occupy a channel in the subframe. CC5 and CC6 occupy the channel in the second slot, and transmit PDSCH/PDCCH/EPDCCH. CC8 does not pass CCA detection, and cannot occupy the channel. CC7 occupies the channel, and starts to transmit HARQ feedback unit from the starting point of the subframe. The eNB predicts to schedule 7 carriers in subframe 2 to perform downlink transmission, CC1, CC3-CC8. CC1 and CC3 in the licensed frequency band will be transmitted from the first time unit of subframe 2, that is, from the starting position of the subframe. Transmission of carriers in the unlicensed frequency band depends on a result, which is obtained after performing LBT carrier detection. CC8 does not pass CCA detection, and cannot occupy the channel in the subframe. CC4 occupies the channel in the second slot, and transmits PDSCH/PDCCH/EPDCCH. CC5-CC7 in the unlicensed frequency band occupy the channel in subframe 1, which may be directly transmitted from the first time unit of subframe 2, since it is not necessary to perform LBT in subframe 2. Thus, when transmitting DAI, for carriers starting to be transmitted from the first time unit of subframe 1, the eNB firstly numbers the first-category DAI based on an ascending order of carrier index. That is, CC2 DAI=1, CC3 DAI=2, CC7 DAI=3. For carriers starting to be transmitted from the second time unit of subframe 1, the eNB numbers the first-category DAI based on an ascending order of carrier index. That is, CC5 DAI=4, CC6 DAI=5. And then, for carriers starting to be transmitted from the first time unit of subframe 2, the eNB numbers first-category DAI based on an ascending order of carrier index. That is, CC1 DAI=6, CC3 DAI=7, CC5 DAI=8, CC6 DAI=9, CC7 DAI=10. For carriers starting to be transmitted from the second time unit of subframe 2, the eNB numbers the first-category DAI based on carrier index, that is, CC4 DAI=11.

After receiving DAI, the UE maps HARQ-ACK bit of each HARQ feedback unit to a corresponding bit of feedback bit sequence, based on mapping value of DL DAI. Thus, after receiving all the DAIS, the UE determines the total length of ACK/NACK bits fed back, based on DAI of a CC with maximum carrier index received by the second subframe in the second slot, e.g., DAI value of CC4. Suppose all the carriers only support two-TB TM, the total length of ACK/NACK bits is 2*DAI value=2*11=22. In the example, the HARQ feedback unit is time unit, instead of TB. The UE sorts corresponding ACK/NACK, based on sequence of DAIS 1-11. When the UE only receives partial DAI, for example, (a) if the UE only receives DAIS 1, 4, 5, 3 of CC2, CC5, CC6 and CC7 of subframe 1, and DAIS 6, 9, 11 of CC1, CC6, CC4 of subframe 2, the UE determines that DAI 2 is missed in the first slot of subframe 1, meanwhile three DAIS are missed in subframe 2, which include DAI 7, DAI 8 and DAI 10. The UE also determines that DAIS 7, 8 are missed in the first slot of subframe 2. However, the UE cannot determine DAI 10 is missed in which slot of subframe 2. The UE still determines a position mapping to a corresponding NACK. The UE determines that the total length of ACK/NACK bits fed back is 22 bits, based on DAI value of CC4 with the maximum carrier index received in second slot of subframe 2. For ACK/NACK corresponding to detected DAIs and NACK corresponding to missed DAIs, the UE sorts ACK/NACK bits based on an ascending order of DAI index.

(b) After receiving DAIs 1, 4, 3 of CC2, CC5, CC7 of subframe 1, and DAIs 7, 11, 9, 10 of CC3, CC4, CC6, CC7 of subframe 2, the UE determines that DAI 2 is missed in the first slot of subframe 1, DAI 8 is missed in the first slot of subframe 2, and two DAIs (DAI 5 and DAI 6) are missed in the second slot of subframe 1 or in the first slot of subframe 2. Although the UE cannot determine whether these two DAIs are missed in the second slot of subframe 1, or in the first slot of subframe 2, the UE still determines positions of NACK corresponding to these two DAIs. The UE still determines that the total length of ACK/NACK bits fed back is 22 bits, based on DAI value of CC4 with the maximum carrier index received in the second slot of subframe 2. For ACK/NACK of detected DAI and NACK of missed DAI, the UE sorts ACK/NACK bits based on an ascending order of DAI index.

A second method is to respectively count the first-category DAI in subframe dimension and carrier dimension. That is, two independent DAIs respectively correspond to subframe dimension and carrier dimension. DAI in subframe dimension is determined with a method in current standard, e.g., method of 7.3.2.1 in TS 36.213. The eNB and UE respectively count DAI in carrier dimension with a method, which is provided by (1) when the time-frequency bundle window includes one downlink subframe in the embodiment.

In another implementation mode of the embodiment, respectively count the value of first-category DAI within each time unit. For example, regarding (1) where time-frequency bundle window includes one downlink subframe, suppose the downlink subframe includes $M_1=2$ time units, the whole subframe and the second slot, in current time unit k, first-category DAI $m_{DAI1}$ in DL-Assignment DCI of carrier c may indicate the number of HARQ feedback units, which are accumulated from the first carrier to carrier c in the downlink subframe of current time unit k. And then, the UE maps HARQ-ACK bit of each HARQ feedback unit to a corresponding bit of feedback bit sequence, based on mapping value of received DL DAI and sequence of time units. For (2) where the time-frequency bundle window includes multiple downlink subframes, continuously number first-category DAI $m_{DAI1}$ in DL-Assignment DCI of the same time unit of multiple subframes, e.g., the time-frequency bundle window includes two downlink subframes, continuously number DAIs for the first slots of subframes 1 and 2, continuously number DAIs for the second slots of subframes 1 and 2. However, respectively number DAI of first slot and second slot.

Figure 27:
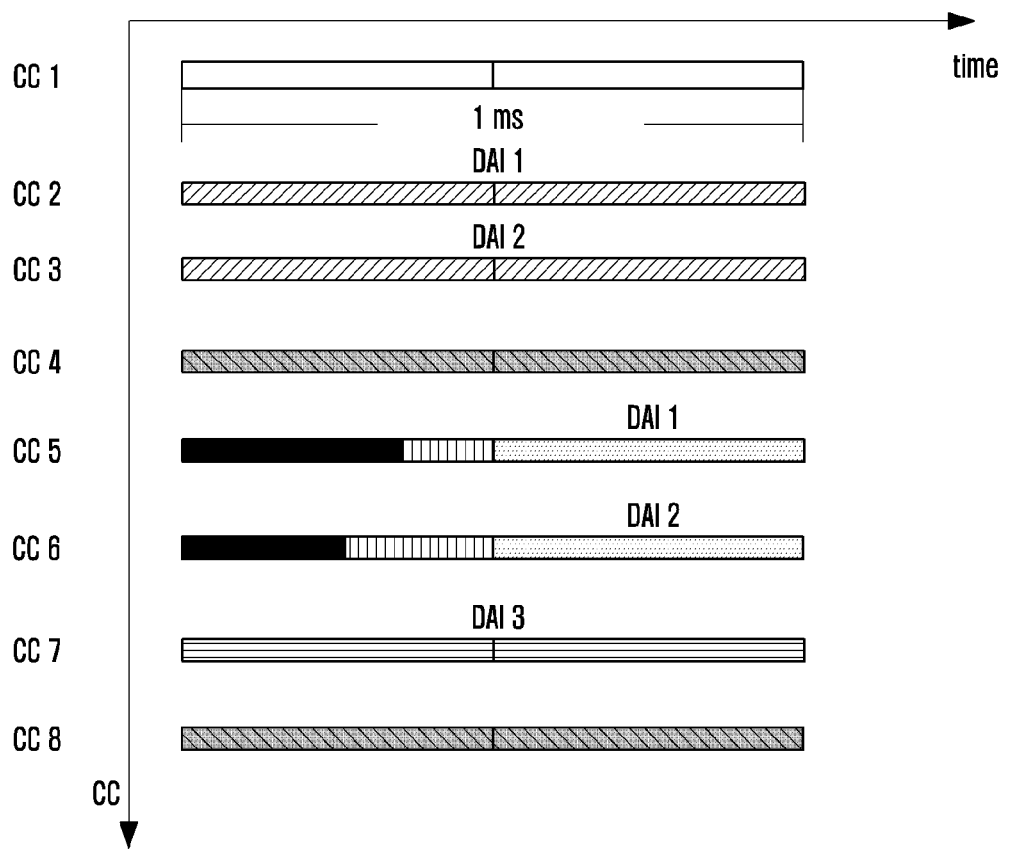
FIG. 27 is a third schematic diagram illustrating the first-category DL DAI, in accordance with an example of the present disclosure.

As shown in FIG. 27, in the example (1) where the time-frequency bundle window only includes one downlink subframe, DAIs of CC2, CC3 and CC7 starting to be transmitted in the first slot are respectively DAI 1, DAI 2, DAI 3. DAIs of CC5, CC6 starting to be transmitted in the second slot are respectively DAI 1 and DAI 2. For DAIs respectively received in two slots, the UE sorts ACK/NACK fed back, based on an ascending order of DAI value and sequence of slots. That is, the UE feeds back ACK/NACK based on sequence of CC2, CC3, CC7, CC5 and CC6.

Figure 28:
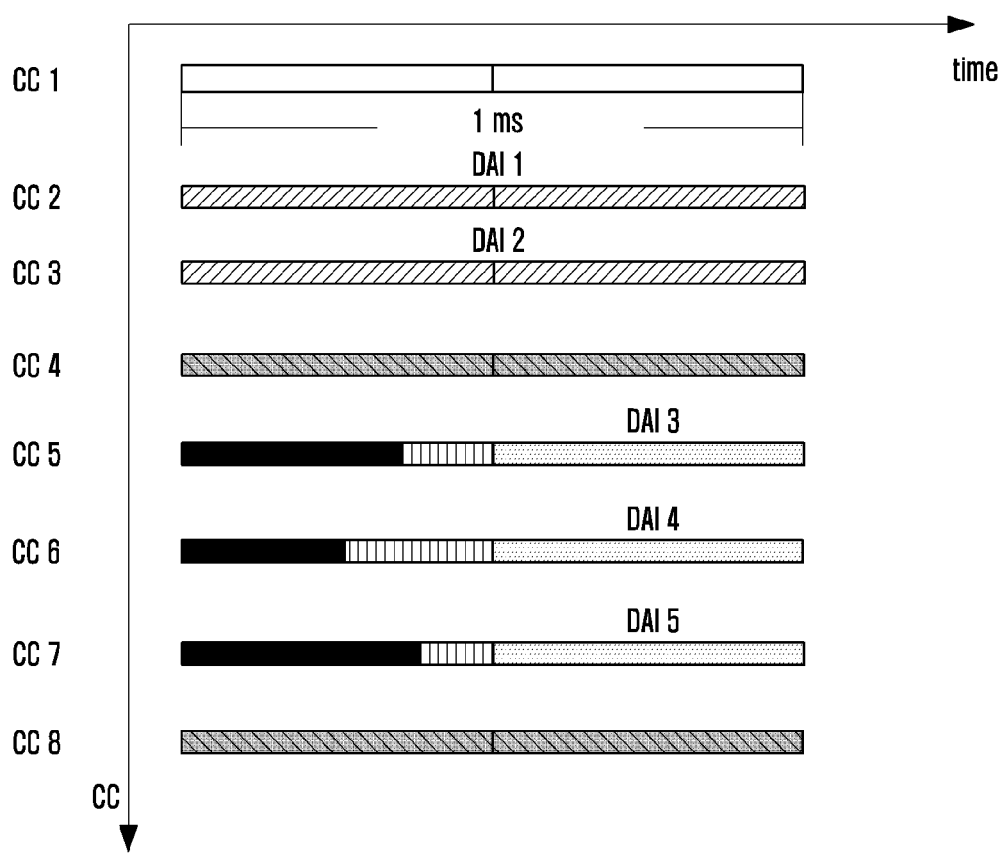
FIG. 28 is a fourth schematic diagram illustrating the first-category DL DAI, in accordance with an example of the present disclosure.

A simplified example of the embodiment is as follows. When the probable starting point for transmitting HARQ feedback unit of each carrier in the unlicensed frequency band configured for the UE is necessarily the same, the eNB may configure a smaller carrier index for a carrier in the licensed frequency band, configure a greater carrier index for a carrier in the unlicensed frequency band, and configure a one-to-one correspondence between first-category DAI and carrier index according to an ascending order. In such case, it is not necessary to divide subframe into a smaller time unit. Number DAI based on sequence of carrier index, and/or, sequence of subframes within time-frequency bundle window. For example, it is restricted that all the carriers in the unlicensed frequency band configured for the UE may be transmitted simultaneously, due to the impact of leakage of adjacent frequency, or in order to avoid occupying excessive wifi resources. That is, all the carriers in the unlicensed frequency band will transmit signals from the same time, e.g., from subframe boundary, or from the second slot. Since carriers in the licensed frequency band are always transmitted from subframe boundary, when carriers in the unlicensed frequency band are transmitted from a first time point, and carriers in the licensed frequency band are transmitted from a second time point within the same subframe, the first time point is not earlier than the second time point. Thus, firstly number DAIs for carriers in the licensed frequency band, and then number DAIs for carriers in the unlicensed frequency band. Subsequently, uncertain problem for firstly numbering carriers transmitted later within the same subframe may be avoided. As shown in FIG. 28, CC1-CC3 are carriers in the licensed frequency band. CC4-CC8 are carriers in the same unlicensed frequency band. CC4-CC8 may be simultaneously transmitted or not transmitted. CC4 and CC8 cannot occupy channel, and cannot be transmitted within the subframe. After the subframe boundary, CC5-CC7 have completed the CCA detection before the second slot. Although extended clear channel assessment (eCCA) time respectively completed by CC5-CC7 is different, it is necessary to assign transmission time of CC5-CC7, which will be transmitted together in the second slot. And then, number DAI for CCs based on an ascending order of carrier index, which are respectively DAIS 1-5. Signals of foregoing CCs have been successfully transmitted within the subframe.

Figure 29:
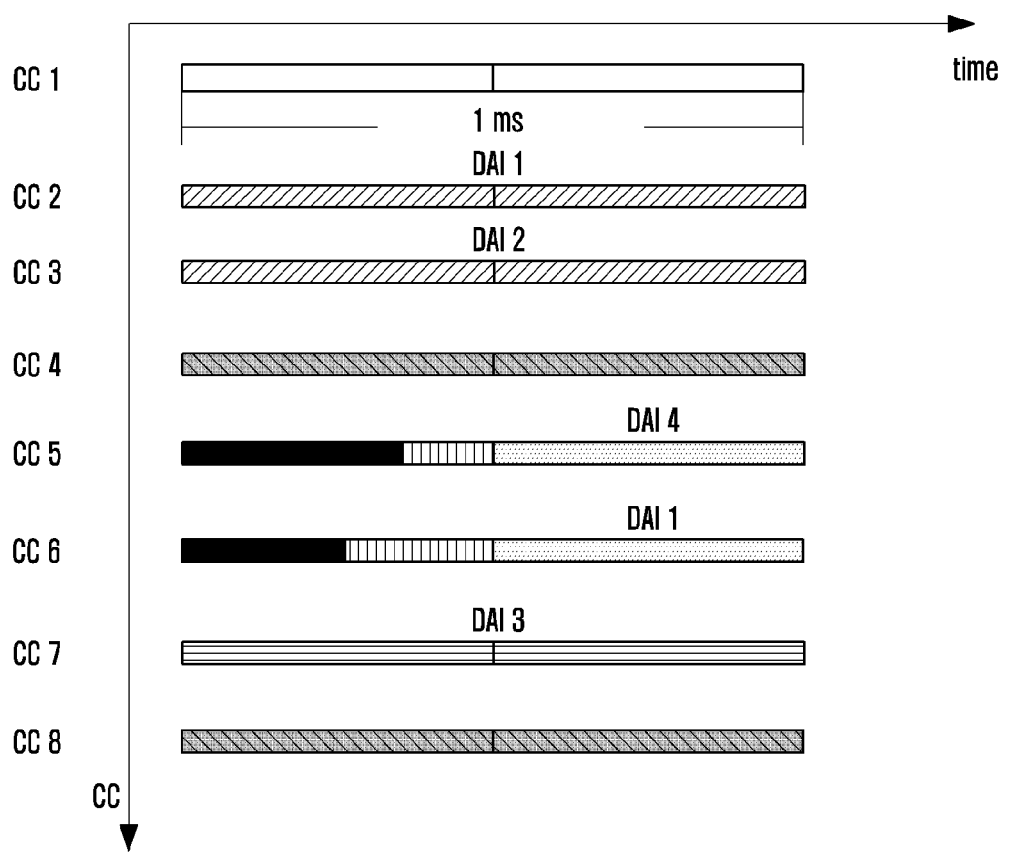
FIG. 29 is a fifth schematic diagram illustrating the first-category DL DAI, in accordance with an example of the present disclosure.

Perform modulo operation to first-category DAI determined with foregoing method. For example, when bit number for indicating first-category DAI is 2 bits, bit value for indicating first-category DAI is obtained after performing modulo 4 to first-category DAI value. For example, bit value in DCI for indicating first-category DAI=$(m_{DAI1}-1)$mod 4+1. In the example illustrated with FIG. 25, DAI value is shown in FIG. 29.

Figure 30:
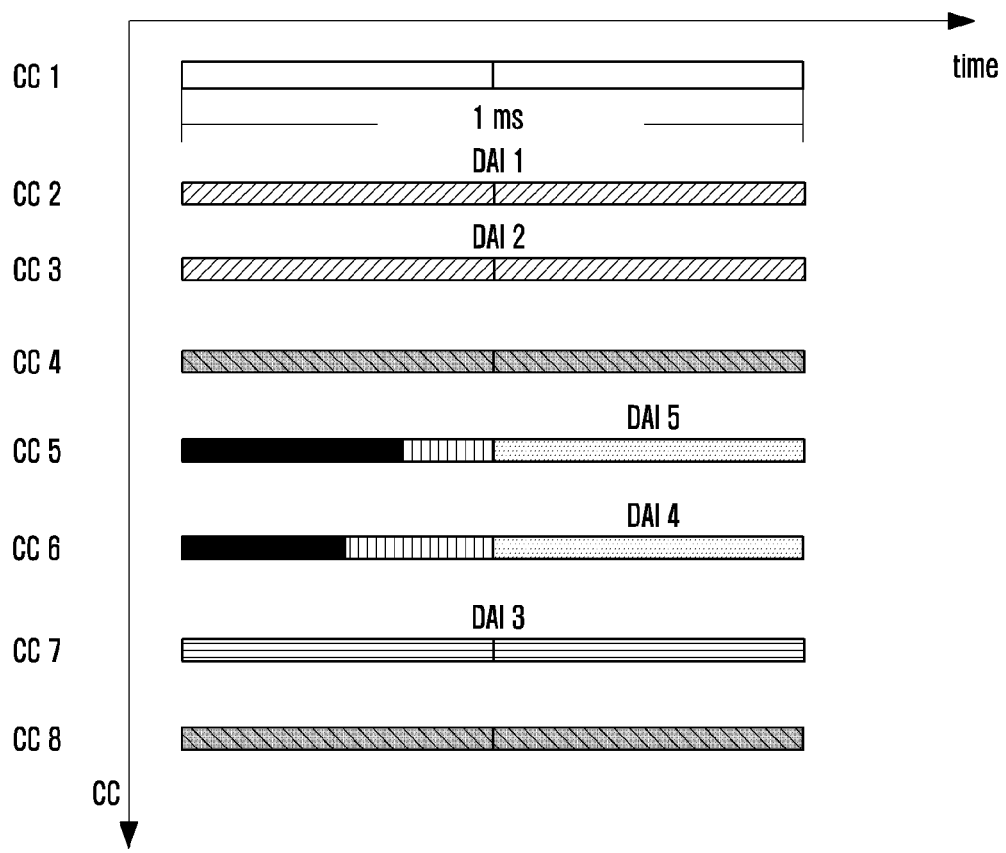
FIG. 30 is a sixth schematic diagram illustrating the first-category DL DAI, in accordance with an example of the present disclosure.

It should be noted that, it is not necessary to perform modulo operation, when bit number in DL Assignment used for indicating first-category DAI may directly indicate DAI value. In accordance with foregoing method, DAI is not necessary to be sorted based on sequence of carrier index. Instead, it is necessary to sort DAI in an ascending order, based on sequence of starting point of transmitted HARQ feedback unit. In the example of (1) where the time-frequency bundle window includes one downlink subframe, UE receives in current time unit the first-category DAI $m_{DAI1}$, which indicates the number of HARQ feedback units in downlink subframe $(n-k_c)$ of the time-frequency bundle window, which are accumulated from starting point of the first time unit to current time unit k, and from a carrier corresponding to a smaller DAI to carrier c. As shown in FIG. 30, DAI index value of the second slot is still after the DAI index value of the first slot. However, 2 DAIS of the second slot, that is, DAI values of CC5 and CC6, may be sorted according to a descending order of carrier index, instead of according to an ascending order of carrier index. DAI of CC5 is 6. DAI of CC6 is 4. The UE needs to sort corresponding ACK/NACK, based on an ascending order of DAI value.

Foregoing descriptions are provided by taking an example, in which HARQ feedback unit is a time unit. When the HARQ feedback unit is a TB, foregoing method of the embodiment is also applicable to DAI counting, by taking TB as a unit. That is, when carrier j is configured to support 2-TB TM without spatial bundling, DAI value of carrier j is obtained after adding 2 to DAI value of previous carrier. For example, if the time-frequency bundle window only includes one downlink subframe, when transmitting the first-category DAI scheduling carrier c, the first-category DAI indicates the total number of TBs (equivalent TB number of PDCCH/EPDCCH for releasing SPS is 1) in the downlink subframe, which are transmitted by eNB from the first time unit to $k^{th}$ time unit, and from the first carrier to carrier c. DAI value $m_{DAI1,c,k}$ may be determined with the following method.

set $m_{DAI1}$=0
    set i=1
    set j=1
    while i<=$M_1$
    while j<=$N_c$ if on carrier j, subframe (n–$k_c$) is a downlink subframe, HARQ-ACK bit of subframe (n–$k_c$) is fed back in an uplink subframe n, and eNB starts to transmit PDCCH/EPDCCH scheduling PDSCH in $i^{th}$ time unit of subframe (n–$k_c$), in which (n–$k_c$) represents a subframe number,

```
if carrier j supports 2-TB TM,
    m_DAI1 = m_DAI1+2
else
    m_DAI1 = m_DAI1+1
end if
    if (i==k) &&(j==c)  m_DAI1,c,k = m_DAI1
    else
        m_DAI1 = m_DAI1
    end if
    j=j+1;
end while
i=i+1;
end while
```

Suppose the first-category DAI received in step 3901 is determined with any of foregoing methods, that is, the UE receives first-category DAI $m_{DAI1}$ in current time unit. The first-category DAI $m_{DAI1}$ indicates the total number of HARQ feedback units in downlink subframe (n–$k_c$) within the time-frequency bundle window, which are accumulated from the starting point of the first time unit to current time unit k, and from the first carrier to carrier c. And then, in step 3903, the UE determines the total length $O_{ACK}$ of feedback bit sequence, based on value of last first-category DAI of last time unit detected within the time-frequency bundle window. And finally, in step 3904, the UE maps HARQ-ACK bit of each HARQ feedback unit to a corresponding bit of feedback bit sequence, based on mapping value of the received DL DAI. Since there is no bit in the feedback bit sequence corresponding to the HARQ feedback unit, that is, a corresponding DAI is missed, it should be denoted with NACK.

It should be noted that, for PDSCH of SPS, SPS activation or SPS deactivation needs to be scheduled by PDCCH/EPDCCH, transmission of PDSCH of other SPS is not necessary to be scheduled by PDCCH/EPDCCH. Generally, transmission of PDSCH of SPS is determined in advance, e.g., start transmission from the first slot in SPS resource subframe. Thus, in the method provided by the embodiment about how to determine DAI, when starting point of PDSCH transmission is not determined, PDSCH transmission with SPS is not discussed. However, when feeding back ACK/NACK bits, it is necessary for the UE to feed back HARQ-ACK information of PDSCH scheduled by PDCCH/EPDCCH, and HARQ-ACK information of PDCCH/EPDCCH releasing SPS, as well as HARQ-ACK information of PDSCH of SPS. HARQ-ACK mapping of PDSCH of SPS may be implemented with prior art, or with other new technical solutions, which is not limited by the present disclosure. For example, when there is SPS downlink transmission within time-frequency bundle window, the HARQ-ACK bit corresponding to SPS downlink transmission will be mapped to a set position of the feedback bit sequence.

HARQ-ACK bit corresponding to SPS transmission is mapped to start of feedback bit sequence, according to an ascending order of index of downlink subframe within time-frequency bundle window, in which the HARQ-ACK bit is in the downlink subframe. Or, the HARQ-ACK bit corresponding to SPS transmission is mapped to a position before another HARQ-ACK bit corresponding to downlink HARQ transmission scheduled by DL-Assignment with first-category DL DAI. Alternatively, HARQ-ACK bit corresponding to SPS transmission is mapped to the end of feedback bit sequence, according to a descending order of index of downlink subframe within the time-frequency bundle window, in which the HARQ-ACK bit is in the HARQ-ACK bit; or HARQ-ACK bit corresponding to SPS transmission is mapped to a position before another HARQ-ACK bit corresponding to downlink HARQ transmission scheduled by DL-Assignment with first-category DL DAI.

It should be noted that, inconsistent understandings of UE and eNB for the total number of scheduled PDCCH/EPDCCH cannot be totally avoided by the first-category DAI in the embodiment. For example, when one or N PDCCH/EPDCCH with maximum first-category DAI value is missed by the UE, the UE cannot determine un-detection based on detected first-category DAI. For example, as shown in FIG. 25, when the UE only detects CC2, CC3, CC7 and CC5 without detecting CC6, DAIs received by the UE are continuous, e.g., DAIs 1, 2, 3, 4. UE cannot determine that DAI 5 of CC6 is missed. Thus, the UE only feeds back ACK/NACK of 4 carriers. However, the eNB predicts to receive ACK/NACK of 5 carriers. The eNB determines the ACK/NACK fed back by the UE, after performing blind detection to ACK/NACK of 5 carriers and ACK/NACK feedback sequence of 4 carriers. Alternatively, the UE determines whether un-detection occurs with first-category DAI and other DAI indication information, e.g., second-category DAI in the second embodiment, which indicates number of HARQ feedback units transmitted by eNB within time-frequency bundle window, or indicates number (e.g., one or more) of HARQ feedback units finally transmitted by eNB within time-frequency bundle window. Technical solution of Embodiment 10 may be combined with prior art, or other novel technical solution for solving un-detection of one or more HARQ feedback units with maximum DAI value for UE, which will not be repeated here.

Embodiment 11

On the basis of Embodiment 10, second-category DL DAI is further included in DL-Assignment of Embodiment 11. When mapping the HARQ-ACK bit, further take into account of value of second-category DL DAI. Specifically, the embodiment provides a method for feeding back HARQ-ACK information, which is applicable to downlink multi-carrier transmission system, such as CA system or DC system, the method includes the following blocks.

In step 4001, a UE receives DL-Assignment scheduling downlink HARQ transmission within time-frequency bundle window, which corresponds to an uplink subframe feeding back HARQ-ACK, obtains first-category DAI and second-category DAI in DL-Assignment, and determines a mapping value of each DL DAI.

In step 4002, the UE detects HARQ feedback unit of each downlink HARQ transmission within time-frequency bundle window, and determines a corresponding HARQ-ACK bit.

In step 4003, the UE determines total length $O_{ACK}$ of feedback bit sequence fed back in subframe n, based on second-category DAI and/or first-category DAI.

In step 4004, the UE maps HARQ-ACK bit of each HARQ feedback bit to a corresponding bit of the feedback bit sequence, based on mapping value of a corresponding DL DAI, and reports the feedback bit sequence to eNB.

Usage method of the first-category DAI in the embodiment is same as that in Embodiment 10, which is not repeated here. Embodiment 11 mainly describes the second-category DAI.

In an example, the first-category DAI and second-category DAI in the same DL Assignment respectively correspond to different bit fields.

In another example, the first-category DAI and second-category DAI within the same DL Assignment correspond to the same bit field. The second-category DAI is only used under a predetermined condition.

In still another example, the first-category DAI and second-category DAI are in different DCI. For example, the first-category DAI is in DCI of PDCCH/EPDCCH scheduling PDSCH. The second-category DAI is in DCI dedicated to indicate PDCCH/EPDCCH.

In an example, the second-category DAI indicates the total number of PDCCH/EPDCCH scheduling PDSCH and PDCCH/EPDCCH indicating SPS release, which are transmitted by eNB from the starting point of time-frequency bundle window up to the present $k^{th}$ time unit for transmitting PDSCH scheduled by DL-Assignment, or for transmitting DL-Assignment. Definition of time unit is the same as that in Embodiment 10.

(1) When time-frequency bundle window includes one downlink subframe, eNB transmits DL-Assignment scheduling carrier c. Second-category DAI in DL-Assignment is to indicate the total number of HARQ feedback units on all the carriers in the downlink subframe, which are transmitted by eNB from the first time unit to $k^{th}$ time unit for downlink HARQ transmission scheduled by DL-Assignment, or for transmitting DL-Assignment. DAI value $m_{DAI2,K}$ may be determined with the following pseudo code.

set $m_{DAI2}=0$
set i=1
set j=1
while i<=$M_1$
while j<=Nc
if on carrier j, subframe (n-$k_c$) is a downlink subframe, HARQ-ACK bit of subframe (n-$k_c$) is fed back in an uplink subframe n, and eNB starts to transmit PDCCH/EPDCCH scheduling PDSCH (e.g., take PDSCH as downlink HARQ transmission) from $i^{th}$ downlink time unit of subframe (n-$k_c$), in which (n-$k_c$) represents subframe number, $m_{DAI2} = m_{DAI2}+1$
else
$m_{DAI2} = m_{DAI2}$
end if
j=j+1;
end while
if (i==k) $m_{DAI2,k} = m_{DAI2}$
i=i+1;
end while j represents carrier index of a carrier transmitted within a time unit of time-frequency bundle window, 0<j≤Nc;

Nc represents total number of downlink member carriers feeding back HARQ-ACK in the uplink subframe;

Subframe number of downlink subframe within time-frequency bundle window is (n-$k_c$), n represents subframe number of the uplink subframe; $k_c$ represents a predefined value, e.g., $k_c=4$;

i represents index of time unit within downlink subframe (n-$k_c$), 0<i≤$M_1$.

Figure 31:
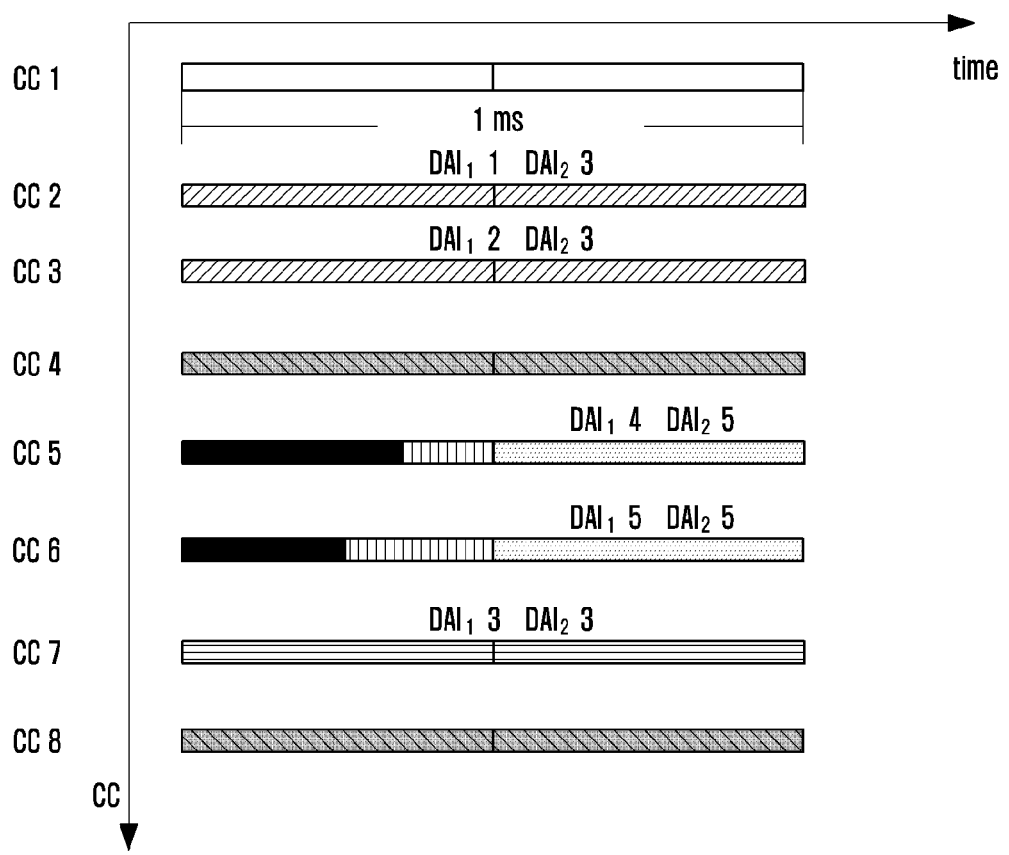
FIG. 31 is a first schematic diagram illustrating first-category DL DAI and second-category DL DAI, in accordance with an example of the present disclosure.

It can be seen that, second-category DAI generated with foregoing method, and second-category DAI transmitted in an earlier time unit do not include number of PDCCH/EPDCCH transmitted in a later time unit. As shown in FIG. 31, second-category DAI in the first slot is 3, which represents that total number of PDCCH/EPDCCH transmitted on all the carriers in first slot is 3. Second-category DAI in second slot is 3, which represents that total number of PDCCH/EPDCCH transmitted on all the carriers of first slot is 3. Second-category DAI of second slot is 5, which represents that total number of HARQ feedback units transmitted on all the carriers from the first slot to second slot is 5. That is, total number of each downlink HARQ transmission is 5, in which starting point of each downlink HARQ transmission is first slot or second slot. When the UE misses CC6 of second slot, UE determines that one HARQ feedback unit is missed, after comparing detected total number $U_{DAI}=4$ of HARQ feedback units with second-category DAI value $m_{DAI2}=5$.

(2) When the time-frequency bundle window includes multiple downlink subframes, eNB transmits DL-Assignment scheduling carrier c. Second-category DAI in DL-Assignment indicates the total number of HARQ feedback units on all the carriers, which are transmitted by eNB in all the downlink subframe of time-frequency bundle window from the first time unit to $k^{th}$ time unit, and from first downlink subframe (n-$k_{max}$) to downlink subframe (n-$k_c$) within time-frequency bundle window. The downlink HARQ transmission scheduled by DL-Assignment is transmitted in $k^{th}$ time unit, or DL-Assignment is transmitted in $k^{th}$ time unit. The downlink HARQ transmission scheduled by DL-Assignment is transmitted in downlink subframe (n-$k_c$), or DL-Assignment is transmitted in downlink subframe (n-$k_c$). $k_c$ ÅKc. K is determined by HARQ timing relationship, which is used by UE in uplink subframe n when feeding back HARQ-ACK of downlink subframe of carrier c. DAI value $m_{DAI2,k,n-kc}$ may be determined with the following two methods.

The first method is to jointly count second-category DAI in subframe dimension and carrier dimension.

set $m_{DAI2}=0$
set l= $k_{max}$
set i=1
Set j=1
while l>= $k_{min,c}$
while i<=$M_1$
while j<=Nc if subframe (n-1) on carrier j is a downlink subframe, HARQ-ACK bit of subframe (n-1) is fed back in an uplink subframe n, eNB starts to transmit PDCCH/EPDCCH scheduling PDSCH in $i^{th}$ downlink time unit within subframe (n-1), in which (n-1) represents subframe number;

```
            m_DAI2 = m_DAI2+1
        else
            m_DAI2 = m_DAI2
        end if
        j=j+1;
    end while
    if (i==k) &&(l== k_c)   m_DAI1,k,n-kc = m_DAI2
    i=i+1;
    end while
    l=l-1;
end while
``` j represents carrier index of a carrier transmitted within a time unit of time-frequency bundle window, 0<j≤Nc;

Nc represents total number of downlink member carriers feeding back HARQ-ACK in the uplink subframe;

subframe number of the downlink subframe within time-frequency bundle window is $(n-k_c)$; n represents subframe number of uplink subframe; $k_c$ is a predefined value, e.g., $k_c=4$;

i represents index of a time unit within downlink subframe $(n-k_c)$, 0<i=m_1.

Figure 32:
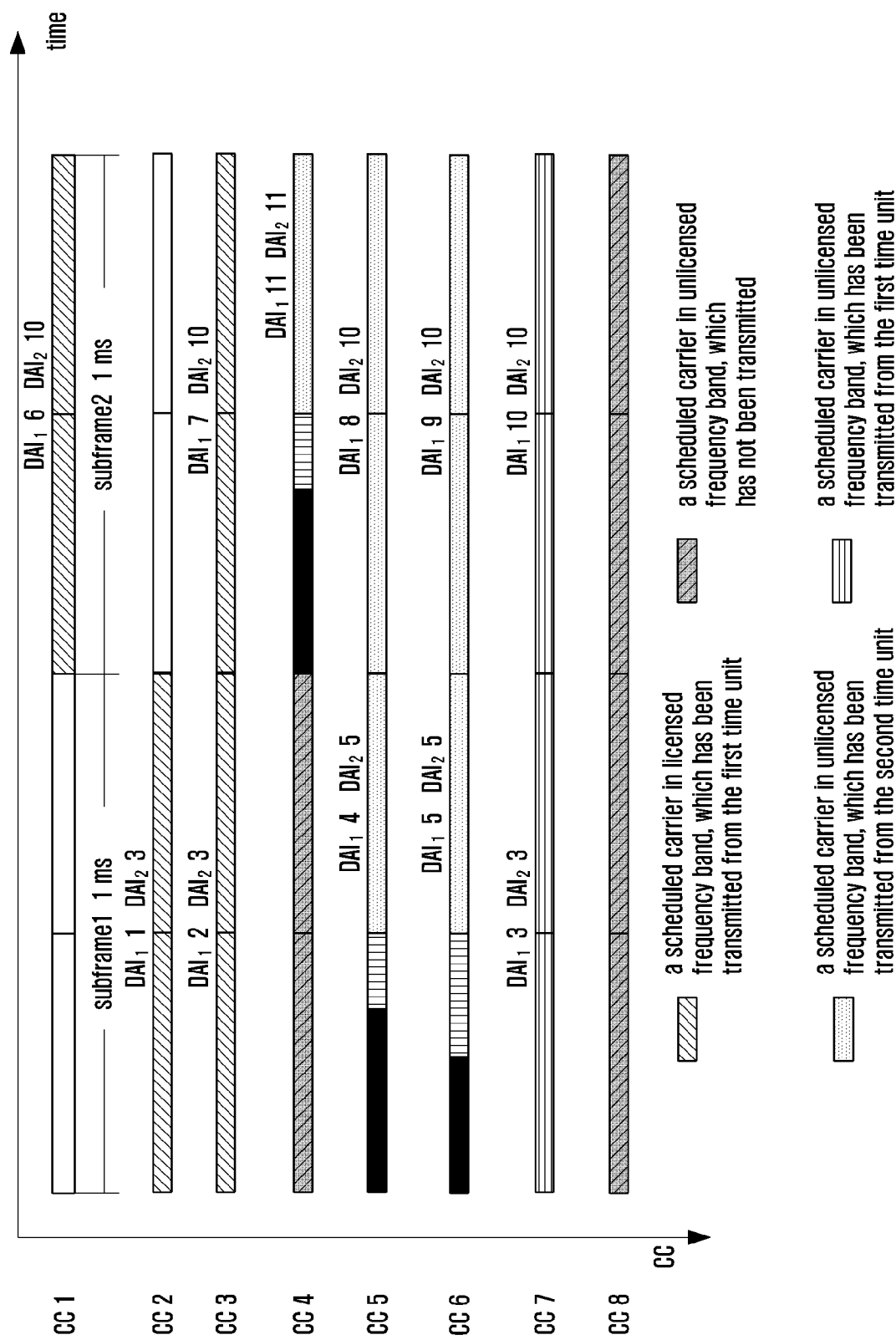
FIG. 32 is a second schematic diagram illustrating first-category DL DAI and second-category DL DAI, in accordance with an example of the present disclosure.

Thus, it can be seen that for second-category DAI generated with foregoing method, and second-category DAI transmitted in an earlier time unit do not include number of HARQ feedback units, which are transmitted in a later time unit of the same subframe or transmitted in a time unit of a later subframe. As shown in FIG. 32, the time-frequency bundle window includes 2 subframes. Second-category DAI of CC2, CC3 and CC7 in first slot of subframe 1 is 3. Second-category DAI of CC5 and CC6 in second slot of subframe 1 is 5. Second-category DAI of CC1, CC3, CC8, CC9 and CC10 in first slot of subframe 2 is 10. Second-category DAI of CC4 in second slot of subframe 2 is 11.

A second method is to respectively count second-category DAI in subframe dimension and carrier dimension. That is, two independent DAIS respectively correspond to subframe dimension and carrier dimension. DAI of subframe dimension may be counted based on a method in current standard, such as method of 7.3.2.1 in TS 36.213, or another novel technical solution. DAI of carrier dimension may be respectively counted by eNB and UE, based on the method in example (1) of the embodiment, where time-frequency bundle window includes one downlink subframe.

In step 4003, UE determines total length $O_{ACK}$ of feedback bit sequence fed back in subframe n, based on first-category DAI and second-category DAI of PDCCH/EPDCCH within last time unit detected by UE. When total number of HARQ feedback units calculated with first-category DAI is less than value indicated by second-category DAI, UE determines total length $O_{ACK}$ of feedback bit sequence based on value indicated by second-category DAI. For example, as shown in FIG. 32, after detecting HARQ feedback unit of downlink HARQ transmission in CC5 of second slot, without detecting HARQ feedback unit of downlink HARQ transmission in CC6 of second slot, UE learns that total number of HARQ feedback units indicated by second-category DAI in CC5 is 5, while total number of HARQ feedback units indicated by first-category DAI is 4. And then, the UE determines that one is missed. The UE determines that total length of feedback bit sequence is 5, based on 5 of second-category DAI.

In step 4004, UE determines bit position of feedback bit sequence, based on detected first-category DAI and second-category DAI of downlink HARQ transmission of each time unit within time-frequency bundle window. Suppose feedback bit sequence is $O_0, O_1, \ldots, O_{O_{ACK}-1}$ sort ACK/NACK in sequence, based on an ascending order of first-category DAI detected by UE. For a bit in feedback bit sequence without corresponding HARQ feedback unit, configure the bit to be NACK, that is, configure the bit to be 0. For example, as shown in FIG. 31, after detecting PDCCH/EPDCCH of CC5 in second slot without detecting PDCCH/EPDCCH of CC6 in second slot, the UE learns that total number of HARQ feedback units in CC5 indicated by second-category DAI is 5. However, the UE learns that total number of HARQ feedback units indicated by first-category DAI is 4. And then, the UE determines that one is missed. The UE determines that the total length of feedback bit sequence is 5, based on 5 of second-category DAI. Suppose the UE detects PDCCH/EPDCCH of CC2, CC3, CC5 and CC7, and scheduled PDSCH is demodulated correctly, ACK/NACK feedback bit sequence generated by UE is ACK ACK ACK ACK NACK. The final NACK is a feedback corresponding to HARQ feedback unit of missed first-category DAI 5.

In an example, the second-category DAI indicates upper limit of total number of HARQ feedback units, which are predicted to transmit, and/or, actually transmitted by eNB from starting point to end point of time-frequency bundle window. In other words, the second-category DAI indicates total number of supposed HARQ feedback units of ACK/NACK sequence, which is needed to be fed back by the UE from starting point to end point of time-frequency bundle window. Values of second-category DAI transmitted within each time unit of time-frequency bundle window are the same, or different. Definition of time unit is the same as that in Embodiment 10. Alternatively, second-category DAI of current downlink HARQ transmission may also indicate total number of HARQ feedback units, which are predicted to transmit by eNB on all the carriers, or actually transmitted by eNB on all the carriers from starting point to last time unit of current downlink HARQ subframe within time-frequency bundle window.

Since eNB cannot accurately predict whether a channel can be occupied, and whether PDCCH/EPDCCH can be transmitted, after performing CCA detection in a later time unit or later subframe for carriers in the unlicensed frequency band, second-category DAI transmitted in an earlier time unit may be not equal to total number of HARQ feedback units, which are actually transmitted by eNB within time-frequency bundle window. When total number of HARQ feedback units transmittable by eNB is greater than second-category DAI transmitted in an earlier time unit, eNB transmits HARQ feedback units within time-frequency bundle window, in which total number of HARQ feedback units is equal to second-category DAI. When total number of HARQ feedback units transmittable by eNB is less than second-category DAI, UE still determines total bit number of ACK/NACK fed back, based on second-category DAI. Alternatively, in another implementation mode, when total number of HARQ feedback units transmittable by eNB is greater than second-category DAI transmitted in an earlier time unit, the eNB may transmit HARQ feedback units within time-frequency bundle window, in which total number of HARQ feedback units may be equal to, less than, or greater than second-category DAI. The eNB updates second-category DAI within current time unit, based on number of HARQ feedback units actually transmitted. Here, HARQ feedback units transmittable by eNB refer to as follows. There is a service needing to be transmitted at eNB side, and eNB also successfully occupies a carrier, and may perform downlink HARQ transmission on such carrier.

In the foregoing method, when time-frequency bundle window includes multiple subframes, e.g., in TDD system, second-category DAI may indicate total number of all the HARQ feedback units within one subframe, or indicate total number of HARQ feedback units of all the subframes within time-frequency bundle window, or indicate total number of all the HARQ feedback units, which are transmitted from starting point to last time unit of current downlink HARQ subframe within the time-frequency bundle window.

Figure 33:
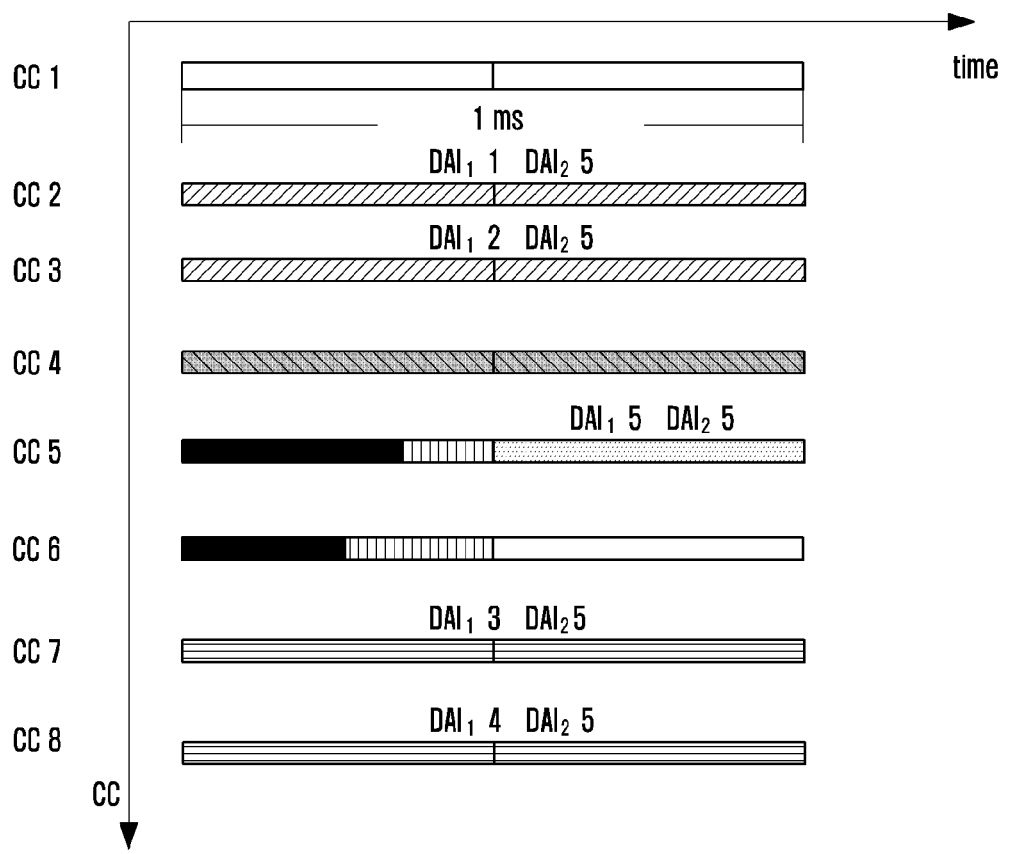
FIG. 33 is a third schematic diagram illustrating first-category DL DAI and second-category DL DAI, in accordance with an example of the present disclosure.

As shown in FIG. 33, suppose time-frequency bundle window only includes one subframe, second-category DAI indicates upper limit of total number of HARQ feedback units, which are predicted to transmit, and/or, actually transmitted by eNB from starting point to end point of time-frequency bundle window. Value of second-category DAI transmitted within each time unit of time-frequency bundle window is the same. When total number of HARQ feedback units transmittable by eNB is greater than second-category DAI transmitted in an earlier time unit, the eNB transmits HARQ feedback units within time-frequency bundle window, in which number of HARQ feedback units is equal to second-category DAI. Specifically, second-category DAI=5, which represents the following meaning. The eNB predicts that total number of HARQ feedback units transmittable within two time units of the subframe is 5. Thus, it can be seen that CC2, CC3, CC7 and CC8 are transmitted from the first time unit. The eNB does not determine whether CC4, CC5, CC6 can occupy a channel and transmit signals. The eNB conservatively estimates that at least one carrier of these three carriers may occupy channel and transmit a signal within the second time unit. However, in actual case, CC4 cannot occupy channel. Both of CC5 and CC6 have completed LBT before second time unit, and may transmit a signal. However, since eNB predicts that only one carrier may transmit a signal, the eNB only transmits a signal on one carrier. That is, the eNB may transmit a signal on CC5, even if there are two carriers transmittable by eNB.

Figure 34:
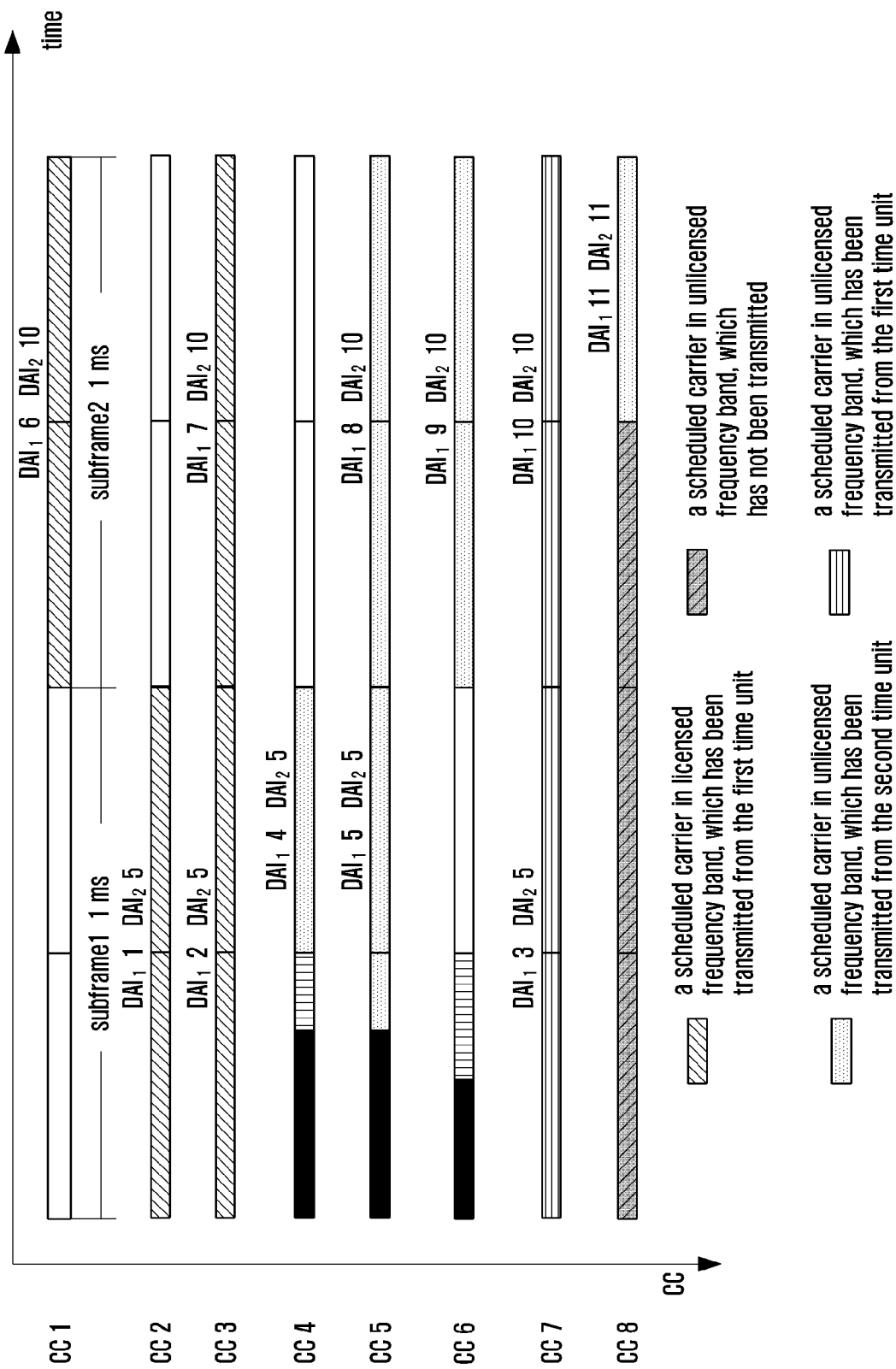
FIG. 34 is a fourth schematic diagram illustrating first-category DL DAI and second-category DL DAI, in accordance with an example of the present disclosure.

As shown in FIG. 34, suppose time-frequency bundle window includes two subframes, second-category DAI indicates total number of HARQ feedback units, which are predicted by eNB to transmit on all the carriers from starting point to last time unit of current downlink HARQ subframe within time-frequency bundle window. When total number of HARQ feedback units transmittable by eNB is greater than second-category DAI transmitted in an earlier time unit, total number of HARQ feedback units transmittable by eNB within time-frequency bundle window may be greater than second-category DAI. Besides, the eNB may update second-category DAI within current time unit, based on number of HARQ feedback units actually transmitted. Suppose total number of HARQ feedback units predicted to be transmitted by eNB in the first subframe is equal to total number of HARQ feedback units actually transmitted, total number of HARQ feedback units predicted to be transmitted in second subframe, which is predicted by eNB in first slot of second subframe, is less than number of HARQ feedback units actually transmitted by eNB in the second subframe, that is, second-category DAI transmitted in first slot of second subframe is 10 (that is, 5 in first subframe+5 in first slot of second subframe). However, the eNB also transmits a HARQ feedback unit in second slot of second subframe. Thus, updated second-category DAI transmitted by eNB in second slot of second subframe is 11. The UE determines length of ACK/NACK sequence fed back based on the second-category DAI.

In an example, second-category DAI indicates that downlink HARQ transmission scheduled by DL-Assignment with second-category DAI refers to as follows. The eNB transmits last X PDCCH/EPDCCH scheduling PDSCH on all the carriers, or last X PDCCH/EPDCCH indicating SPS release on all the carriers from starting point to $k^{th}$ time unit within time-frequency bundle window. The downlink HARQ transmission scheduled by DL-Assignment is in $k^{th}$ time unit. Alternatively, DL-Assignment is in $k^{th}$ time unit. Definition of time unit is the same as that in Embodiment 10.

For example, X=1, or X=1, 2, 3.

In an example, when second-category DAI is 1 bit, ?0" represents that it is not the last HARQ feedback unit; "1" represents that it is the last HARQ feedback unit, or on the contrary.

In another example, when the second-category DAI is two bits, ?0" represents that it is not the last one, or last two, or last three HARQ feedback units; "1" represents that it is the last three HARQ feedback units; "2" represents that it is the last two HARQ feedback units; "3" represents that it is the last HARQ feedback unit, or on the contrary. Alternatively, "1" represents that there is still one HARQ feedback unit in the following; "2" represents that there are two HARQ feedback units in the following; "3" represents that there are three HARQ feedback units in the following. Still alternatively, indicate there is one, two or three HARQ feedback units in the following based on other predefined rules.

Figure 35:
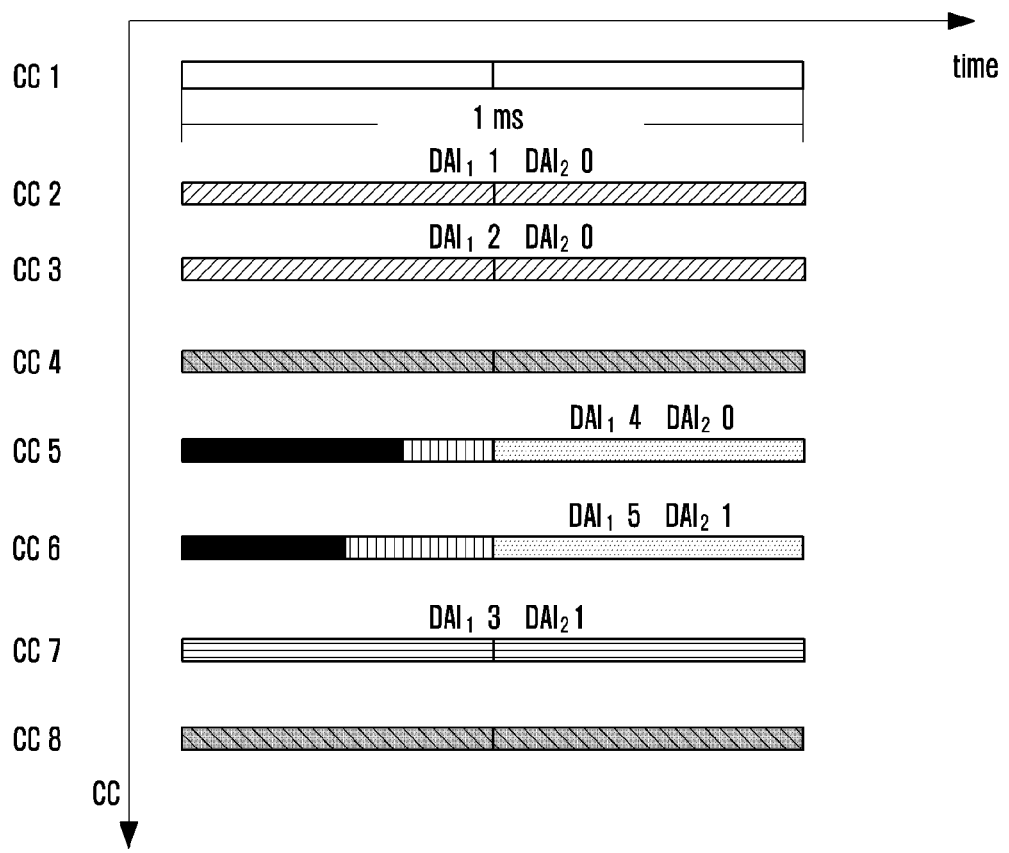
FIG. 35 is a fifth schematic diagram illustrating first-category DL DAI and second-category DL DAI, in accordance with an example of the present disclosure.

As shown in FIG. 35, DL-Assignment includes first-category DAI and second-category DAI. First-category DAI and second-category DAI respectively employ an independent bit field. Value of second-category DAI is 0 or 1. Time-frequency bundle window includes one subframe. "1" represents that PDCCH/EPDCCH carrying DL-Assignment is the last PDCCH/EPDCCH of PDCCH/EPDCCH scheduling PDSCH, and PDCCH/EPDCCH indicating SPS release, which is transmitted by the eNB on all the carriers from starting point to $k^{th}$ time unit within time-frequency bundle window. "0" represents that PDCCH/EPDCCH carrying DL-Assignment is not the last PDCCH/EPDCCH of PDCCH/EPDCCH scheduling PDSCH, and PDCCH/EPDCCH indicating SPS release, which is transmitted by the eNB on all the carriers from starting point to $k^{th}$ time unit within time-frequency bundle window. The starting point of time-frequency bundle window refers to first slot of current subframe. PDSCH scheduled by DL-Assignment is transmitted in $k^{th}$ time unit. Alternatively, DL-Assignment is transmitted in $k^{th}$ time unit. Second-category DAIs of CC2, CC3 and CC7 within the first time unit, e.g., the first slot, are respectively 0, 0, 1, which represents that CC7 is the last PDCCH/EPDCCH from the first slot. Second-category DAIs of CC5 and CC6 within the second time unit, e.g., the second slot, are respectively DAI 0 and DAI 1, which represents that CC6 is the last PDCCH/EPDCCH from the first slot to the second slot.

In an example, the second-category DAI indicates that PDSCH scheduled by DL-Assignment with second-category DAI refers to the last X HARQ feedback units, which are predicted to transmit by the eNB on all the carriers from starting point of time-frequency bundle window to $k^{th}$ time unit for transmitting PDSCH scheduled by DL-Assignment, or $k^{th}$ time unit for transmitting DL-Assignment. In other words, the second-category DAI indicates total number of last X HARQ feedback units, which are given by ACK/NACK sequence needing to be fed back by the UE from starting point to end point of time-frequency bundle window. Definition of time unit is the same as that in Embodiment 10.

In an example, when subframe/time unit with downlink HARQ transmission is taken as HARQ feedback unit, if number of PDCCH/EPDCCH actually transmittable by eNB in a later time unit has exceeded number of PDCCH/EPDCCH, which is indicated by the eNB in an earlier time unit, it is limited that number of PDCCH/EPDCCH transmitted by eNB in a later time unit cannot exceed number of PDCCH/EPDCCH indicated in an earlier time unit. Alternatively, number of PDCCH/EPDCCH transmitted by eNB in a later time unit is allowed to exceed number of PDCCH/EPDCCH indicated in an earlier time unit, the eNB numbers DAI in a later time unit, based on PDCCH/EPDCCH actually transmitted by the eNB. When number of PDCCH/EPDCCH actually transmittable by the eNB in a later time unit is less than number of PDCCH/EPDCCH, which is indicated by the eNB in an earlier time unit, UE still needs to determine length and order of ACK/NACK sequence fed back by UE, based on number of PDCCH/EPDCCH indicated by the eNB in an earlier time unit. Alternatively, the eNB may number DAI in a later time unit, based on PDCCH/EPDCCH actually transmitted. The UE determines length and order of ACK/NACK sequence fed back by UE, based on DAI finally received.

Figure 36:
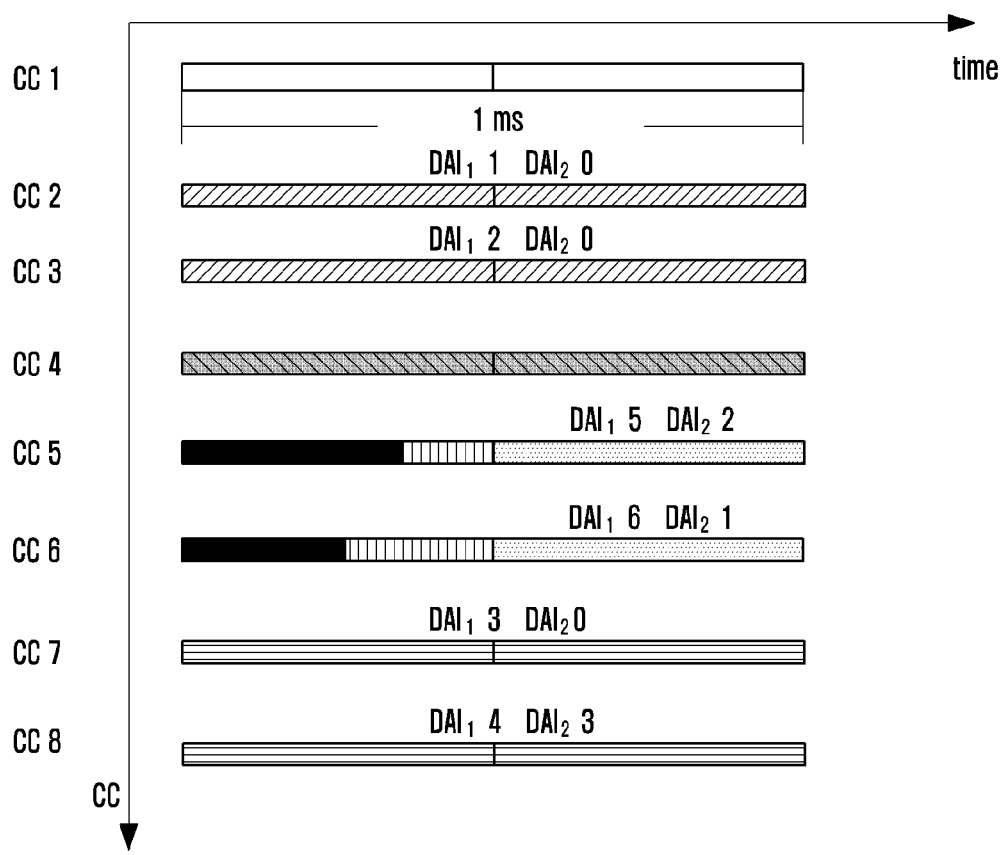
FIG. 36 is a sixth schematic diagram illustrating first-category DL DAI and second-category DL DAI, in accordance with an example of the present disclosure.

As shown in FIG. 36, DL-GRANT includes first-category DAI and second-category DAI, which respectively adopt an independent bit field. Values of second-category DAIS are respectively 0, 1, 2 and 3. Time-frequency bundle window includes one subframe. Second-category DAIS of CC2, CC3, CC7 and CC8 within first time unit, e.g., first slot, are respectively 0, 0, 0 and 3, which means as follows. The eNB predicts that there are still three PDCCHs/EPDCCHs in the second slot. The eNB cannot occupy channel of three carriers within the second time unit, e.g., second slot, and the eNB transmits PDCCH/EPDCCH on CC5 and CC6. However, to guarantee that total number of ACK/NACK fed back by the UE in the second slot is 3, second-category DAIS indicated by the eNB are respectively 2, 1, which means as follows. There are still 2 HARQ feedback units after CC5, and there is one HARQ feedback unit after CC6. Thus, when generating ACK/NACK bits, the UE generates ACK/NACK respectively based on CC2, CC3, CC7, CC8, CC5 and CC6, and adds one NACK finally.

Figure 37:
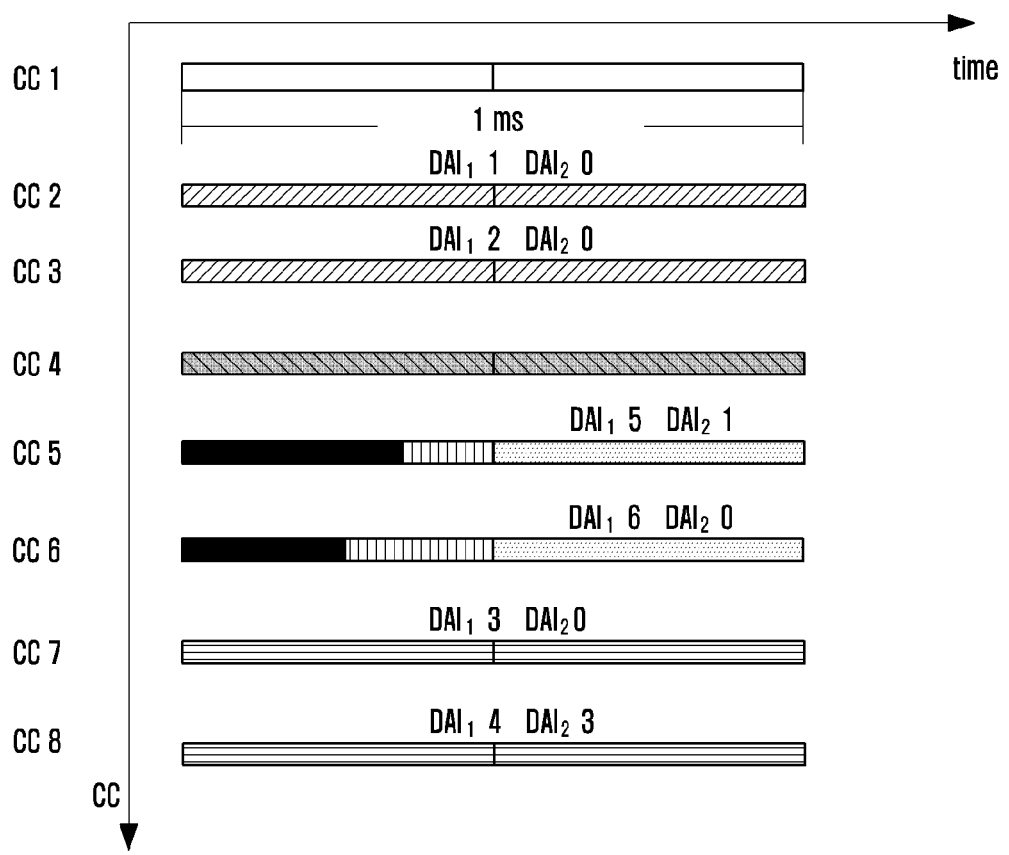
FIG. 37 is a seventh schematic diagram illustrating first-category DL DAI and second-category DL DAI, in accordance with an example of the present disclosure.

As shown in FIG. 37, DL-Assignment includes first-category DAI and second-category DAI, which respectively adopt an independent bit field. Values of the second-category DAIs are 0, 1, 2 and 3. Time-frequency bundle window only includes one subframe. Second-category DAIS of CC2, CC3, CC7 and CC8 within the first time unit, e.g., the first slot, are respectively 0, 0, 0 and 3, which means as follows. The eNB predicts that there are still 3 PDCCHs/EPDCCHs in the second slot. The eNB cannot occupy channel of three carriers within the second time unit, e.g., the second slot, and the eNB transmits PDCCH/EPDCCH on CC5 and CC6. And then, DAIS of CC5 and CC6 generated by the eNB are respectively 1 and 0, which represents that there is still one PDCCH/EPDCCH after CC5, there is 0 PDCCH/EPDCCH after CC6. Thus, the UE generates ACK/NACK bits respectively based on CC2, CC3, CC7, CC8, CC5 and CC6.

In an example, modulo operation may be performed to second-category DAI determined with foregoing method. For example, when there are 2 bits for indicating second-category DAI, bit value for indicating second-category DAI is obtained after performing mod 4 operation to second-category DAI value. For example, bit value for indicating second-category DAI in DCI is $(m_{DAI1}-1) \bmod 4+1$.

Based on several methods for determining second-category DL DAI listed above, the last several missed HARQ feedback units within time-frequency bundle window may be found, by using first-category DL DAI value and second-category DL DAI value. It should be noted that, method provided by Embodiment 10 or Embodiment 11 is also applicable to DAI in other formats.

Foregoing describes specific implementation of the method for feeding back and receiving HARQ information. The present disclosure also provides specific implementation of a device for feeding back and receiving HARQ information.

The device for feeding back HARQ provided by the present disclosure includes a receiving unit, a detecting unit and a feedback unit. The receiving unit is to receive, within a time-frequency bundle window corresponding to an uplink subframe feeding back HARQ-ACK, PDCCH/EPDCCH scheduling each downlink HARQ transmission within the time-frequency bundle window, obtains a first-category DL DAI corresponding to a downlink HARQ transmission in DL-Assignment, and determines a mapping value of each first-category DL DAI. The mapping value of first-category DL DAI is determined, based on starting point of corresponding downlink HARQ transmission within the time-frequency bundle window. The detecting unit is to detect a HARQ feedback unit of each downlink HARQ transmission within time-frequency bundle window, and determine a corresponding HARQ-ACK bit. The feedback unit is to map the HARQ-ACK bit of each HARQ feedback unit within the time-frequency bundle window to a corresponding bit of feedback bit sequence, based on the mapping value of the first-category DL DAI.

The device for receiving HARQ provided by the present disclosure includes a transmitting unit and a receiving unit. The transmitting unit is to transmit, within a time-frequency bundle window corresponding to an uplink subframe feeding back HARQ-ACK, PDCCH/EPDCCH scheduling each downlink HARQ transmission within the time-frequency bundle window, and enable DL-Assignment to carry first-category DL DAI corresponding to a downlink HARQ transmission. The mapping value of first-category DL DAI is determined, by using starting point of corresponding downlink HARQ transmission within time-frequency bundle window. The transmitting unit is further to transmit HARQ feedback unit of each downlink HARQ transmission within time-frequency bundle window. The receiving unit is to receive feedback bit sequence, and extract HARQ-ACK bit of each HARQ feedback unit within time-frequency bundle window, based on mapping value of first-category DL DAI.

Those with ordinary skill in the art would know that all or some steps in the method provided by the embodiments of the present disclosure may be implemented by a program executed by relevant hardware. The program may be stored in a computer readable storage medium. When the program is executed, one or a combination of the steps in the above method is implemented.

In addition, the functional modules in the embodiments of the present disclosure may be integrated into one processing module, or may be independent from each other. Or, two or more of the above modules may be integrated in one module. The integrated module may be implemented in form of hardware of software functional module. If the integrated module is implemented via software functional module and is sold or used as an independent product, the integrated module may be stored in a computer readable storage medium.

The above storage medium may be read only memory, disk, or compact disk, etc.

The foregoing are only preferred embodiments of the present disclosure and are not for use in limiting the protection scope of the present invention. Any modification, equivalent replacement and improvement made within the scope of the present disclosure should be covered under the protection scope of the present invention.

The invention claimed is:

1. A method for feeding back hybrid automatic repeat request acknowledgement (HARQ-ACK) information, comprising:

in a time-frequency bundling window corresponding to an uplink subframe in a feedback window of a first uplink subframe for feeding back HARQ-ACK, receiving a physical downlink control channel (PDCCH) or an enhanced PDCCH (EPDCCH) scheduling downlink HARQ transmission, obtaining a downlink assignment index (DL DAI) in a DL-assignment, and determining a mapping value of each DL DAI;

determining a second uplink subframe for feeding back the HARQ-ACK, and determining an uplink carrier for feeding back the HARQ-ACK;

mapping HARQ-ACK bits of each HARQ feedback unit to corresponding bits of a feedback bit sequence according to the mapping value of the DL DAI; and feeding back the HARQ-ACK bits on the uplink carrier in the second uplink subframe, wherein the uplink carrier includes a first uplink carrier responsible for feeding back the HARQ-ACK of an unlicensed carrier, and a second uplink carrier responsible for feeding back the HARQ-ACK of a licensed carrier or the unlicensed carrier.

2. The method of claim 1, wherein the first uplink subframe for feeding back the HARQ-ACK is determined according to indication information in received physical layer signaling, or the first uplink subframe for feeding back the HARQ-ACK is determined according to a reference carrier and an HARQ-ACK timing of a carrier on which PDSCH is received;

wherein the feedback window of the first uplink subframe for feeding back the HARQ-ACK starts from the first uplink subframe, and a length of the feedback window is configurable;

wherein the second uplink subframe is within the feedback window; and wherein the time-frequency bundling window comprises all downlink subframes whose HARQ-ACK need to be fed back in the first uplink subframe, and the HARQ-ACK of the downlink subframes are arranged according to a predefined rule.

3. The method of claim 1, wherein the mapping the HARQ-ACK bits of each HARQ feedback unit to the corresponding bits of the feedback bit sequence according to the mapping value of a corresponding DL DAI comprises:

determining whether there is another second uplink subframe which belongs to another feedback window and overlaps with the second uplink subframe;

if there is no other second uplink subframe in other feedback window, determining a number of HARQ-ACK bits according to a number of physical downlink shared channels (PDSCHs) actually being scheduled in all downlink subframes in a time-frequency bundling window of the first uplink subframe corresponding to the second uplink subframe, and determining the sequence of the HARQ-ACK bits according to a predefined rule; and if there is another second uplink subframe in another feedback window, determining a number of first type HARQ-ACK bits according to a maximum number of PDSCHs can be scheduled in all downlink subframes of the time-frequency bundling window of a first uplink subframe corresponding to the another second uplink subframe in the another feedback window, and determining a number of a second type HARQ-ACK bits according to the number of PDSCHs actually being scheduled in all downlink subframes in the time-frequency bundling window of the first uplink subframe corresponding to the second uplink subframe of the feedback window, and determining the sequence of the two types of HARQ-ACK bits according to a predefined rule.

4. The method of claim 1, wherein the mapping the HARQ-ACK bits of each HARQ feedback unit to the corresponding bits of the feedback bit sequence according to the mapping value of the corresponding DL DAI comprises:

determining whether there is another second uplink subframe which belongs to another feedback window and overlaps with the second uplink subframe;

if there is no other second uplink subframe in other feedback window, determining the HARQ-ACK bits according to PDSCHs actually being scheduled in all downlink subframes in the time-frequency bundling window of the first uplink subframe corresponding to the second uplink subframe of the feedback window; and if there is another second uplink subframe in another feedback window, determining a first type HARQ-ACK bits according to the PDSCHs actually being scheduled in all downlink subframes in the time-frequency bundling window of a first uplink subframe corresponding to the another second uplink subframe in the another feedback window, and determining a second type HARQ-ACK bits according to the PDSCHs actually being scheduled in all downlink subframes of the time-frequency bundling window of the first uplink subframe corresponding to the second uplink subframe of the feedback window, and determining a sequence of the two types of HARQ-ACK bits according to a predefined rule.

5. The method of claim 3, wherein the predefined rule comprises:

determining the sequence of the two types of HARQ-ACK bits according to a sequence of the first uplink subframes respectively corresponding to the two types of HARQ-ACK bits, wherein the HARQ-ACK bits corresponding to the first uplink subframe which is earlier in time are placed in front, and the HARQ-ACK bits corresponding to the first uplink subframe which is latter in time are placed behind; and wherein the number of PDSCHs actually being scheduled is determined according to a total DAI and/or counter DAI, and values of the total DAI and/or counter DAI are determined cumulatively in time-frequency bundling windows corresponding to all uplink subframes in the feedback window.

6. The method of claim 1, wherein the determining the uplink carrier for feeding back the HARQ-ACK comprises:

determining the uplink carrier for feeding back the HARQ-ACK according to indication information in received physical layer signaling; or determining the uplink carrier for feeding back the HARQ-ACK according to a current channel busy/idle state, or determining the uplink carrier for feeding back the HARQ-ACK according to indication information in received higher layer signaling, wherein when feeding back the HARQ-ACK on the first uplink carrier and mapping the HARQ-ACK bits of each HARQ feedback unit to the corresponding bits of the feedback bit sequence according to the mapping value of the corresponding DL DAI, determining the HARQ-ACK bits according to PDSCHs actually being scheduled in all downlink subframes in the time-frequency bundling window corresponding to the first uplink carrier; or feeding back the HARQ-ACK on the second uplink carrier, and do not feeding back the HARQ-ACK on the first uplink carrier, determining a number of a first type HARQ-ACK bits according to a maximum number of PDSCHs can be scheduled in all downlink subframes in the time-frequency bundling window corresponding to one of the first uplink carrier and the second uplink carrier which one has a minimum carrier index, and determining a number of second type HARQ-ACK bits according to the PDSCHs actually being scheduled in all downlink subframes in the time-frequency bundling window corresponding to one of the first uplink carrier and the second uplink carrier which has a maximum carrier index; the first type HARQ-ACK bits are arranged in front and the second type HARQ-ACK bits are arranged behind the first type HARQ-ACK bits; and wherein the number of PDSCHs actually being scheduled is determined according to a received total DAI and/or counter DAI; or the maximum number of PDSCHs can be scheduled is determined according to a number of configured carriers.

7. The method of claim 1, wherein:

DL DAI includes first-category DL DAI; wherein the mapping value of the first-category DL DAI is determined, based on a starting point of the corresponding downlink HARQ transmission within the time-frequency bundle window;

wherein the second uplink subframe for feeding back the HARQ-ACK is the same subframe of the first uplink subframe for feeding back the HARQ-ACK; and wherein the time-frequency bundle window comprises time units for transmitting all the downlink HARQ transmissions of an uplink subframe, which feeds back the HARQ-ACK, the time units for transmitting all the downlink HARQ transmissions are sorted according to a set rule, starting point of a time unit within the time-frequency bundle window corresponds to starting point of the HARQ feedback unit transmitted within the time unit.

8. The method according to claim 7, wherein the time unit comprises N orthogonal frequency division multiplexing (OFDM) symbols, lengths of different time units within the same time-frequency bundle window are the same or different, N is a set positive integer;

wherein when the time-frequency bundle window comprises one downlink subframe, a time unit in the time-frequency bundle window is time resource from starting point to end point in a downlink subframe, starting point and end point are respectively L1th OFDM symbol and the last OFDM symbol in the downlink subframe, each time unit is sorted according to sequence of starting point of each time unit, L1 is a set positive integer;

wherein when the time-frequency bundle window comprises one downlink subframe, the mapping value of the first-category DL DAI of a downlink HARQ transmission within the time-frequency bundle window is to represent total number of HARQ feedback units, which are transmitted by an evolved Node B (eNB) from a first time unit to a time unit for the downlink HARQ transmission within the downlink subframe, and from a first carrier to a carrier for the downlink HARQ transmission of a HARQ feedback unit; or the mapping value of the first-category DL DAI of a downlink HARQ transmission within the time-frequency bundle window is to represent the total number of HARQ feedback units, which are transmitted by the eNB within a time unit for the downlink HARQ transmission from the first carrier to the carrier for the downlink HARQ transmission.

9. The method according to claim 7, wherein when the time-frequency bundle window comprises multiple downlink subframes, a time unit in the time-frequency bundle window is time resource from starting point to end point in a downlink subframe of the multiple downlink subframes, the starting point and end point of the downlink subframe are respectively L2th OFDM symbol and the last OFDM symbol, each time unit is sorted according to sequence of downlink subframe transmitted within each time unit, different time units of the same downlink subframe are sorted according to sequence of starting point of the different time units, L2 is a set positive integer;

wherein when the time-frequency bundle window comprises multiple downlink subframes, the mapping value of the first-category DL DAI of a downlink HARQ transmission within the time-frequency bundle window is to represent the total number of HARQ feedback units, which are transmitted by the eNB within all the downlink subframes of the time-frequency bundle window, from a first time unit to a time unit for the downlink HARQ transmission, from a first carrier to a carrier for the downlink HARQ transmission, from a first downlink subframe to a downlink subframe for the downlink HARQ transmission within the time-frequency bundle window; or wherein values of the first-category DL DAI of the same time unit in each downlink subframe of the time-frequency bundle window are continuous; or wherein value of the first-category DL DAI of a downlink HARQ transmission within the time-frequency bundle window comprise a subframe-dimension DAI value and a carrier-dimension DAI value, the subframe-dimension DAI value is determined with current method, the carrier-dimension DAI value is to represent the total number of HARQ feedback units, which are transmitted by the eNB within the downlink subframe carrying the downlink HARQ transmission from the first time unit to a time unit for the downlink HARQ transmission, from the first carrier to a carrier for the downlink HARQ transmission.

10. The method according to claim 8, wherein when configured starting point of downlink HARQ transmission of each carrier in unlicensed frequency band is aligned, the first-category DAI of downlink HARQ transmission of carriers in licensed frequency band is less than the first-category DAI of downlink HARQ transmission of carriers in the unlicensed frequency band.

11. The method according to claim 1, wherein when no modulo operation is performed to first-category DAI value, sequence of starting point of each downlink HARQ transmission within the time-frequency bundle window is consistent with an ascending order of corresponding DAI value.

12. The method according to claim 7, further comprising:

after receiving the PDCCH or EPDCCH, obtaining a second-category DL DAI corresponding to the downlink HARQ transmission in the DL-Assignment, and determining a mapping value of the second-category DL DAI; and mapping the HARQ-ACK bit of each HARQ feedback unit within the time-frequency bundle window to the corresponding bit of the feedback bit sequence, based on the mapping value of the second-category DL DAI.

13. The method according to claim 12, further comprising:

when the total number of HARQ feedback units transmitted by the eNB is less than, or equal to the mapping value of second-category DL DAI of a downlink HARQ transmission before current time, feeding back, by the UE, the HARQ-ACK bit, based on the mapping value of second-category DL DAI of the downlink HARQ transmission, or when the total number of HARQ feedback units actually transmitted by the eNB is greater than the mapping value of second-category DL DAI of the downlink HARQ transmission before current time, the method further comprising:

updating, by the eNB, the mapping value of the second-category DL DAI corresponding to current downlink HARQ transmission; and feeding back, by the UE, the HARQ-ACK bit, based on the updated mapping value of the second-category DL DAI;

wherein when the time-frequency bundle window comprises one downlink subframe, the mapping value of second-category DL DAI of a downlink HARQ transmission within the time-frequency bundle window is to represent total number of HARQ feedback units, which are transmitted by the eNB on all the carriers from starting point of the time-frequency bundle window to a time unit for the downlink HARQ transmission, or to a time unit for transmitting the DL-Assignment;

wherein when the time-frequency bundle window comprises multiple downlink subframes, the mapping value of second-category DL DAI of a downlink HARQ transmission within the time-frequency bundle window is to represent total number of HARQ feedback units, which are transmitted by the eNB on all the carriers from a first time unit to a time unit for the downlink HARQ transmission in all the downlink subframes within the time-frequency bundle window, from a first downlink subframe to a downlink subframe for the downlink HARQ transmission within the time-frequency bundle window; or the second-category DL DAI value of a downlink HARQ transmission within the time-frequency bundle window comprises a subframe-dimension second-category DAI value and a carrier-dimension second-category DAI value, wherein the subframe-dimension second-category DAI value is determined with current method, the carrier-dimension second-category DAI value is to represent the total number of HARQ feedback units, which are transmitted by the eNB on all the carriers within a downlink subframe carrying the downlink HARQ transmission from the first time unit to the time unit for the downlink HARQ transmission;

wherein the mapping value of second-category DL DAI of a downlink HARQ transmission within the time-frequency bundle window is to represent the total number of HARQ feedback units, which are predicted to transmit, or actually transmitted by the eNB on all the carriers from starting point to end point of time-frequency bundle window, or from starting point to the last time unit of a subframe carrying the downlink HARQ transmission within the time-frequency bundle window; and wherein the mapping value of the second-category DL DAI of a downlink HARQ transmission within the time-frequency bundle window is to represent:

the HARQ feedback units of the downlink HARQ transmission are the last Y HARQ feedback units, which are predicted to transmit by the eNB on all the carriers from the starting point of the time-frequency bundle window to a time unit for the downlink HARQ transmission, or to a time unit for transmitting the DL-Assignment, wherein Y is a set positive integer, values of Y are the same or different corresponding to different mapping values of the second-category DL DAI.

14. The method according to claim 12, wherein the mapping value of the second-category DL DAI of a downlink HARQ transmission within the time-frequency bundle window is to represent:

the HARQ feedback units of the downlink HARQ transmission are the last X HARQ feedback units on all the carriers, which are from the starting point of the time-frequency bundle window to a time unit for the downlink HARQ transmission, or to a time unit for transmitting the DL-Assignment, wherein X is a set positive integer, values of X are the same or different corresponding to different mapping values of the second-category DL DAI.

15. An apparatus for feeding back hybrid automatic repeat request acknowledgement (HARQ-ACK) information, comprising:

a transceiver; and a controller connected to the transceiver, the controller is configured to:

in a time-frequency bundling window corresponding to an uplink subframe in a feedback window of a first uplink subframe for feeding back HARQ-ACK, receive a physical downlink control channel (PDCCH) or an enhanced PDCCH (EPDCCH) scheduling downlink HARQ transmission, obtain a downlink assignment index (DL DAI) in a DL-assignment, and determine a mapping value of each DL DAI, determine a second uplink subframe for feeding back the HARQ-ACK, and determine an uplink carrier for feeding back the HARQ-ACK, map HARQ-ACK bits of each HARQ feedback unit to corresponding bits of a feedback bit sequence according to the mapping value of the DL DAI, and feedback the HARQ-ACK bits on the uplink carrier in the second uplink subframe, wherein the uplink carrier includes a first uplink carrier responsible for feeding back the HARQ-ACK of an unlicensed carrier, and a second uplink carrier responsible for feeding back the HARQ-ACK of a licensed carrier or the unlicensed carrier.

* * * * *